United States Patent
Welsh et al.

(10) Patent No.: US 10,876,955 B2
(45) Date of Patent: Dec. 29, 2020

(54) OPTICAL CONFIGURATION METHODS FOR SPECTRAL SCATTER FLOW CYTOMETRY

(71) Applicant: The United States of America, as represented by the Secretary, Department of Health and Human Services, Bethesda, MD (US)

(72) Inventors: Joshua Aden Welsh, North Bethesda, MD (US); Jennifer C. Jones, Bethesda, MD (US); William G. Telford, Bethesda, MD (US); Jay A. Berzofsky, Bethesda, MD (US); Ari Rosner, Edgewater, MD (US)

(73) Assignee: THE UNITED STATES OF AMERICA, AS REPRESENTED BY THE SECRETARY, DEPARTMENT OF HEALTH AND HUMAN SERVICES, Bethesda, MD (US)

( * ) Notice: Subject to any disclaimer, the term of this patent is extended or adjusted under 35 U.S.C. 154(b) by 0 days.

(21) Appl. No.: 16/756,420

(22) PCT Filed: Oct. 23, 2018

(86) PCT No.: PCT/US2018/057128
§ 371 (c)(1),
(2) Date: Apr. 15, 2020

(87) PCT Pub. No.: WO2019/084022
PCT Pub. Date: May 2, 2019

(65) Prior Publication Data
US 2020/0278285 A1    Sep. 3, 2020

Related U.S. Application Data
(60) Provisional application No. 62/575,988, filed on Oct. 23, 2017.

(51) Int. Cl.
*G01N 21/00* (2006.01)
*G01N 15/14* (2006.01)
*G01N 15/10* (2006.01)

(52) U.S. Cl.
CPC ..... *G01N 15/1434* (2013.01); *G01N 15/1459* (2013.01); *G01N 2015/1006* (2013.01)

(58) Field of Classification Search
CPC .......... G01N 15/1434; G01N 15/1459; G01N 15/14; G01N 15/00; G01N 2015/1006;
(Continued)

(56) References Cited

U.S. PATENT DOCUMENTS 5,123,731 A  *  6/1992  Yoshinaga ......... G01N 15/0205
                                                       250/461.2
7,800,754 B2     9/2010  Kenyon
(Continued)

FOREIGN PATENT DOCUMENTS

WO    WO 2008/122035    10/2008
WO    WO 2010/099118     9/2010
(Continued)

OTHER PUBLICATIONS

Andor, "Spectral Flow Cytometry," https://www.oxinst.com/learning/view/article/an-introduction-to-spectral-flow-cytometry, downloaded May 17, 2019.
(Continued)

*Primary Examiner* — Hoa Q Pham
(74) *Attorney, Agent, or Firm* — Klarquist Sparkman, LLP

(57) ABSTRACT

Apparatus include an illumination source configured to produce and direct a multi-wavelength illumination beam to a microfluidic target that can include nanotags, a detector configured to receive a multi-wavelength detection beam from the microfluidic target and to produce a detection
(Continued)

signal, wherein the multi-wavelength detection beam comprises light that is elastically side-scattered by an interaction between the multi-wavelength illumination beam and the nanotags in the microfluidic target, and a processor configured to receive the detection signal and to determine the presence of the nanotags in the microfluidic target by comparing multiple wavelength side-scatter intensity characteristics of the detection signal with predetermined multi-wavelength elastic side-scatter intensity profiles of one or more nanotag types. Methods are also disclosed that determine the presence of different nanotags responsive to a multi-wavelength detection beam based on a detected signal and predetermined multi-wavelength elastic side-scatter intensity profiles for different nanotag types.

27 Claims, 44 Drawing Sheets

(58) Field of Classification Search
CPC ........ G01N 21/53; G01N 21/65; G01N 21/64; G01N 2021/6421; G01N 2021/6428; G01N 2021/6419; G01N 2021/6441; B01L 3/5027; B01L 2300/021; C12Q 2565/626; C12Q 2565/629; G01J 3/4406; G01J 3/36
USPC ......... 356/246, 432–440, 335–343; 422/502, 422/504, 68.1
See application file for complete search history.

(56) References Cited

U.S. PATENT DOCUMENTS

| | | | |
|---|---|---|---|
| 8,467,055 B2 | 6/2013 | Imanishi et al. | |
| 8,637,082 B2 | 1/2014 | Tulsky et al. | |
| 8,907,312 B2 | 12/2014 | Heng et al. | |
| 9,442,106 B2 | 9/2016 | Beck et al. | |
| 9,726,609 B2* | 8/2017 | Natan | G01N 21/658 |
| 9,739,700 B2 | 8/2017 | Yan et al. | |
| 2005/0141843 A1 | 6/2005 | Warden et al. | |
| 2005/0225745 A1* | 10/2005 | Nagai | G01N 21/645 356/73 |
| 2010/0035243 A1 | 2/2010 | Muller et al. | |
| 2010/0220315 A1* | 9/2010 | Morrell | G01N 15/1459 356/73 |
| 2012/0001090 A1* | 1/2012 | Takasaki | G01N 21/53 250/459.1 |
| 2013/0095575 A1 | 4/2013 | Jones et al. | |
| 2013/0123145 A1 | 5/2013 | Chakravarthy et al. | |
| 2014/0030193 A1 | 1/2014 | Searson et al. | |
| 2014/0228233 A1 | 8/2014 | Pawlowski et al. | |
| 2015/0004598 A1 | 1/2015 | Gao et al. | |
| 2015/0166997 A1 | 6/2015 | Messmer | |
| 2016/0216252 A1 | 7/2016 | Zhang et al. | |

FOREIGN PATENT DOCUMENTS

| | | |
|---|---|---|
| WO | WO 2015/123005 | 8/2015 |
| WO | WO 2016/011383 | 1/2016 |
| WO | WO 2019/084022 | 5/2019 |

OTHER PUBLICATIONS

Arakelyan et al., "Nanoparticle-based flow virometry for the analysis of individual irions," *J Clin Invest.* 123:3716-3727 (Aug. 2013).
Are Quantum Dots Any Good for Flow Cytometry: http://bitesizebio.com/33830/quantum-dots-good-flow-cytometry/.
Crow et al. "Plasmonic Flow Cytometry by Immunolabeled Nanorods" *Cytometry Part A*, 79(1):57-65 (Jan. 2011).
Erdbrügger et al., "Imaging Flow Cytometry Elucidates Limitations of Microparticle Analysis by Conventional Flow Cytometry" *Cytometry A*, 85:756-770 (Jun. 5, 2014).
Exometry BV, Rosetta Calibration Overview, downloaded May 17, 2019.
Farlow et al. "Exclusive formation of monovalent quantum dot imaging probes by steric exclusion" *Nat Methods* 10(12):1203-1205 (Dec. 2013).
Gallina et al., "Aptamer-conjugated, fluorescent gold nanorods as potential cancer theradiagnostic agents," *Mat Sci Eng. C*, 59:324-332 (Feb. 1, 2016).
Gardiner et al. "Measurement of refractive index by nanoparticle tracking analysis reveals heterogeneity in extracellular vesicles," *J Extracell Vesicles*, 3:25361 (Nov. 24, 2014).
Gaudin et al., "Sorting of small infectious virus particles by flow virometry reveals distinct infectivity profiles" *Nature Communications* 6:6022 (Aug. 2, 2015).
Gold Nanoparticles for Flow Cytometry (70nm-400nm): http://www.cytodiagnostics.com/store/pc/Gold-Nanoparticles-for-Flow-Cytometry-70nm-400nm-c237.htm.
Hollingsworth et al. "Giant multishell CdSe nanocrystal quantum dots with suppressed blinking: Novel fluorescent probes for real-time detection of single-molecule events" *Proc SPIE* 7189-718904 (Jul. 2009).
International Search Report and Written Opinion for related International Application No. PCT/US2018/057128, dated Feb. 22, 2019, 11 pages.
Introduction to flow cytometry: http://www.abcam.com/protocols/introduction-to-flow-cytometry.
Kaganman "Quantum dots go with the flow" *Nature Methods* 3(9):662-663 (Sep. 1, 2006).
Kormelink et al. "Prerequisites for the Analysis and Sorting of Extracellular Vesicle Subpopulations by High-Resolution Flow Cytometry" *Cytometry Part A* 00A:00-00 (Feb. 2015).
Liu et al. "Engineering Monovalent Quantum Dot—Antibody Bioconjugates with a Hybrid Gel System" *Bioconjuage Chemistry* 22:510-517 (Feb. 24, 2011).
Morales-Kastresana et al., "Labeling Extracellular Vesicles for Nanoscale Flow Cytometry," *Scientific Reports* 7:1878 (May 2017).
Qdot® 655 ITK™ Amino (PEG) Quantum Dots, Catalog No. Q21521M, Thermo Fisher Scientific Inc. (2015).
Seo et al., "Production and Targeting of Monovalent Quantum Dots" *J Vis Exp.* 92:e52198 (Oct. 2014).
SNAP-tag® Technologies: Novel Tools to Study Protein Function, New England BioLabs Inc., from NEB expressions Fall 2008, vol. 3.3 by Kai Johnsson, Ph.D., Ecole Polytechnique Fédérale de Lausanne.
Tanev et al. "Flow Cytometry with Gold Nanoparticles and their Clusters as scattering Contrast Agents: FDTD Simulation of Light-Cell Interaction" *J. Biophotonics.* 2(8-9):505-520 (Sep. 2009).
Uddayasankar et al. "Isolation of Monovalent Quantum Dot—Nucleic Acid Conjugates Using Magnetic Beads" *Bioconjugate Chemistry* 25:1342-1350 (Jun. 13, 2014).
Van der Pol et al., "Optical and non-optical methods for detection and characterization of microparticles and exosomes" *Journal of Thrombosis and Haaemostasis* 8:2596-2607 (Dec. 2010).
Van der Pol et al. "Single vs. swarm detection of microparticles and exosomes by flow cytometry" *J. Thromb Haemost* 10(5):919-930 (Mar. 6, 2012) doi:10.1111/j.1538-7836.2012.04683.x.
Van der Vlist et al. "Fluorescent labeling of nano-sized vesicles released by cells and subsequent quantitative and qualitative analysis by high-resolution flow cytometry" *Nature Protocols* 7(7):1311-1326 (Jun. 14, 2012).
Vela et al. "Effect of shell thickness and composition on blinking suppression and the blinking mechanism in 'giant' CdSe/CdS nanocrystal quantum dots" *J. Biophotonics.* 3(10-11:706-717 (Oct. 2010).
Verma et al. "Extracellular vesicles: potential applications in cancer diagnosis, prognosis, and epidemiology," *BMC Clin Pathol.* 15:6 (Apr. 15, 2015).
Welsh, Joshua A., "FCM Pass," Software Overview, v1, downloaded May 17, 2019.

(56) References Cited

OTHER PUBLICATIONS

Welsh, Joshua A., "FCM Pass," Software Overview, v2, downloaded May 17, 2019.

Welsh, Joshua A., "Flow Cytometer Optimisation & Standardisation for the Study of Extracellular Vesicles as Translational Biomarkers," Thesis for the degree of Doctor of Philosophy, University of Southampton (Sep. 2016).

Welsh et al., "Prospective Use of High-Refractive Index Materials for Single Molecule Detection in Flow Cytometry," *Sensors* 18:2461, with Supplementary Materials (Aug. 1, 2018).

Yang et al., "Development of an Ultrasensitive Dual-Channel Flow Cytometer for the Individual Analysis of Nanosized Particles and Biomolecules," *Anal Chem.* 81:2555-2563 (Mar. 4, 2009).

Zhou et al., "Tandem Phosphorothioate Modifications for DNA Adsorption Strength and Polarity Control on Gold Nanoparticles," *ACS Appl Mater. Interfaces* 6:14795-14800 (Aug. 21, 2014).

Zhu et al., "Light-scattering detection below the level of single fluorescent molecules for high-resolution characterization of functional nanoparticles," *ACS Nano* 8:10998-11006 (Oct. 28, 2014).

Zucker et al. "Characterization, Detection, and Counting of Metal Nanoparticles Using Flow Cytometry" *Cytometry Part A* 89(2):169-183 (Nov. 29, 2015).

\* cited by examiner

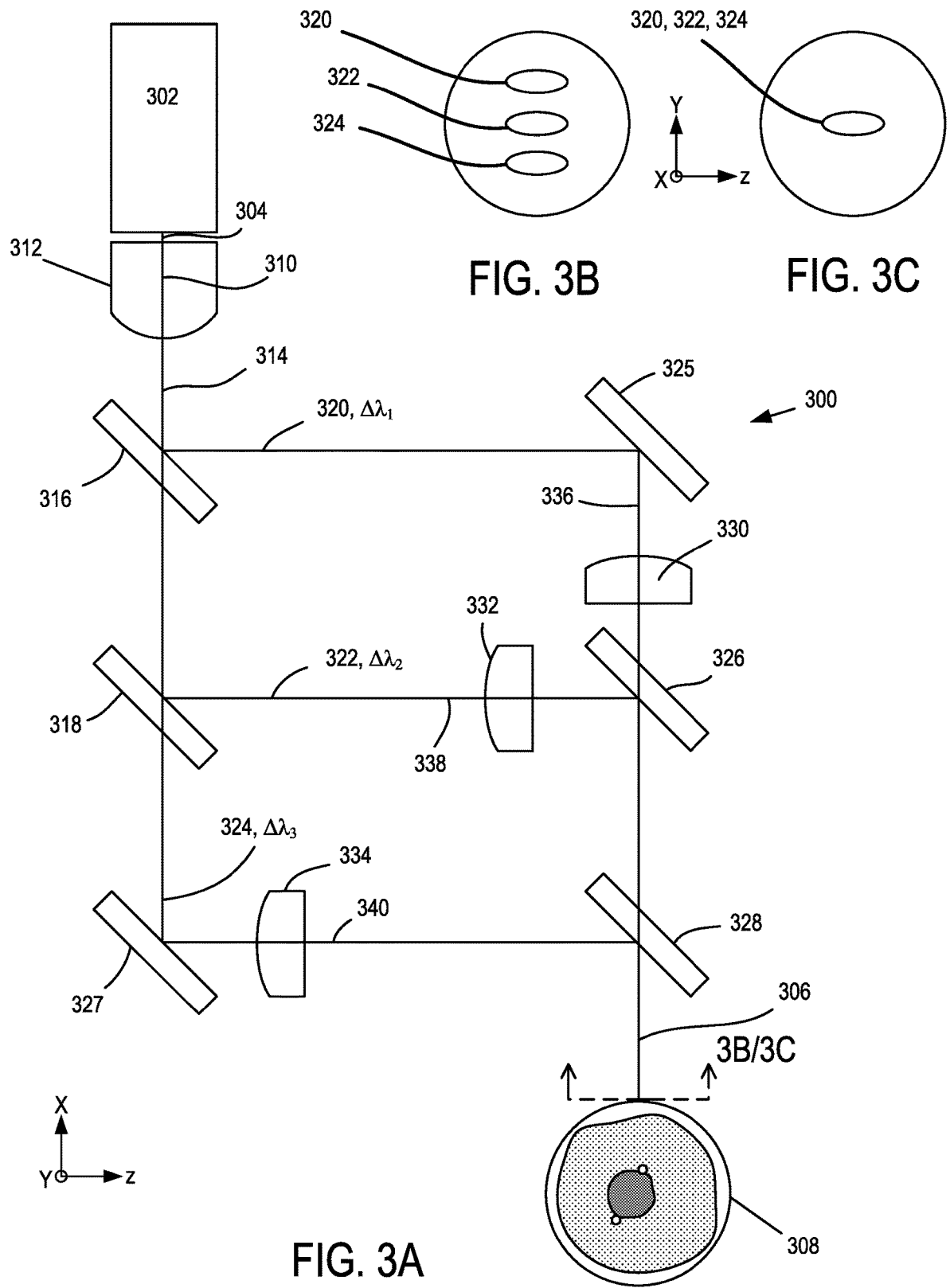

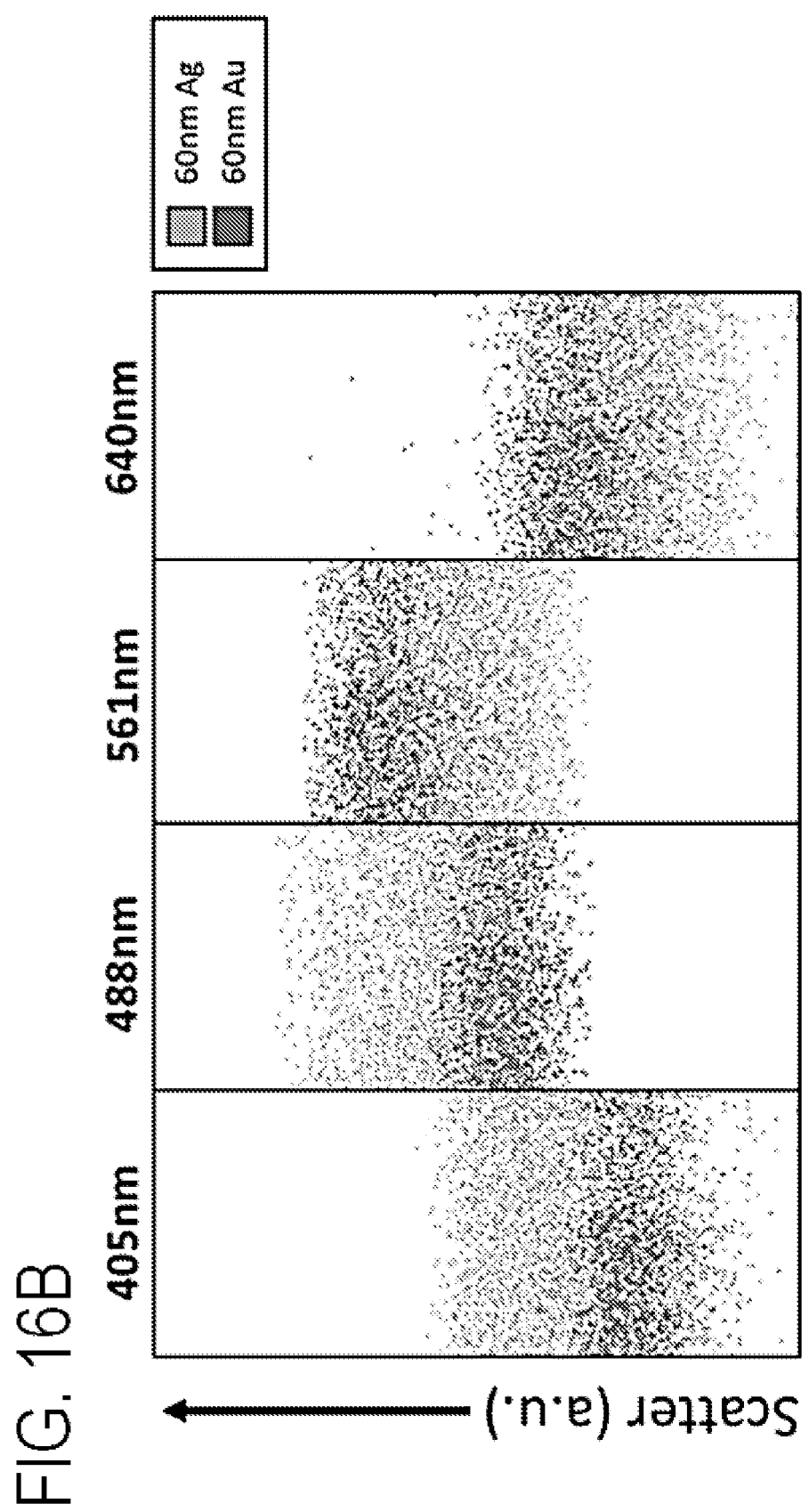

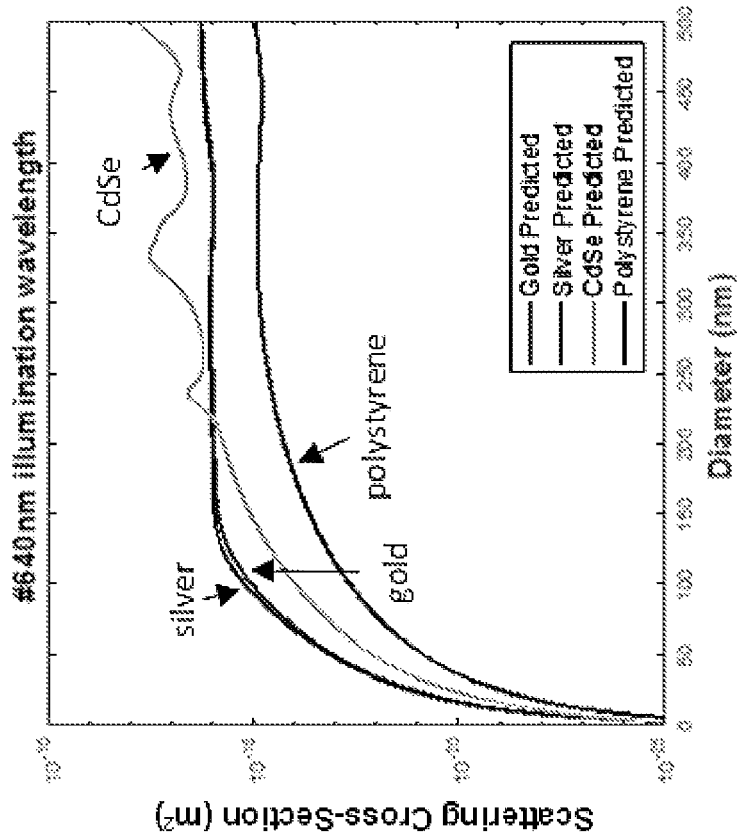
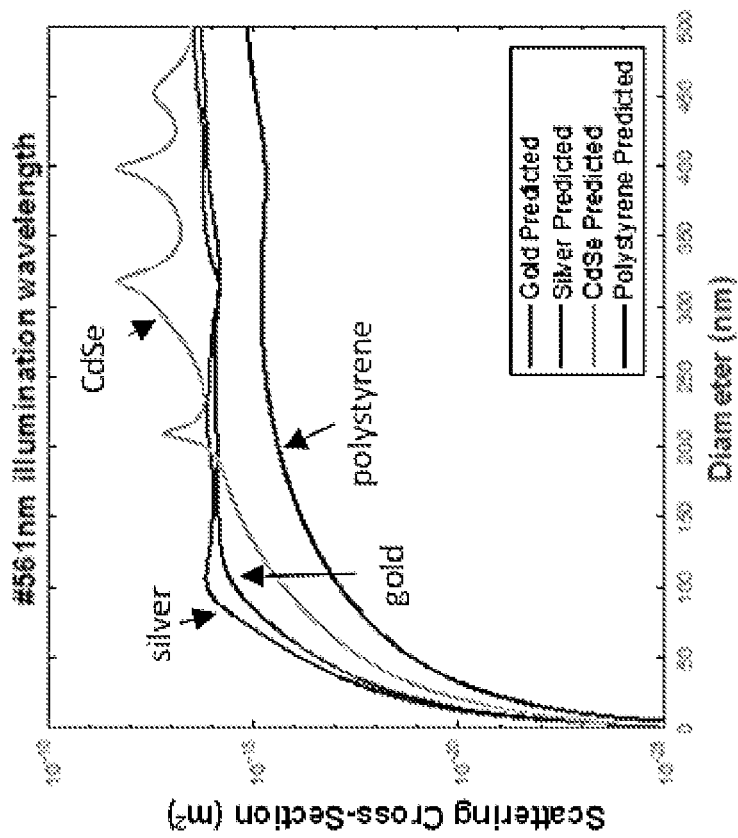
FIG. 21D
FIG. 21C

OPTICAL CONFIGURATION METHODS FOR SPECTRAL SCATTER FLOW CYTOMETRY

CROSS REFERENCE TO RELATED APPLICATIONS

This application is related to U.S. Provisional Application No. 62/411,324, filed Oct. 21, 2016, and PCT application number PCT/US2017/057928 entitled "Molecular Nanotags" filed on Oct. 23, 2017, each of which is herein incorporated by reference in its entirety.

This application is the U.S. National Stage of International Application No. PCT/US2018/057128, filed Oct. 23, 2018, which was published in English under PCT Article 21(2), which in turn claims the benefit of U.S. Provisional Application No. 62/575,988, filed Oct. 23, 2017, which is incorporated by reference herein in its entirety.

ACKNOWLEDGMENT OF GOVERNMENT SUPPORT

This invention was made with Government support under project number Z01BC011502 by the National Institutes of Health, National Cancer Institute. The Government has certain rights in the invention.

FIELD

The field is microfluidic apparatus and methods, including flow cytometry.

BACKGROUND

Improved methods and devices for single nanoparticle detection, resolution and/or sorting would be advantageous for both clinical and research purposes. For example, they would be useful to identify and analyze extracellular vesicles (EVs) and other nanoscale particles released by cells that have important biological functions and significant biomedical potential for use as therapeutic agents, targets or biomarkers. It is generally accepted that the constituent components and biological function of EVs vary, based on the type of cell that produces them and the conditions under which they are produced (Raposo and Stoorvogel, *J Cell Biol* 200(4):373-383, 2013). However, it has not previously been possible to characterize subsets of these particles in the way that cellular lineages and subsets have been defined. Similarly, it has previously been difficult to detect, sort and count other nanoscale particles as well as individual molecular components of these nanoscale particles. An important obstacle to this technology has been the lack of available tools and reagents to analyze, sort, and functionally study individual nanoscale particles, based on specific attributes.

Fluorescent activated cell sorting (FACS) has been used since its introduction by Herzenberg and colleagues in 1972 to identify and sort labeled subsets of cells (Julius et al., *Proc Natl Acad Sci USA* 69(7):1934-1938, 1972; Bonner et al, *Rev Sci Instrum* 43:404-409, 1972), but sorting submicron subpopulations has not been considered feasible for particles smaller than approximately 500 nm. Conventional wisdom in flow cytometry microfluidics holds that the signal from particles smaller than 500 nm would be lost in the signal from sample debris and electronic noise and thus remain undetectable. Furthermore, a need exists for enhancements in reagents methods, and apparatus, such as flow cytometry and flow cytometry apparatus, that would allow for the detection of single molecules, such as a single receptor on the surface of an EV.

SUMMARY

According to an aspect of the disclosed technology, apparatus include an illumination source configured to produce and direct a multi-wavelength illumination beam to a microfluidic target that can include nanotags, a detector configured to receive a multi-wavelength detection beam from the microfluidic target and to produce a detection signal, wherein the multi-wavelength detection beam comprises light that is elastically side-scattered by an interaction between the multi-wavelength illumination beam and the nanotags in the microfluidic target, and a processor configured to receive the detection signal and to determine the presence of the nanotags in the microfluidic target by comparing multiple wavelength side-scatter intensity characteristics of the detection signal with predetermined multi-wavelength elastic side-scatter intensity profiles of one or more nanotag types. In some examples, the determining the presence of the nanotags in the microfluidic target includes determining the presence of a single nanotag. In some examples, the processor is configured, based on the comparing, to determine the presence of an extracellular vesicle (EV) having at least one of the nanotags attached to the EV. In further examples, the processor is configured to determine from the detection signal the presence of multiple nanotag types simultaneously present in the microfluidic target. In some examples, the multiple nanotag types are attached to a common extracellular vesicle (EV). In further examples, the comparing is performed through a deconvolution of the detection signal using the predetermined multi-wavelength elastic side-scatter intensity profiles. In some examples, the single nanoparticles have a spherical or non-spherical characteristic and have a diameter associated with the spherical characteristic or characteristic dimension associated with the non-spherical characteristic that is 100 nm or smaller. In further examples, the elastic side-scatter intensity profiles correspond to a peak scattering. In some examples, the nanotag types include one or more nanotag types that are made of gold and one or more nanotag types that are made of silver. In further examples, the one or more nanotag types includes a nanotag type that includes a diameter selected in the range of 10 nm to 30 nm. According to some examples, the illumination source includes a broadband illumination source situated to generate a broadband illumination beam having a predetermined wavelength spectrum, and the apparatus includes a wavelength separation system optically coupled to the broadband illumination beam and situated to separate the broadband illumination beam into a plurality of subbeams each with a separate wavelength subband of the predetermined wavelength spectrum, and to direct and focus the subbeams along different respective optical paths so as to focus the subbeams at the microfluidic target based on a chromatic focusing distance of the respective wavelength subband. In some examples, the broadband illumination source comprises a supercontinuum laser. In further examples, the wavelength separation system includes a plurality of dichroic optical elements situated to direct the separate subbeams along collinear or parallel optical paths to the microfluidic target. In some examples, the wavelength separation system includes a plurality of focusing systems optically coupled to the respective subbeams so as to focus the subbeams to a common location of the microfluidic target. In further examples, the detection system includes collection optics situated to receive the light elastically side-scattered by the microfluidic target so as to form the multi-wavelength detection beam, and prism optics situated to receive the multi-wavelength detection beam from the collection optics and to separate the multi-wavelength detection beam into a plurality of detection subbeams spatially separated based on wavelength. Some example detection systems further include a microlens array with separate microlenses situated to receive and focus respective detection subbeams, and wherein the detector includes a plurality of detector channels situated to receive the respective detection subbeams. In some examples, the detector includes one or more avalanche photodiodes, single-photon detecting avalanche photodiodes, photo-multiplier tubes, silicon photomultipliers, or 3-D high resolution, high sensitivity, high frame rate light field color recording device, or a combination thereof. In further examples, the illumination source includes a plurality of monochromatic laser sources situated to generate respective laser beams at different wavelengths so as to correspond to the multi-wavelength illumination beam. In some examples, the illumination source further comprises beam focusing optics situated to focus each respective laser beam at the microfluidic target based on the chromatic focusing characteristics of the wavelength of the laser beam. In some embodiments, the illumination source further comprises a plurality of dichroic optical elements situated to direct the laser beams along a collinear optical path so that the laser beams are focused to a common location at the microfluidic target. According to further examples, the detector is part of a detection system comprising collection optics situated to receive the light at the different wavelengths that is elastically side-scattered by the microfluidic target so as to form the multi-wavelength detection beam. In some examples, the collection optics include a first collection optics perpendicularly arranged with respect to an optical path of the multi-wavelength illumination beam received by the microfluidic target, and a second collection optics perpendicularly arranged with respect to the optical path adjacent to the first collection optics. In further examples, the second collection optics are on an opposite side of the microfluidic target from the first collection optics. In some examples, the second collection optics are configured with collection optics parameters different from the first collection optics that shift Mie resonances by a predetermined amount at a given wavelength. In further examples, the collection optics parameters include one or both of collection optics angle and detection aperture geometry. In some examples, the detector includes a first detector coupled to the first collection optics and a second detector coupled to the second collection optics, wherein the sensitivity of the first and second detectors is selected to be different to increase a dynamic range of detection for particles of different sizes. Some example detection systems further include at least one dichroic optical element situated to convergently receive the multi-wavelength detection beam and to separate the multi-wavelength detection beam into a plurality of detection subbeams each corresponding to one of the different wavelengths, wherein the detector comprises a plurality of optical detectors situated to receive the respective detection subbeams from the at least one dichroic element and situated in a spaced relationship relative to the at least one dichroic element that is based on a focusing distance provided by the collection optics and an optical path length difference in focus between the detection subbeams that is associated with a chromatic aberration profile of the collection optics. In some examples, the at least one dichroic optical element includes a first dichroic optical element and a second dichroic optical element, wherein the first dichroic optical element is situated to direct a first detection subbeam having a first wavelength of the different wavelengths to a respective optical detector and the second dichroic optical element is situated to direct a second detection subbeam having a second wavelength that is longer than the first wavelength to a respective optical detector. In some examples, an order of generation of the detection subbeams with at least one dichroic optical element is based on a chromatic delta focus profile of the collection optics. In some embodiments, the collection optics includes one or more achromatic or apochromatic lens elements. In further examples, the first collection optics are situated to detect a first detection subbeam of the multi-wavelength detection beam having a first wavelength and the second collection optics are situated to detect a second detection subbeam of the multi-wavelength detection beam having a second wavelength. In some examples, the detection of the second detection subbeam with the second collection optics is spatially separated from the detection of first detection subbeam with the first collection optics based on one or both of a focusing distance commonality and focusing distance difference between the first detection subbeam and second detection subbeam by the first collection optics that is associated with a chromatic delta focus profile of the first collection optics or a spatial relationship between the first collection optics and an optical detector situated to receive the first detection subbeam. Some detection system examples further include an optical fiber assembly including a plurality optical fibers having respective adjacent first ends each including an aperture that is situated to receive a respective detection subbeam of the multi-wavelength detection beam having one of the different wavelengths, wherein the apertures are spaced apart in relation to each other along a common propagation direction of the subbeams based on focusing distance variation between the detection subbeams that is associated with a chromatic delta focus profile of the collection optics, and a plurality of optical detectors optically coupled to respective second ends of the optical fibers opposite the first ends. In some examples, the apertures are aligned with image spots of the respective detection subbeams. Some examples further include a translation stage coupled to at least one of the first ends of the optical fibers so as to translate the corresponding aperture along the propagation direction. In some embodiments, the apertures are slit apertures and each slit aperture has a slit length longer than a slit width and the slit length extends parallel to a flow direction of the microfluidic target. In some examples, the translation stage is situated to translate the slit apertures along a lateral direction that is perpendicular to the propagation direction and the flow direction. In some embodiments, each of the first ends of the optical fibers includes an optical block that includes the respective aperture and that is optically coupled or fused to the optical fiber so as to form the first end. In further examples, an area of the optical block adjacent to the aperture has an absorptivity selected so as to reduce stray light in proximity to the first ends of the optical fibers. In some embodiments, each aperture is defined by a respective endface of the optical fibers based on one or more of a shaped optical fiber core or cladding geometry and a reflectivity coating variation situated on the endface. In further examples, the apertures have a geometry selected in relation to a Mie resonance. In some embodiments, the geometry is non-circular and non-rectangular.

According to another aspect of the disclosed technology, methods include directing a multi-wavelength illumination beam generated with an illumination source to a microfluidic target, elastically side-scattering the multi-wavelength illumination beam with the microfluidic target, detecting with a detector a plurality of detection subbeams of a multi-wavelength detection beam formed with the elastically side-scattered multi-wavelength illumination beam to produce a detection signal, and determining the presence of different nanotags responsive to the multi-wavelength detection beam based on the detection signal and predetermined multi-wavelength elastic side-scatter intensity profiles for different nanotag types.

In some examples, the determining is performed through a deconvolution of the detection signal using the predetermined multi-wavelength elastic side-scatter intensity profiles. In further examples, the directing the multi-wavelength illumination beam includes separating the multi-wavelength illumination beam into a plurality of illumination subbeams each having a different wavelength subband, and directing the illumination subbeams at the microfluidic target along different respective optical paths such that the illumination subbeams are focused at the microfluidic target based on a chromatic focusing distance variation of the different wavelength subbands. In some examples, the detecting the plurality of detection subbeams includes separating the multi-wavelength detection beam with a prism arrangement into the detection subbeams, receiving the detection subbeams with a microlens array having respective microlenses situated to respectively focus the detection subbeams, and receiving the focused detection subbeams with respective detector channels of an optical detector. In some examples, the illumination source comprises a plurality of monochromatic lasers situated to emit laser beams with different respective wavelengths. In further examples, the directing the multi-wavelength illumination beam includes directing the laser beams a collinear optical path so that the laser beams are focused to a common location at the microfluidic target. In some examples, the detecting a plurality of detection subbeams includes convergently receiving the multi-wavelength detection beam from collection optics with at least one dichroic optical element so as to separate the multi-wavelength detection beam into the detection subbeams, each corresponding to one of the different wavelengths, and receiving the detection subbeams with respective optical detectors situated in a spaced relationship with the at least one dichroic optical element that is based on a focusing distance provided by the collection optics and an optical path length difference in focus between the detection subbeams that is associated with a chromatic aberration profile of the collection optics. In some examples, the detecting a plurality of detection subbeams includes receiving a first portion of the multi-wavelength detection beam with a first set of the collection optics, detecting a detection subbeam of the first portion that has a first wavelength, receiving a second portion of the multi-wavelength detection beam with a second set of the collection optics situated opposite the microfluidic target from the first collection optics, and separately detecting a detection subbeam of the second portion that has a second wavelength based on one or both of a focusing distance commonality and focusing distance difference between the detection subbeam having the first wavelength and the detection subbeam having the second wavelength by the first set of collection optics that is associated with a chromatic delta focus profile of the first collection optics. In further examples, the detecting a plurality of detection subbeams includes directing the detection subbeams with collection optics to respective apertures at first ends of adjacent optical fibers, wherein the slit apertures are spaced apart in relation to each other along a common propagation direction of the subbeams based on a focusing distance variation between the detection subbeams that is associated with a chromatic delta focus profile of the collection optics.

The foregoing and other features and advantages of the disclosed technology will become more apparent from the following detailed description, which proceeds with reference to the accompanying figures.

BRIEF DESCRIPTION OF THE DRAWINGS

FIG. 3A is schematic of another example of a multi-wavelength illumination source.

FIGS. 3B-3C are beam cross-sections of the multi-wavelength illumination beam shown in FIG. 3A.

FIG. 16B is a graph of modelled scattering characteristics for 60 nm gold and silver nanoparticles at different wavelengths.

FIGS. 21A-21D show scattering cross-section versus particle diameter for different illumination wavelengths.

DETAILED DESCRIPTION

Figure 1:
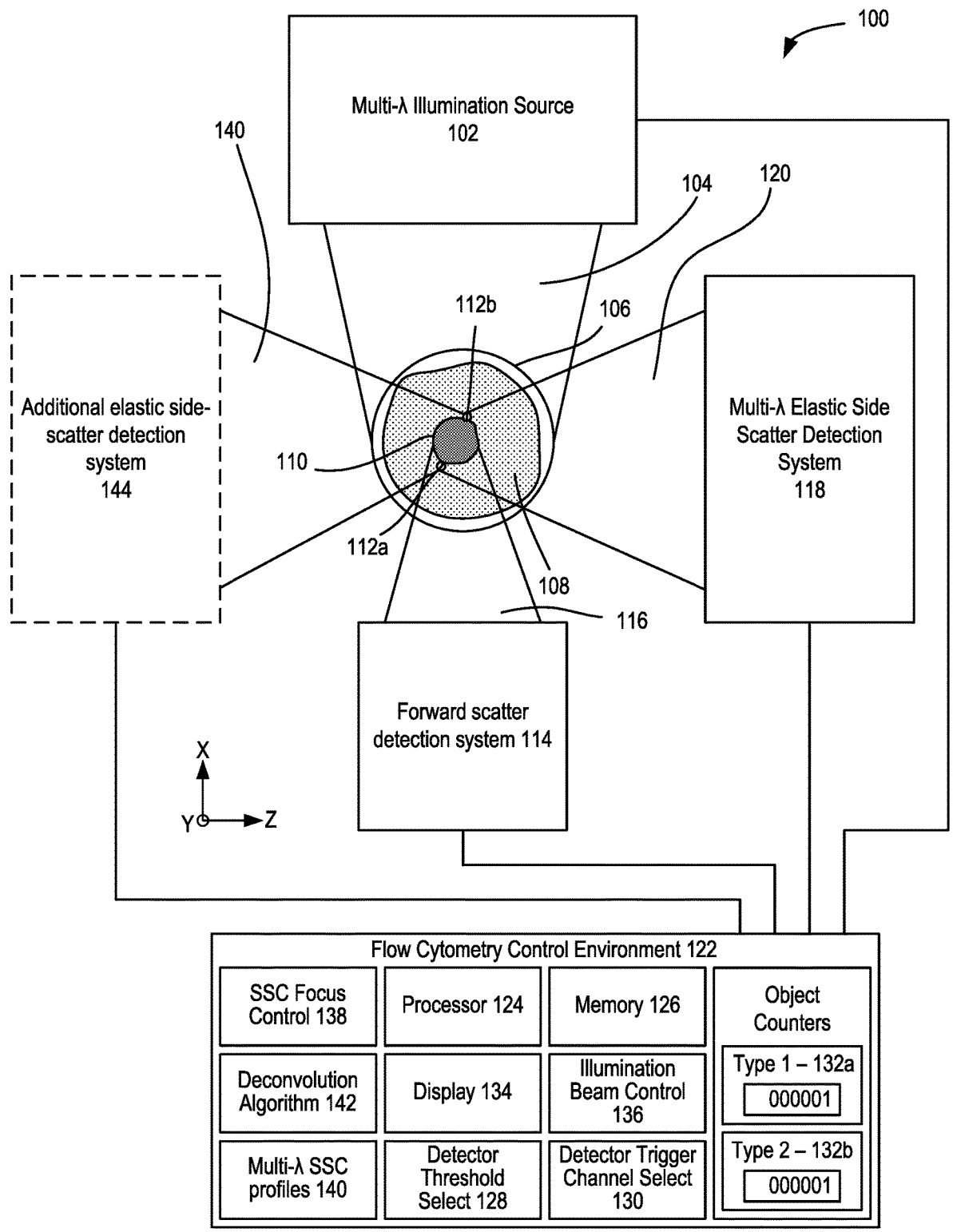
FIG. 1 is a schematic of an example microfluidic flow cytometer apparatus.

As used in this application and in the claims, the singular forms "a," "an," and "the" include the plural forms unless the context clearly dictates otherwise. Additionally, the term "includes" means "comprises." Further, the term "coupled" (including "optically coupled") does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

As used herein, optical radiation refers to electromagnetic radiation at wavelengths of between about 100 nm and 10 µm, and typically between about 300 nm and 800 nm. Examples based on available laser diode sources and optical fibers generally are associated with wavelengths of between about 350 nm and greater than 1000 nm. In some examples, propagating optical radiation is referred to as one or more beams having diameters, beam cross-sectional areas, and beam divergences that can depend on beam wavelength and the optical systems used for beam shaping. For convenience, optical radiation is referred to as light in some examples, and is typically at UV or visible wavelengths, though examples can include wavelengths other than UV or visible. Beam cross-sectional areas, diameters, or other beam dimensions can be described using boundaries that generally correspond to a zero intensity value, a 1/e value, a $1/e^2$ value, a full-width half-maximum (FWHM) value, or other suitable metric.

Optical beams and optical elements are described in some examples with respect to one or more axes. Typically, an axis includes one or more straight line segments along which an optical beam propagates or along which one or more optical elements are situated. Such axes can be bent or folded with reflective or refractive surfaces, so that axes need not be single straight line segments. Various lenses are described or may be used, including convex-convex, planoconvex, concave-concave, planoconcave, cylindrical, fresnel, zone plates, holographic, spherical, aspheric, combinations thereof, etc. Cylindrical lenses can have cylindrical surfaces that are arranged perpendicular to each other to provide a cross-cylinder or crossed-cylinder lens or lens assembly.

FIG. 1 shows an example of a microfluidic flow cytometer 100 that includes a multi-wavelength illumination source 102 that produces a multi-wavelength illumination beam 104 and directs the multi-wavelength illumination beam 104 to a microfluidic flow cytometry target 106. In representative examples, the flow cytometry target 106 includes a stream of fluid 108, shown in cross-section such that a stream flows into or out of the plane of FIG. 1, that includes particulates 110 such as extracellular vesicles (EVs) that can become detectable, including singularly detectable, based on light elastically scattered by nanoscale tags ("nanotags") 112a, 112b that are attached to the particulates 110. It will be appreciated that the stream of fluid 108 can be immobile in some examples. The multi-wavelength illumination beam 104 is typically directed to the flow cytometry target 106 perpendicular to the direction of the flow of the stream of fluid 108 and brought to a focus at the flow cytometry target 106. A forward scatter (FSC) detection system 114 is situated opposite the flow cytometry target 106 from the multi-wavelength illumination beam 104 as incident on the flow cytometry target 106 so as to receive a forward scatter detection beam 116 from the flow cytometry target 106 that propagates in the same general direction of the multi-wavelength illumination beam 104.

Molecular nanotags are nano-sized cytometric labels that can be detected individually or quantitatively enumerated based on corresponding intrinsic light scattering properties. Optical apparatus examples herein are capable of collecting spectral scattered light data from multiple wavelength light sources so as to identify different molecular nanotags that can be modular and can be comprised of different nanomaterials, each with identifiable and distinctive light scattering spectral properties across a wide range of wavelengths. In some examples, optical intensity or power values can be detected. Examples measure light scattering at multiple specific wavelengths and enhanced scatter signals are observed that are associated with gold nanomaterials at wavelengths that correspond to the optical properties of gold. In representative examples, plasmon resonance can relate to absorption, and scattering can correspond to a separate phenomenon, and the sum of absorption and scattering is detected so that complex refractive indices are used, including classical refractive index along with the imaginary part which corresponds to the extinction coefficient and accounts for absorption.

Figure 20B:
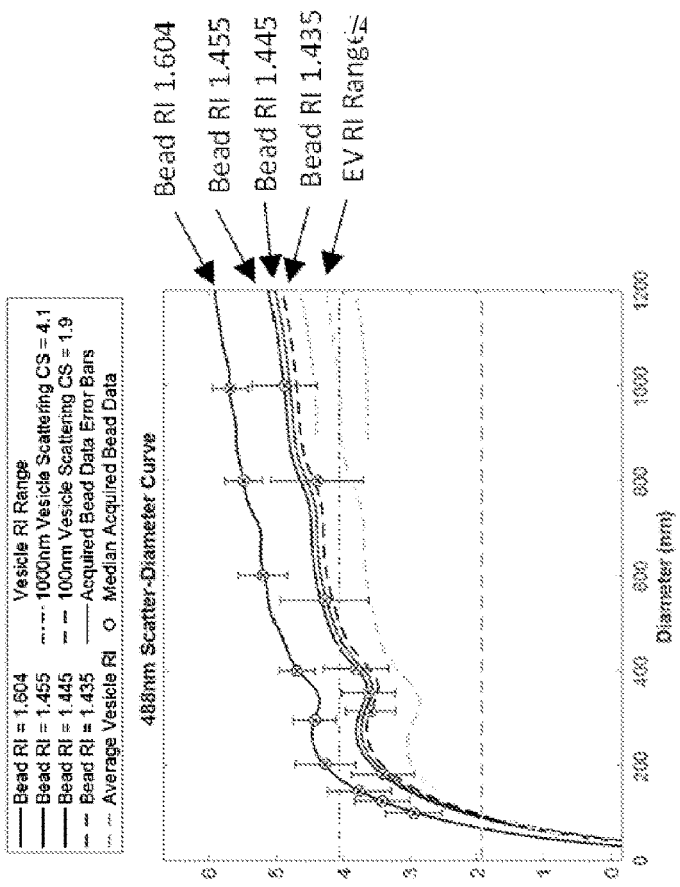
FIG. 20B is a graph of channel number versus particle diameter and illustrates the fit of acquired particles of known diameter and refractive index (black points) on an Astrios EQ flow cytometer, with modelled data using a collection angle deduced from FIG. 20A.
Figures 26A, 26B:
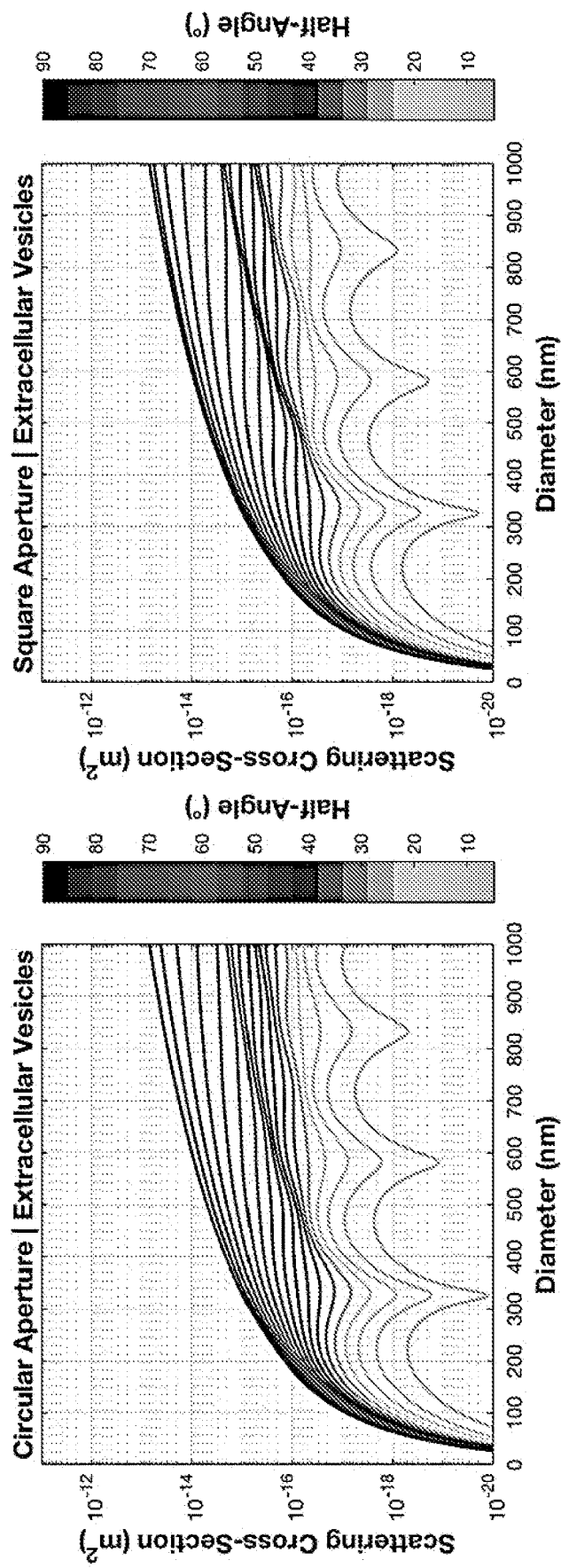
FIG. 26A shows the scatter-diameter relationship of modelled extracellular vesicles using a circular aperture for SSC collection with half-angles of 5-90 degrees in 5 degree increments.
FIG. 26B shows the scatter-diameter relationship of modelled extracellular vesicles using a square aperture for SSC collection with half-angles of 5-90 degrees in 5 degree increments.
Figure 32:
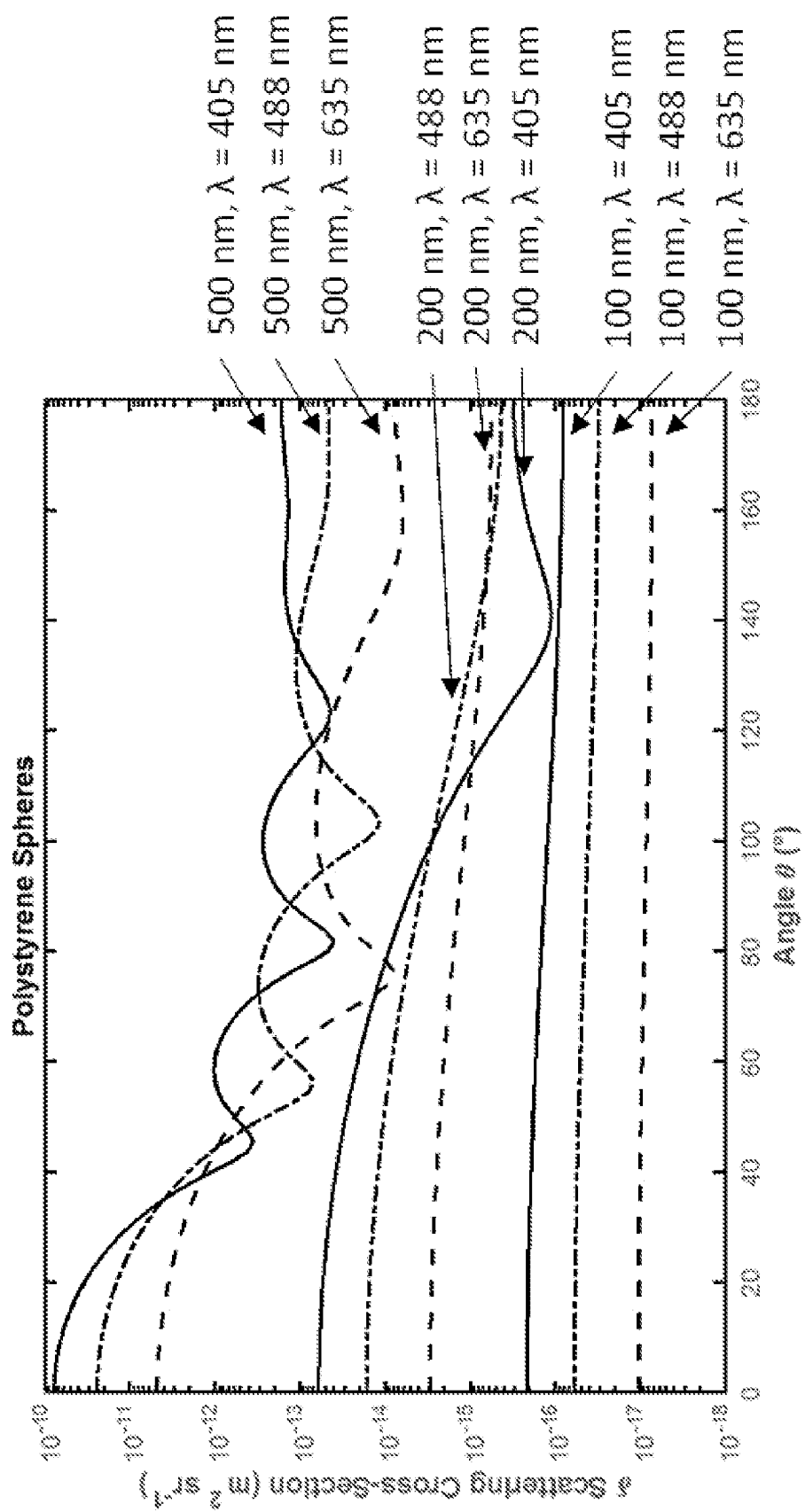
FIG. 32 shows the angular scattering distribution of polystyrene particles with diameters of 100 nm, 200 nm, 500 nm at illumination wavelengths of 405 nm, 488 nm, 635 nm.
Figure 33:
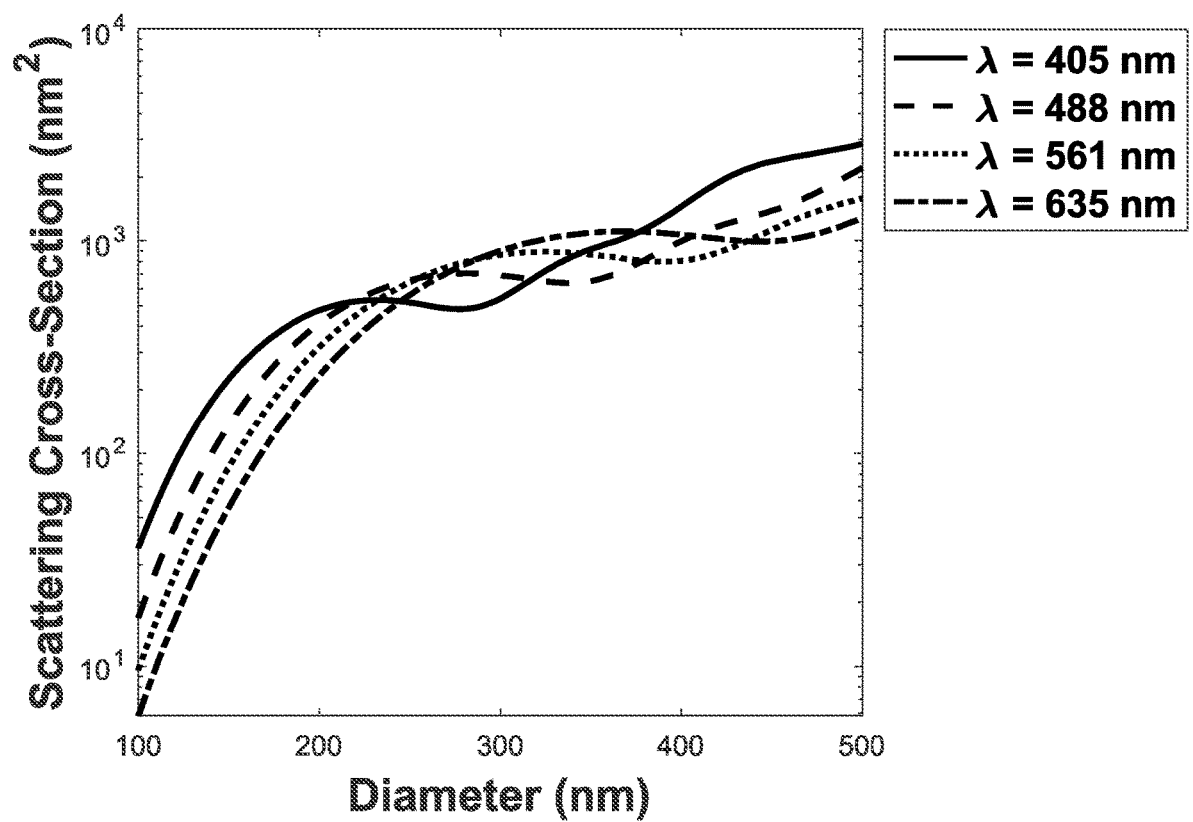
FIG. 33 shows the scattering cross-section of polystyrene spheres modelled at a collection half-angle of 30 degrees with an illumination wavelength of 405 nm, 488 nm, 561 nm, 635 nm.

In additional examples, patterns of enhanced light scattering power are demonstrated to differ between materials, according to the optical properties, including the refractive index and extinction coefficient. Such differences can be used with multispectral detection methods at selected wavelengths to discriminate laser light and to further increase sensitivity of detection to the point of detecting single molecules, such as molecular nanotags, each with distinct labels. A side scatter (SSC) detection system 118 is situated to receive and detect a multi-wavelength detection beam 120 that propagates generally to the side of the flow cytometry target 106 and the multi-wavelength illumination beam 104, e.g., perpendicular to the direction of the stream of fluid 108 and the multi-wavelength illumination beam 104. In representative examples, the term side-scatter refers to light scattered by a particle suspended in a stream, such as the stream of fluid 108, that is collected from angles typically ranging from 5 to 180 degrees relative to a direction of propagation of light received by the particle from an illumination source. The multi-wavelength detection beam 120 is produced by elastic collisions between the multi-wavelength illumination beam 104 and the particulates 110 and nanotags 112a, 112b of the flow cytometry target 106. Representative SSC detection systems 118 include an optical detector that includes one or more avalanche photodiodes, single-photon detecting avalanche photodiodes, photo-multiplier tubes, silicon photomultipliers, or 3-D high resolution, high sensitivity, high frame rate light field color recording device, or a combination. In representative examples, the Mie scattering characteristics of the nanotags for different wavelengths or bands of wavelengths can be numerically modeled so that a correspondence between detected scatter and the presence of one or more nanotags in the flow cytometry target 106 can be determined. For example, detected elastic scatter at or near 405 nm can correspond to silver nanotags bound to EVs, and detected elastic scatter at or near 532 nm can correspond to gold nanotags bound to EVs. Thus, the flow cytometry target 106 can be interrogated with the multi-wavelength illumination beam 104 so that different types of nanotags that produce different respective scatter characteristics at different wavelengths, e.g., the nanotags 112a, 112b, can be detected with the side scatter detection system 118. In some examples, multi-spectral side scatter detection with the SSC detection system 118 can be combined with inelastic scatter (Raman) detection or fluorescence detection. Moreover, collection optics of the SSC detection system 118 (or other components of the microfluidic flow cytometer 100) can be configured to exploit Mie resonance characteristics, where relative scattering power varies with particulate diameter at a specific wavelength (and which transposes or shifts as wavelength is varied). The process of determining the presence of a predetermined nanotag or deconvolving detection signals with predetermined nanotag spectral profiles can be further enhanced by exploiting the Mie resonance characteristics. By providing selecting the shape and/or position of Mie resonances, modeling can be configured to more accurately determine size or refractive index of detected particles. For example, with the detection system 118 comprising a single set of collection optics or defining a single set of collection parameters (e.g., a specific collection angle), the transposition of the Mie resonances according to wavelength (as shown in FIG. 32) can provide predetermined variation in scatter cross-section that indicates the presence or absence of particles of certain sizes. In some examples, the detection system 118 can include one or more additional sets of collection parameters, or the flow cytometry system can include additional detection systems (such as the additional SSC detection system 144, infra) that provide an additional set of collection parameters that can provide a predetermined transposition of the Mie resonances at a selected wavelength (and consequently for other wavelengths) relative to the initial set of collection parameters. This allows the different scattered wavelengths of the multi-wavelength detection beam 120 to have complementary scatter-diameter curves (as shown in FIG. 20B) that take advantage of the movement of Mie resonances due to illumination wavelength (as shown in FIG. 32) to allow for corrections seen at low collection angles (as shown in FIGS. 26A-26B). For example, a detection system that has a collection half-angle of 30 degrees sees a Mie resonance in polystyrene particles from 200-300 nm in diameter with an illumination wavelength of 405 nm, if the illumination wavelength is 635 nm however, this mie resonance is not seen until 380-500 nm. The area in which there is a Mie resonance in the 405 nm signal from 200-300 nm particles could therefore be corrected with the use of the 635 nm illumination wavelength, and the area in which there is a Mie resonance in the 635 nm signal at 380-500 nm could similarly be corrected with the 405 nm signal FIG. 33.

The SSC detection system 118 can include or be coupled to a flow cytometry control environment 122 that can include one or more computing devices including a processor 124 and memory 126 coupled to the processor 124. The control environment 122 can include a detector threshold select 128 situated to adjust a signal threshold for detection of scattered light for a selected detector channel of one or more optical detectors of the SSC detection system 118, and a detector trigger channel select 130 situated to select one or more detector channels of the SSC detection system 118 that triggers a detection event based on the signal threshold or thresholds selected with the detector threshold select 128. FSC and SSC data of each detection event can be compared with predetermined SSC/FSC scatter profiles associated with selected objects, such as particulates 110 and/or nanotags 112a, 112b, and one or more object counters 132a, 132b can be incremented based on positive determinations.

In some examples, a detector channel that has a least added noise with the addition of the stream of fluid 108 (but without any particulates 110) is selected as a trigger, and a detector threshold for the selected channel is selected to be at or near the noise level associated with the stream of fluid 108. After subsequent interrogation of the stream of fluid 108 containing the particulates 110 and nanotags 112a, 112b with the multi-wavelength illumination beam 104, events associated with the multi-wavelength detection beam 120 can include noise samples that can be compared with particulate-free reference noise to determine the presence or absence of objects in the flow cytometry target 106 that would not be detected with noise settings configured to minimize background noise.

In representative embodiments, the flow cytometry control environment 122 includes a SSC focus control 138 that is coupled to the SSC detection system 118 so as to adjust focus positions for different wavelengths of the multi-wavelength detection beam 120 at one or more respective optical detectors or the multi-wavelength illumination beam 104 at the flow cytometry target 106. Some examples further includes multi-wavelength side-scatter profiles 140 that can be stored in the memory 126, such as wavelength dependent side scatter characteristics (e.g., intensity, power), for one or more nanoparticles, and particularly for a plurality of nanoparticles, so that the detected characteristics of the multi-wavelength detection beam 120 can be compared with the multi-wavelength side-scatter profiles 140 so as to determine the presence of the nanoparticles. In additional examples, one or more deconvolution algorithms 142 are used to separate optical signals corresponding to different nanoparticles.

In different embodiments, various types of the multi-wavelength illumination source 102 can be used, including a plurality of monochromatic lasers and broadband or supercontinuum laser sources. In some examples, an illumination beam control 136 can be used to control timing and/or generation of the multi-wavelength illumination beam 104, based on wavelength selection, detector readiness, etc. In some examples, an additional SSC detection system 144 can be coupled to the flow cytometry target 106 adjacent to the multi-wavelength detection beam 120 and SSC detection system 118, including, e.g., on an opposite side of the flow cytometry target 106, so as to receive and detect a separate multi-wavelength detection beam 140 comprising light scattered by the flow cytometry target 106. In some example apparatus, one or more of the SSC detection systems 118, 144 can be situated to detect light other than side-scattered wavelengths, such as fluorescence, Raman, or other optical wavelengths and/or optical effects of interest. In some examples, the additional SSC detection system 144 can be configured with different component characteristics, such as a different collection optics having different collection angles, different slit aperture geometry, etc., that affects the relationship between a particle's diameter and the amount of light scattering collected due to Mie resonances in the particle's angular scattering distribution (as shown in FIG. 32). As seen in FIG. 32, as the illuminating wavelength increases, the position of the Mie resonances moves. While FIG. 32 demonstrates such an effect at a particle level, FIG. 33 furthers shows the effect at a system level, where collection a relative low collection angle of 30 degrees) a shift of a Mie resonance is seen from smaller to larger particles. By utilizing several wavelengths, and therefore using a plurality or all of these curves, regions can be found that consistently increase in scattering signal with particle diameter and therefore allow accurate extrapolation of size. Thus, by also obtaining separate detection signals that are associated with different characteristic Mie resonance positions, the determination of size and refractive index can be obtained in regions where Mie resonances would appear at one wavelength, due to that region being interpreted at a different wavelength that does not possess a Mie resonance in that diameter range.

The flow cytometry control environment 122 can include software or firmware instructions carried out by a digital computer. For example, any of the disclosed flow cytometry detection techniques can be performed in part by a computer or other computing hardware (e.g., one or more of an ASIC, FPGA, PLC, CPLD, GPU, etc.) that is part of a flow cytometer control system. The flow cytometry control environment 122 can be connected to or otherwise in communication with the multi-wavelength illumination source 102, FSC detection system 114, SSC detection system 118, and additional SSC detection system 144, programmed or configured to control the multi-wavelength illumination beam 104, detection of FSC, SSC, and/or fluorescence and to compare or sort detection beam data to determine the presence or absence of flow cytometry particulates and/or nanotags. The computer can be a computer system comprising one or more of the processors 124 (processing devices) and memory 126, including tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors 124 can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed illumination/detection techniques. The results of the computations and detected optical characteristics of the flow cytometry target 106 can be stored (e.g., in a suitable data structure) in the one or more tangible, non-transitory computer-readable storage media and/or can also be output to a user, for example, by displaying, on a display device 134, number of counted objects, FSC/SSC intensity or power data, convolved or deconvolved SSC data, channel selection, noise/trigger levels, etc., such as a graphical user interface.

Figures 2A, 2B, 2C:
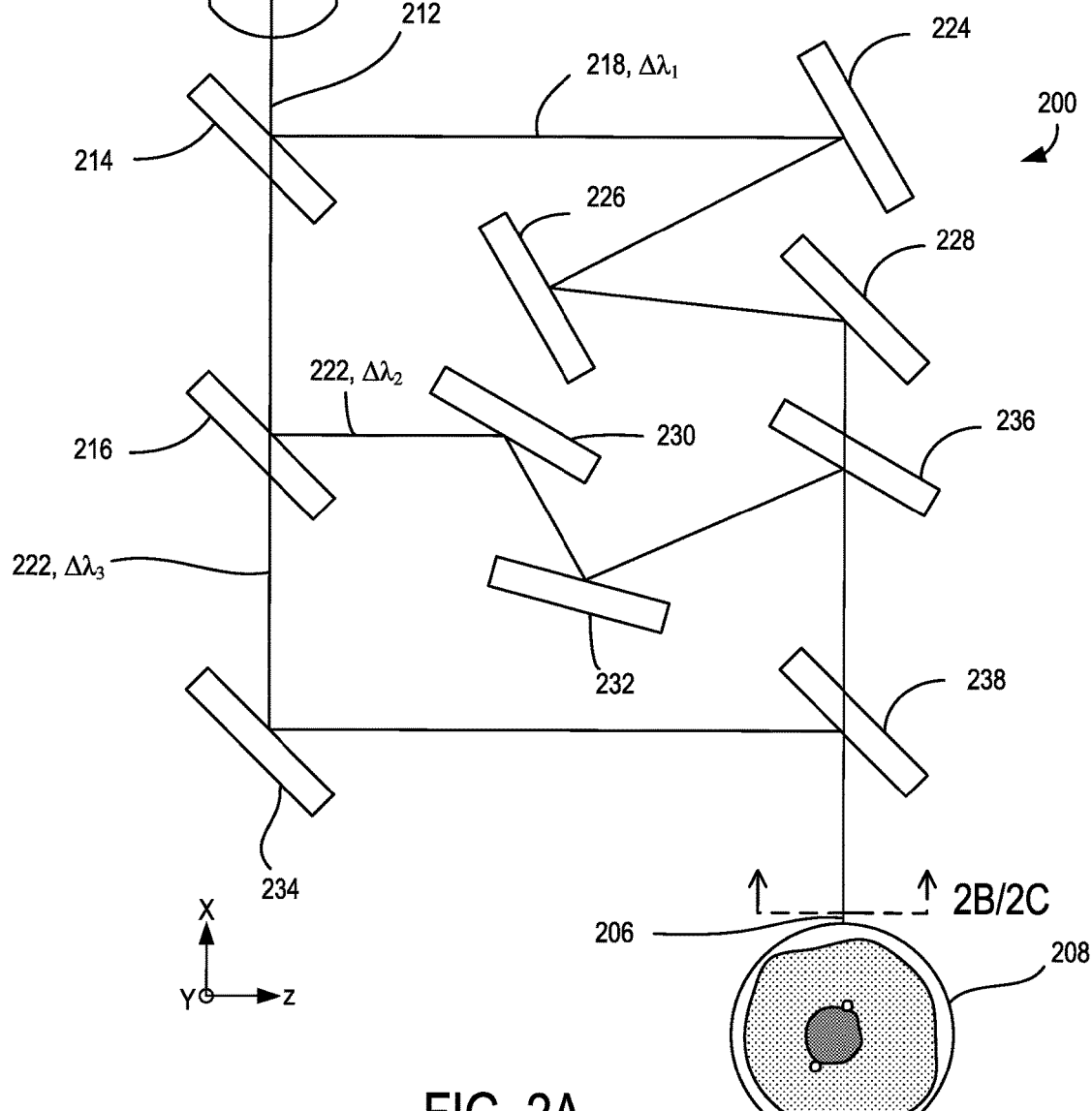
FIG. 2A is a schematic of an example multi-wavelength illumination source.
FIGS. 2B-2C are beam cross-sections of the multi-wavelength illumination beam shown in FIG. 2A.

FIG. 2A shows an example of a multi-wavelength illumination source 200 that includes a broadband laser device 202 (e.g., supercontinuum laser, white laser) situated to produce a multi-wavelength illumination beam 204, and to focus a shaped multi-wavelength illumination beam 206 at a flow cytometry target 208. The multi-wavelength illumination beam 206 can have a predetermined emitted or filtered wavelength range that is typically larger than monochromatic laser sources. Examples typically span a visible spectrum and can include ranges from about 350 nm to 1200 nm, 350 nm to 900 nm, though other ranges are possible. Ranges be selected based on expected optical scatter characteristics of the flow cytometry target 208. In representative embodiments, laser beams are focused to a waist size of 5-10 µm or smaller along one or more selected transverse dimensions, with Gaussian, Super Gaussian, transverse Gaussian Top-Hat, or other focused geometry, including asymmetric beam profiles or different profiles across perpendicular axes, and can provide a practical constraint on illumination wavelength based on the diffraction limit and focus depth and distance. Some example beam spots can have elliptical cross-sections rather than circular cross-sections, which can facilitate beam alignment. In particular elliptical beam examples, a height of a beam waist intersecting the flow cytometry target 208 (with the height corresponding to the direction of flow) can be in the range of 5-10 µm and a width of the beam waist (corresponding to the direction transverse to the flow) could range from 5-50 µm. A beam shaping optic 210, such as a lens (e.g., planoconvex, convex-convex, spherical, aspheric, achromatic, apochromatic, cylindrical, cross-cylindrical, etc.), mirror, or combination of lenses and mirrors, is situated to receive the multi-wavelength illumination beam 204 from the broadband laser device 202 and to reduce a divergence along one or more axes perpendicular to an optical axis 212 that corresponds to the direction of propagation of the multi-wavelength illumination beam 204. In typical examples, the beam shaping optic 210 (as well as beam shaping optics in other examples) can be optically coupled to the broadband laser device 202 with an optical fiber, though free space coupling through air, another medium, or additional elements is also possible. In representative examples, the beam shaping optic 210 is situated to focus the multi-wavelength illumination beam 204 having the associated predetermined wavelength range at the flow cytometry target 208 with a wavelength-based focus error along the optical axis 212 due to chromatic aberration of the beam shaping optic 210.

A plurality of dichroic optical elements 214, 216 (e.g., low-pass, high-pass, band-pass) are situated to receive the multi-wavelength illumination beam 204 that is being focused towards the flow cytometry target 208 and to separate the multi-wavelength illumination beam 204 into a plurality of respective illumination subbeams 218, 220, 222 having respective wavelength subbands $\Delta\lambda_1$, $\Delta\lambda_2$, $\Delta\lambda_3$ associated with the optical filtering characteristics of the dichroic optical elements 214, 216. A plurality of beam directors 224, 226, 228, 230, 232, 234 are situated to direct the illumination subbeams 218, 220, 222 to a plurality of dichroic optical elements 236, 238 that recombine the illumination beams 218, 220, 222 so as to overlap, as shown in cross-section in FIG. 2C, or so as to become adjacent and spaced apart in one or more selected directions, as shown in cross-section in FIG. 2B. In some examples, one or more of the beam directors 224, 226, 228, 230, 232, 234 and/or dichroic optical elements 214, 216, 236, 238 are angled or shaped to position the illumination subbeams 218, 220, 222 in an adjacent configuration. In some embodiments, the illumination subbeams 218, 220, 222 of the shaped multi-wavelength illumination beam 206 are incident to the flow cytometry target 208 at different angles.

The beam directors 224, 226, 228 are situated to vary an optical path length of the illumination subbeam 218 in relation to the optical path lengths of the illumination subbeams 220, 222 between the beam shaping optic 210 and the flow cytometry target 208, and the beam directors 230, 232 are situated to vary an optical path length of the illumination beam 220 in relation to the optical path lengths of the illumination beams 218, 222. The variation in the optical path lengths of the illumination beams 218, 220, 222 can be selected so that the focus error between the illumination beams 218, 220, 222 at the flow cytometry target 208 is reduced or minimized. It will be appreciated that while optical path length variations are shown with reflective elements, other elements, and numbers of elements, to vary path length can be used as well, including prisms. In some examples, one or more transmissive optical elements (e.g., a rectangular block of transparent material) can placed in the path of one or more of the illumination subbeams 218, 220, 222 to jog or displace a beam position to selectively increase the path length for respective illumination subbeam 218, 220, 222. In some examples, one or more of the dichroic optical elements 214, 216, 236, 238 or beam directors 224, 226, 228, 230, 232, 234 can have non-parallel opposing transmissive surfaces.

FIG. 3 shows another example of a multi-wavelength illumination source 300 that includes a broadband laser device 302 situated to produce a multi-wavelength illumination beam 304 (including, e.g., a fiber-coupled beam), and to focus a shaped multi-wavelength illumination beam 306 at a flow cytometry target 308, and can be similar or the same in some respects as the multi-wavelength illumination source 200. A beam shaping optic 310 is situated to receive the multi-wavelength illumination beam 304 from the broadband laser device 302 and to reduce a divergence along one or more axes perpendicular to an optical axis 312 that corresponds to the direction of propagation of the multi-wavelength illumination beam 304 so as to form a shaped beam 314. In some examples, the shaped beam 314 corresponds to a collimated beam, and in other examples a divergent or convergent beam can be produced. A plurality of dichroic optical elements 316, 318 are situated to receive the shaped beam 314 and to form illumination subbeams 320, 322, 324 having different respective wavelength subbands $\Delta\lambda_1$, $\Delta\lambda_2$, $\Delta\lambda_3$. Beam directors 325, 327 are situated to direct the respective illumination subbeams 320, 324, and an additional plurality of dichroic optical elements 326, 328 are situated to recombine the illumination subbeams 320, 322, 324, e.g., by overlapping, as shown in FIG. 3C, or in a spaced relationship, as shown in FIG. 3B, and to form the shaped multi-wavelength illumination beam that is focused at the flow cytometry target 308. A plurality of focusing optics 330, 332, 334 are situated to focus the respective illumination subbeams 320, 322, 324 at the target 308. Focus distances for the different illumination subbeams 320, 322, 324 can be adjusted by positioning the respective focusing optics 330, 332, 334 along respective subbeam axes 336, 338, 340 or varying optical characteristics such as focal length (or both), so that a focus error at the flow cytometry target 308 associated with chromatic aberration can be reduced or minimized. In some examples, the focusing distance for at least one of the illumination subbeams 320, 322, 324 can be provided by the beam shaping optic 310, i.e., without using one of the focusing optics 330, 332, 334.

Figure 4A:
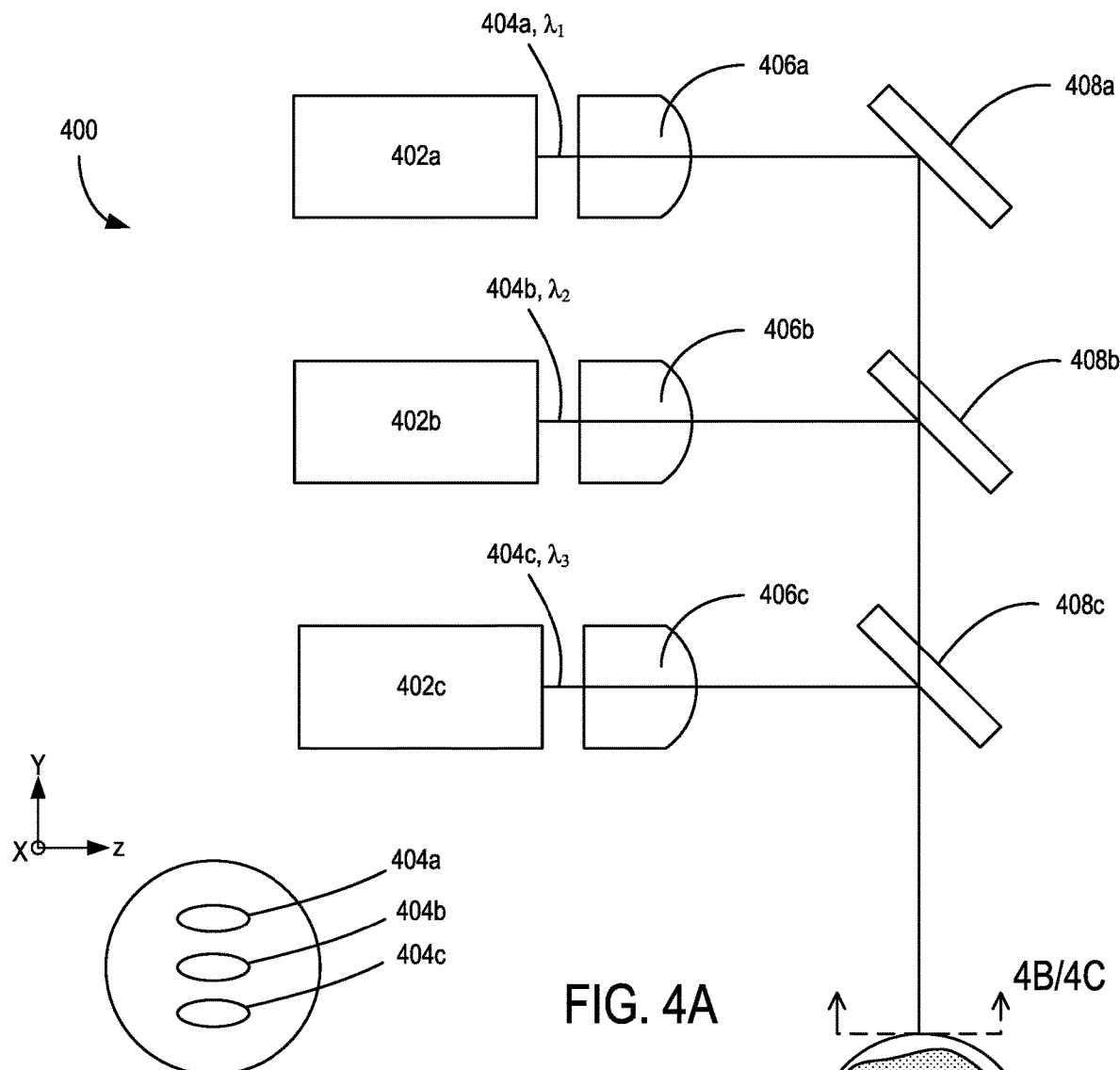
FIG. 4A is a schematic of another example of a multi-wavelength illumination source.
Figure 4B:
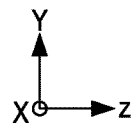
FIGS. 4B-4C are beam cross-sections of the multi-wavelength illumination beam shown in FIG. 4A.
Figure 4C:
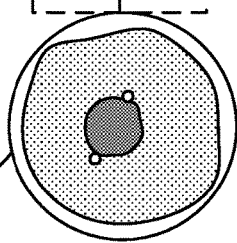

FIG. 4 shows an example of a multi-wavelength illumination source 400 that includes a plurality of monochromatic laser diodes 402a, 402b, 402c situated to emit respective laser beams 404a, 404b, 404c at different respective wavelengths $\lambda_1$, $\lambda_2$, $\lambda_3$. While generally termed 'monochromatic,' such sources typically emit beams in a narrow wavelength band relative to supercontinuum or broadband sources. In some examples, monochromatic laser beams can have a full-width half maximum, $1/e^2$, or other suitable wavelength band metric of 50 nm or less, 10 nm or less, 5 nm or less, 1 nm or less, or narrower. In flow cytometry applications, wavelength characteristics of monochromatic laser sources can be selected based on elastic or inelastic side or forward scatter or fluorescence characteristics of a flow cytometry object of interest. A plurality of beam shaping optics 406a, 406b, 406c are respectively coupled to the laser beams 404a, 404b, 404c (e.g., via free-space, optical fiber, etc.) so as to direct the laser beams 404a, 404b, 404c to respective reflective elements 408a, 408b, 408c. In some examples, the reflective element 408a is a reflector situated to direct the laser beam 404a along a beam direction 410, and the reflective elements 408b, 408c are dichroic optical elements situated to combine the laser beams 404a, 404b, 404c in the beam direction 410 so as to overlap (FIG. 4C) or become adjacently spaced in relation to each other (FIG. 4B) at a flow cytometry target 412.

In representative examples, the laser beams 404a, 404b, 404c are parallel to, or collinear in, the beam direction 410. In some embodiments, the dichroic filtering is configured such that $\lambda_1<\lambda_2<\lambda_3$, though other arrangements and filters can be selected. Chromatic focus errors associated with the beam shaping optics 406a, 406b, 406c (particularly when having identical characteristics) can be corrected so that each of the laser beams 404a, 404b, 404c can become focused at the flow cytometry target 412 in various ways. In some examples, respective optical path lengths for the laser beams 404a, 404b, 404c between the beam shaping optics 406a, 406b, 406c and the flow cytometry target 412 are adjusted to reduce focus error, such as by ordering the monochromatic laser diodes 402a, 402b, 402c with $\lambda_1<\lambda_2<\lambda_3$. For beam shaping optics 406a, 406b, 406c that are achromatic or apochromatic lenses, the positions of the laser diodes 402a, 402b, 402c can be reordered, and optical path lengths adjusted, according to the chromatic correction profile of the lenses. In some examples, the beam shaping optics 406a, 406b, 406c can have different positions along the optical axes of the respective laser beams 404a, 404b, 404c, and/or can have different focal lengths. In some examples, the beam shaping optics 406a, 406b, 406c can collimate the respective laser beams 404a, 404b, 404c and additional focusing optics, typically situated between the reflective element 408c and the flow cytometry target 412. In additional examples, the reflective elements 408b, 408c are reflectors with sufficient clearance in the y-direction to receive the focusing or collimated laser beam 404a, 404b without clipping the propagating beams.

Figure 5:
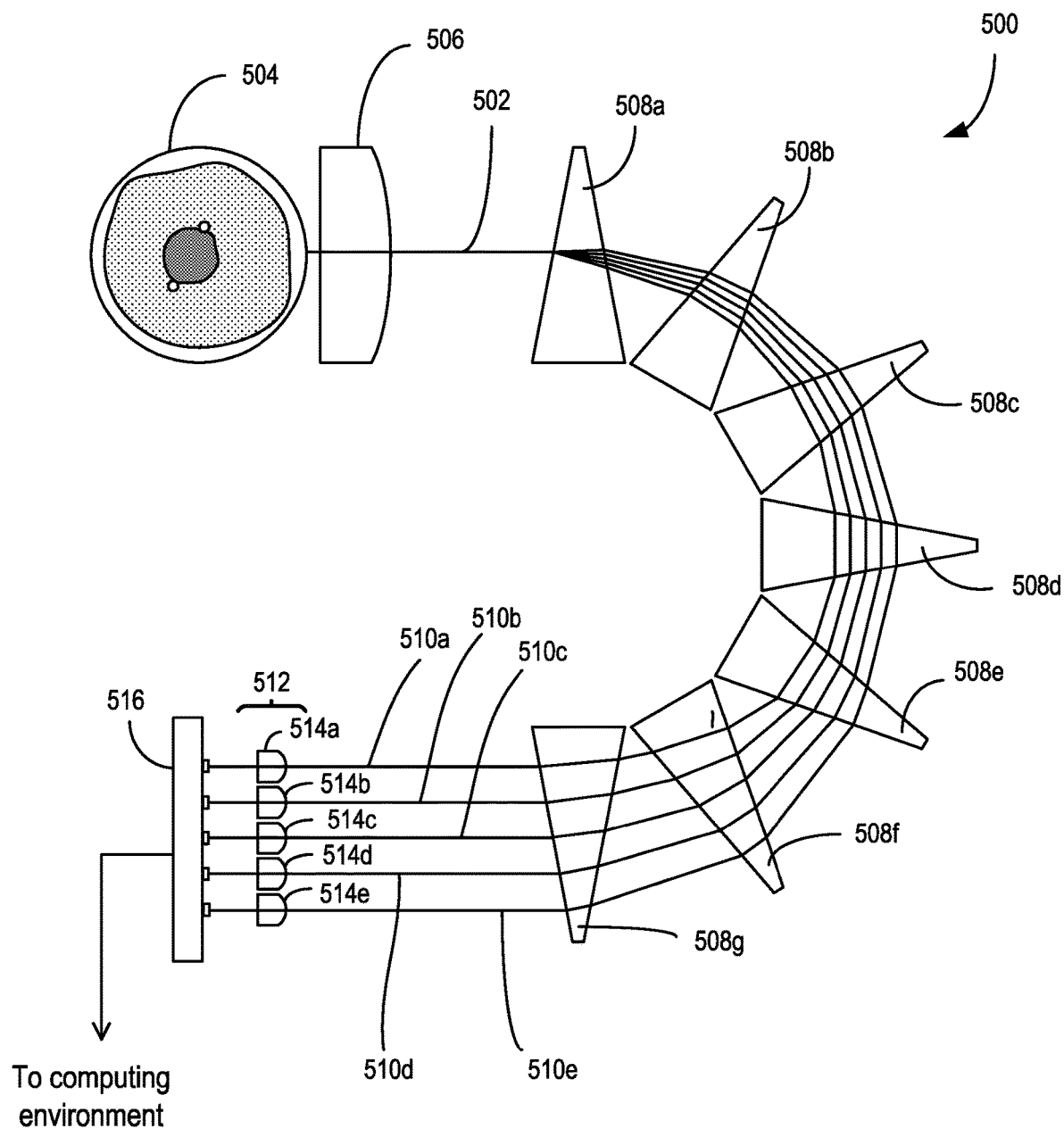
FIG. 5 is a schematic of an example multi-wavelength side scatter detection system.

FIG. 5 shows an example side-scatter detection system 500 situated to detect a multi-wavelength detection beam 502 that is elastically scattered by a flow cytometry target 504. The side-scatter detection system 500 includes collection optics 506, such as a high numerical aperture lens (e.g., 1.2) that can be gel-coupled to the flow cytometry target 504 or coupled with another suitable immersion material. In some examples, the collection optics 506 can be color corrected. A plurality of wedge prisms 508a-508g are situated to receive and spatially separate the multi-wavelength detection beam 502 into a plurality detection subbeams 510a-510e in the order of increasing (or decreasing) wavelength. A microlens array 512 includes a plurality of microlenses 514a-514e situated to focus the respective detection subbeams 510a-510e to a detector bank 516 of respective photomultiplier tubes, avalanche photodiodes, or other suitable optical detectors.

Figure 6:
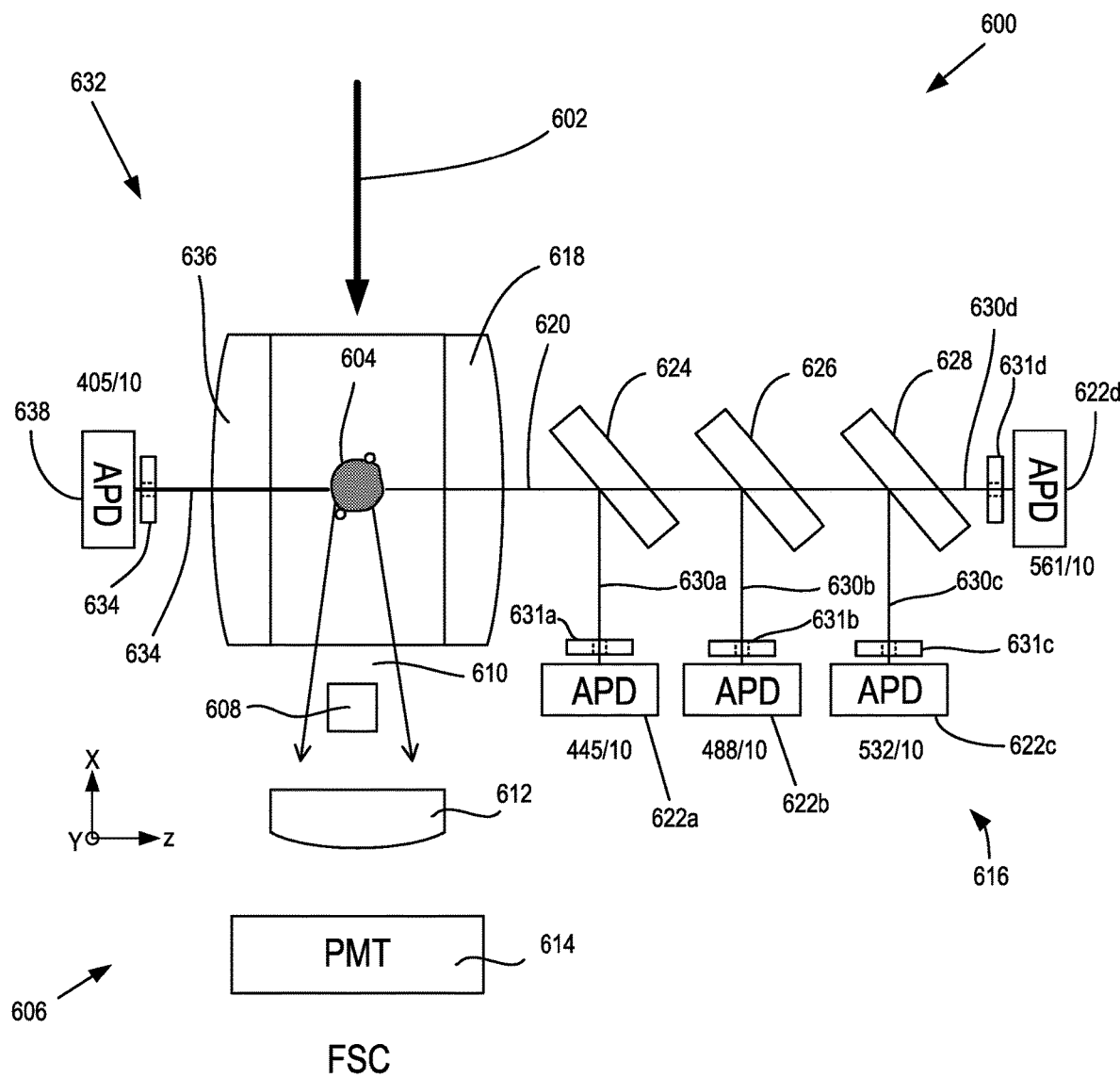
FIG. 6 is a schematic of a microfluidic detection system.

FIG. 6 shows an example of a detection system 600 that is situated to detect light from a multi-wavelength illumination beam 602 that is scattered by a flow cytometry target 604 that is flowing into or out of the plane of FIG. 6. A forward scatter detection system 606 includes an obscuration bar 608 situated to block a center portion of an incident forward scatter beam 610. Collection optics 612 are situated to collect and direct the forward scatter beam 610 to a photomultiplier tube 614 or other suitable optical detector. A side scatter detection system 616 includes collection optics 618, such as a high numerical aperture lens, with or without color correction, that are situated to collect and direct and focus a multi-wavelength detection beam 620 to a target plane to wavelength specific optical detectors 622a-622d, such as avalanche photodiodes.

A plurality of dichroic optical elements 624, 626, 628 are situated to separate the multi-wavelength detection beam 620 into a plurality of detection subbeams 630a-630d according to different wavelength. In one example, the optical detectors 622a-622d are situated to detect wavelengths centered at 445 nm, 488 nm, 532 nm, and 561 nm, respectively, each with, e.g., a 10 nm bandpass filter to narrow the wavelength range of light of the detection subbeams 630a-630d that is accepted by the respective optical detectors 622a-622d. In representative examples, the detection subbeams 630a-630d are selectively focused with the collection optics 618 to a target plane, and the dichroic optical elements 624, 626, 628 and respective optical detectors 622a-622d are selectively spaced apart to provide optical path length differences that correct for focus errors associated with the wavelength differences of the detection subbeams 630a-630d, such that the detection subbeams 630a-630d are received at focus. As shown, the optical path lengths between the collection optics 618 and the optical detectors 622a-622d increase with increasing wavelength to be detected. In some examples, different spatial ordering of the optical detectors 622a-622d can be selected based on a chromatic delta-focus profile associated with collection optics 618, and distances between the dichroic optical elements, band pass filters, and optical detectors can be selected based on the delta-focus of the high numerical aperture lens. In some examples, one or more optical image filtration apertures 631a-631d situated to image filter the respective the incident detection subbeams 630a-630d, and can be positioned in various locations, including proximate the optical detectors 622a-622d or the dichroic optical elements 624, 626, 628. In one example, a single aperture can be positioned between the collection optics 618 and the dichroic optical element 624.

In further examples, selected wavelengths of the multi-wavelength detection beam 620 can be detected with a separate side scatter detection system 632 that is situated to receive a separate multi-wavelength detection beam 634 directed opposite the multi-wavelength detection beam 620. The side scatter detection system 632 includes another set of collection optics 636 situated to collect and direct the multi-wavelength detection beam 634 to one or more optical detectors, such as avalanche photodiodes. Depending on the configuration, an arrangement of dichroic optical elements can be used to separate the multi-wavelength detection beam 634 into a plurality of subbeams to be detected. In one example, a single wavelength (at 405 nm) of the multi-wavelength detection beam 634 is detected with a corresponding optical detector 638, such as an avalanche photodiode. In some examples, an optical image filtration aperture 639 is situated between the collection optics 636 and the optical detector 638 so as to optically image filter the multi-wavelength detection beam 634. In some examples, selected subbeam wavelengths of the multi-wavelength detection beam 634 are detected with the side scatter detection system 632 rather than the side scatter detection system 620 based on space constraints associated with positioning an additional optical detector and dichroic optical element pair in relation to the optical detectors 622a-622d (such as between the collection optics 618 and the dichroic optical element 624 or between adjacent detectors) and/or an associated chromatic delta focus of the selected subbeam wavelength. For example, a large variation in a delta-focus for a particular wavelength (such as UV) can be detected with the side scatter detection system 632 rather than the side scatter detection system 616. In some examples, a chromatic delta focus profile of the collection optics 618, including achromatic or apochromatic profiles, can cause selected wavelengths that are relatively spaced apart in wavelength to have a relatively close delta focus.

Figure 7:
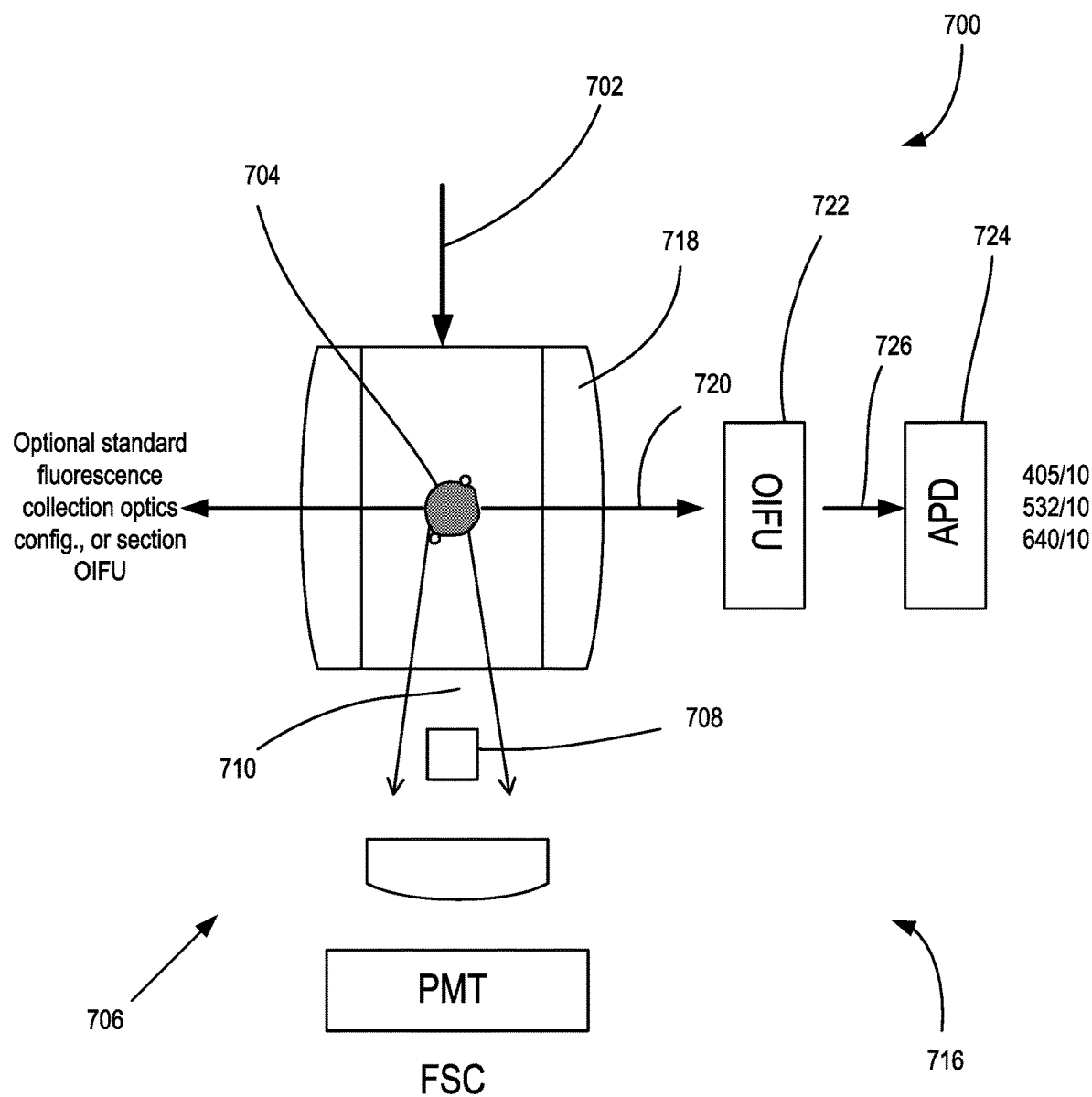
FIG. 7 is a schematic of another microfluidic detection system.

In FIG. 7, show an example of a detection system 700 that is situated to detect light from a multi-wavelength illumination beam 702 that is scattered by a flow cytometry target 704 that is flowing into or out of the plane of FIG. 7. A forward scatter detection system 706 includes an obscuration bar 708 situated to block a center portion of an incident forward scatter beam 710. Collection optics 712 are situated to collect and direct the forward scatter beam 710 to a photomultiplier tube 714 or other suitable optical detector. A side scatter detection system 716 includes collection optics 718, such as a high numerical aperture lens, that are situated to collect and direct a multi-wavelength detection beam 720 to an optical image filtration unit 722 and wavelength specific optical detectors 724, such as avalanche photodiodes. In some examples, the high numerical aperture lens can be color corrected. The optical image filtration unit 722 can include a plurality of optical filters for receiving and filtering adjacent incident scatter beams of the multi-wavelength detection beam 720, and the optical image filtration unit 722 can optically couple the filtered side-scatter beams into optical fibers 726 that direct the coupled beams to the respective wavelength specific optical detectors 724.

Figure 8A:
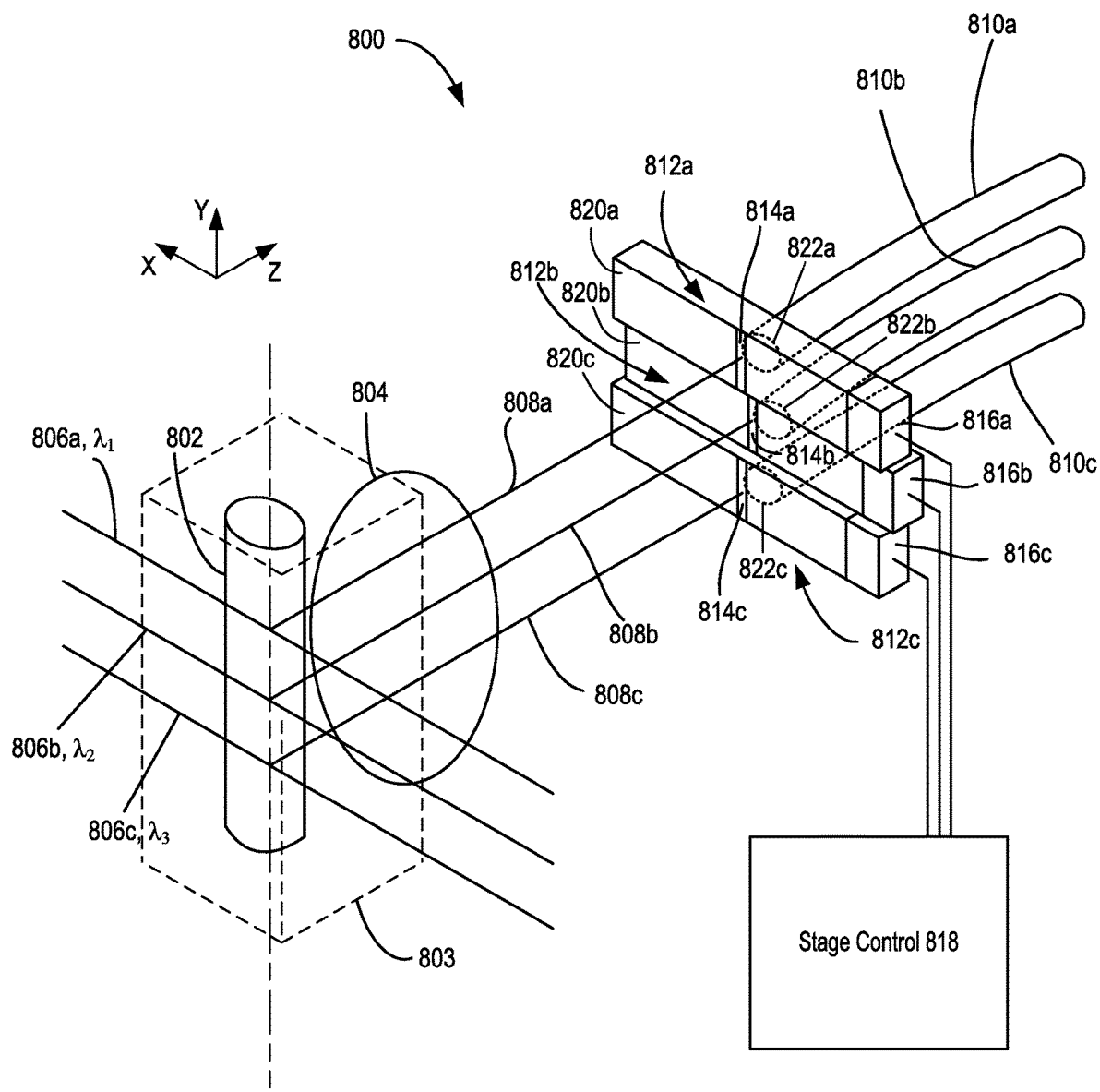
FIG. 8A is a perspective schematic of an optical image filtration unit.

FIG. 8A shows an example of an optical image filtration unit 800 that is optically coupled to a flow cytometry target 802 with collection optics 804, such as a color-corrected multi-element high numerical aperture lens. Some embodiments of the optical image filtration unit 722 can include the optical image filtration unit 800. In representative examples, the flow cytometry target 802 propagates in a flow cell 803 and the collection optics 804 are gel-coupled to the flow cell 803 to receive light. A plurality of laser beams 806a, 806b, 806c with different respective wavelengths $\lambda_1, \lambda_2, \lambda_3$ form a multi-wavelength illumination beam and are directed at the flow cytometry target 802, typically in parallel, and such that respective beam foci of the laser beams 806a-806c are situated at or near the flow cytometry target 802. The collection optics 804 collect elastic side-scatter light at the respective wavelengths of the laser beams 806a-806c and form and direct respective detection beams 808a, 808b, 808c to a plurality of respective optical fibers 810a, 810b, 810c. The optical fibers 810a-810c include respective first ends 812a, 812b, 812c that include respective apertures 814a, 814b, 814c situated to respectively receive the focused detection beams 808a-808c. Respective opposite ends of the optical fibers 810a-810c can be optically coupled to respective optical detectors, such as avalanche photodiodes. In some examples, the optical image filtration unit 800 can be used as a modular add-on device for a conventional flow cytometer on an opposite side of a flow cytometer's flow cell fluorescence/scatter collection optics.

In additional examples, the optical image filtration unit 800 can be used to increase resolution of a specific fluorophores per laser on a high resolution instrument. The optical image filtration unit 800 can increase a signal to noise ratio for detection at specific wavelengths. Alignment of the optical infiltration unit 800 with selected wavelengths, including side-scatter and peak emission wavelength of a fluorophore, can allow an increase in signal to noise ratio at the selected wavelength. Conventional fluorescence cytometers are typically optimized to detect several colors of fluorescence and therefore have a reduced signal to noise ratio for signals that are not at optimum foci for selected wavelengths, as the reduction in collection angle at the selected wavelengths reduces the amount of light that reaches a detector. Additionally, conventional flow cytometers do not detect side scatter on multiple channels, as typical size-granularity comparisons between forward scatter and side scatter can be achieved on a single channel.

Figure 8B:
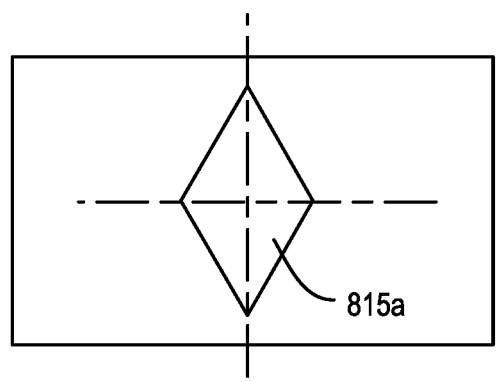
FIGS. 8B-8D show different aperture geometries.
Figure 8C:
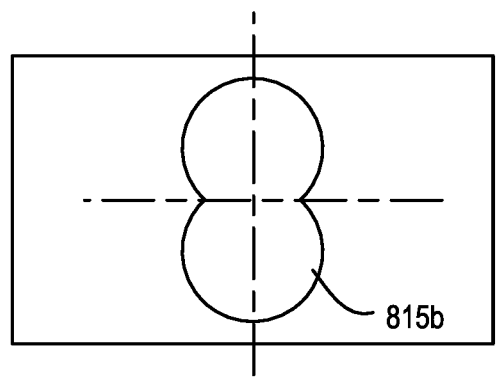
Figure 8D:
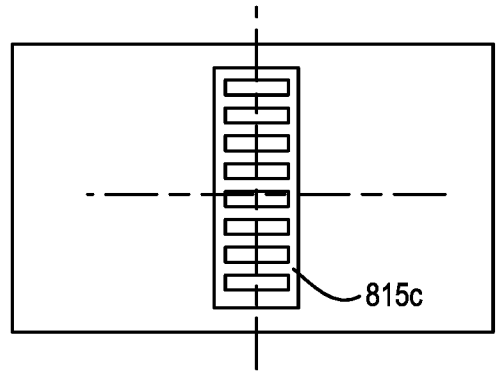

The apertures 814a-814c can be circular in some examples, and can also be formed as slits with the longer dimension of the slit extending parallel to the movement direction of the flow cytometry target 802. FIGS. 8B-8D show additional examples of apertures 815a, 815b, 815c. Vertical axes 817a, 817b, 817c can correspond to the movement direction of the flow cytometry target 802. In some embodiments, different aperture geometries can be selected, including between different selected wavelengths, based on characteristic signatures for different wavelengths (and the corresponding scattering particles). In some examples, the geometry is selected based on a reduction of selected Mie resonances associated with other particles or scatter wavelengths. Aperture geometry selection can assist with spectral deconvolution or improve the scatter-diameter relationship in discriminating the existence of nanoparticles or between types of nanoparticles. In some examples, the selected aperture geometry need not be symmetric across one or more axes.

In different examples, slit or circular apertures widths (diameters) can extend 50 μm or smaller, 100 μm or smaller, 200 μm or smaller, 300 μm or smaller, or 500 μm or smaller, and aperture dimensions can be defined in relation to the image size of the focused laser beams 806a-806c, the waveguide dimensions of the optical fibers 810a-810c, and the numerical aperture of the optical fibers 810a-810c which can be smaller than the numerical aperture of the collection optics 804. Other dimensions are possible, however narrower slit dimensions in relation to image size of the focused laser beams 806a-806c can provide improved filtration of optical noise, including light at the wavelength of an incident detection subbeam, such as detection beam 808a, that is associated with background noise. Background noise can include light associated with a ring of diffraction that extends around the flow cytometry target 802 and in the plane formed by the incident detection beam 808a and a corresponding illumination beam, such as laser beam 806a, incident to the flow cytometry target 802.

In some examples, the first ends 812a-812c are coupled to respective translation stages 816a, 816b, 816c that are coupled to a stage control 818 and situated to respectively translate the first ends 812a-812c along one or more directions, including the along the direction (e.g., z-axis as shown in FIG. 8A) of the incident detection beams 808a-808c. The independent translation can provide small adjustments that can allow the respective first ends 812a-812c to be spaced apart from each other along the direction of the incident detection beams 808a-808c to correct for a focusing distance variation between the detection beams 808a-808c that is associated with a chromatic delta focus profile of the collection optics 804. In some examples, the translation stages 816a-816c are situated to respectively translate the first ends 812a-812c along a lateral direction (e.g., x-axis as shown in FIG. 8A) that is generally perpendicular to the propagation direction of the incident detection beams 808a-808c and the flow direction of the flow cytometry target 802.

In some embodiments, the apertures 814a-814c are situated on respective optical blocks 820a, 820b, 820c that are optically coupled to endfaces 822a, 822b, 822c of the optical fibers 810a-810c, e.g., by receiving endfaces 822a-822c via insertion, by being optically fused together, by being spaced apart in air or another medium, or in other ways as convenient. Example materials for optical blocks 820a-820c can include metals, such as anodized aluminum. In some examples, the areas of the optical blocks 820a-820c adjacent to the apertures 814a-814c are optically absorptive (typically broadly) and non-fluorescent so as reduce incident or reflected stray light that could otherwise become optically coupled into one or more of the optical fibers 810a-810c and degrade signal quality. In additional embodiments, the apertures 814a-814c are defined on the respective endfaces 822a-822c of the optical fibers based on waveguide geometry (e.g., a circular core or rectangular slit-shaped core) or selective reflectivity coating application that corresponds to a selected aperture shape.

Figure 9:
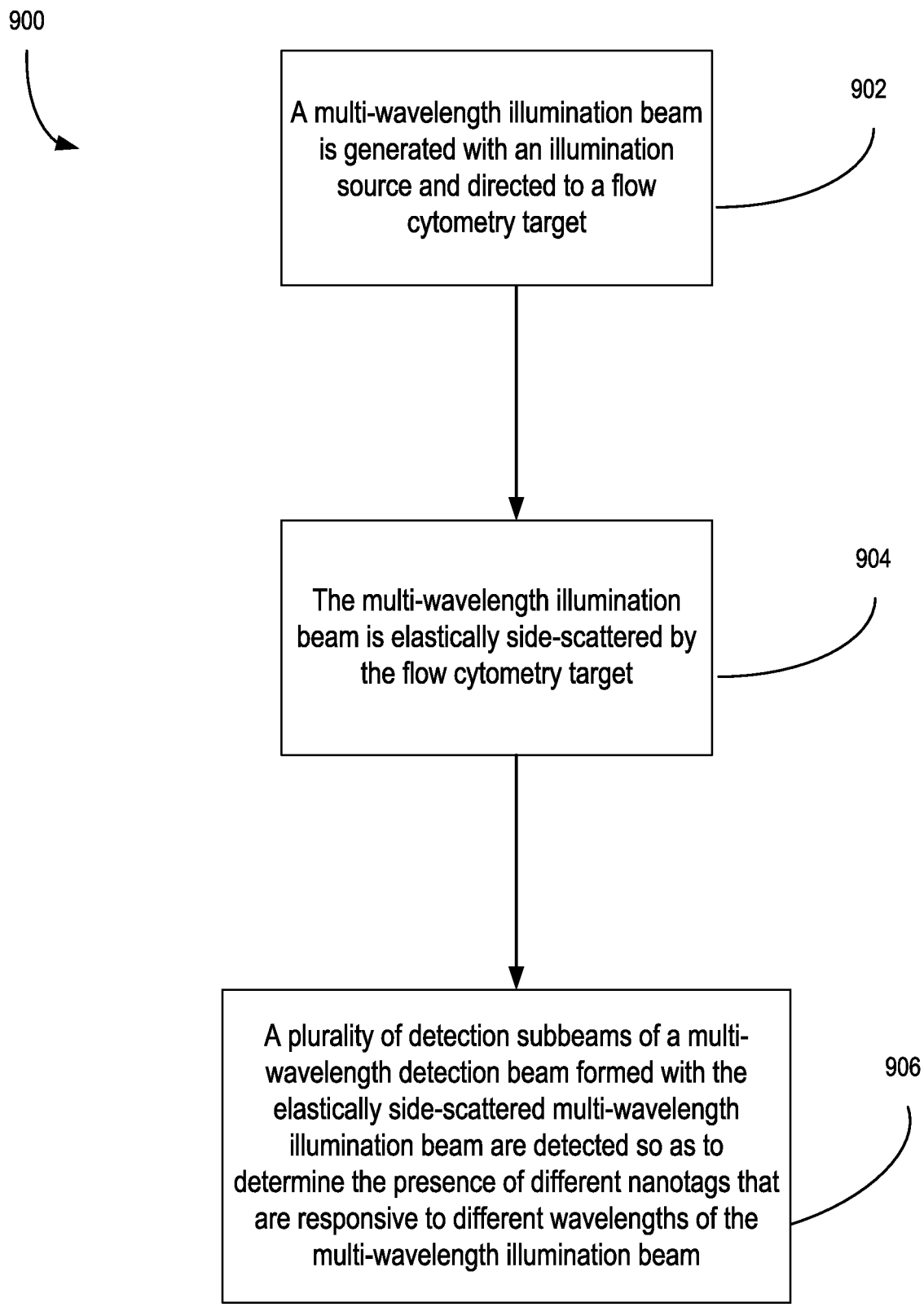
FIGS. 9-13 are flowcharts of multi-wavelength microfluidic flow cytometry methods.

FIG. 9 shows an example of a method 900 of nanotag detection in flow cytometry. At 902, a multi-wavelength illumination beam is generated with an illumination source and directed to a flow cytometry target. At 904, the multi-wavelength illumination beam is elastically side-scattered by the flow cytometry target, and, at 906, a plurality of detection subbeams of a multi-wavelength detection beam formed with the elastically side-scattered multi-wavelength illumination beam are detected so as to determine the presence of different nanotags that are responsive to different wavelengths of the multi-wavelength illumination beam.

Figure 10:
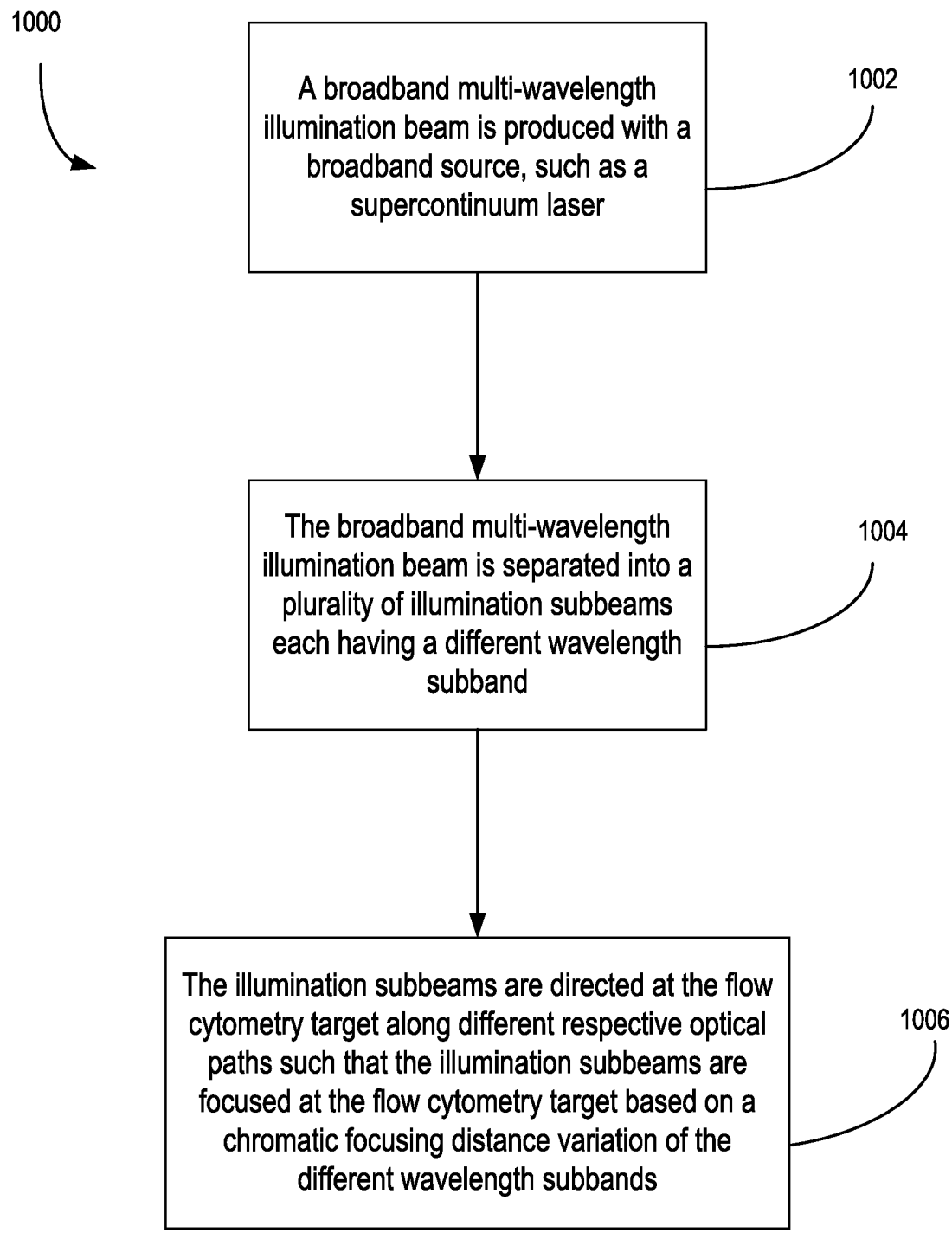

FIG. 10 shows an example of a method 1000 of combining a multi-wavelength illumination beam to be directed at a flow cytometry target. At 1002, a broadband multi-wavelength illumination beam is produced with a broadband source, such as a supercontinuum laser. At 1004, the broadband multi-wavelength illumination beam is separated into a plurality of illumination subbeams each having a different wavelength subband. At 1006, the illumination subbeams are directed at the flow cytometry target along different respective optical paths such that the illumination subbeams are focused at the flow cytometry target based on a chromatic focusing distance variation of the different wavelength subbands. In some examples, the broadband multi-wavelength illumination beam and separate illumination subbeams can be produce an elastic scattering in a flow cytometry target that produces a multi-wavelength detection beam. The multi-wavelength detection beam can be detected by separating the multi-wavelength detection beam with a prism arrangement into a plurality of detection subbeams separated according to wavelength. The detection subbeams can be received with a microlens array having respective microlenses situated to respectively focus the detection subbeams, and the detection subbeams can be focused with the microlenses to respective detector channels of an optical detector.

Figure 11:
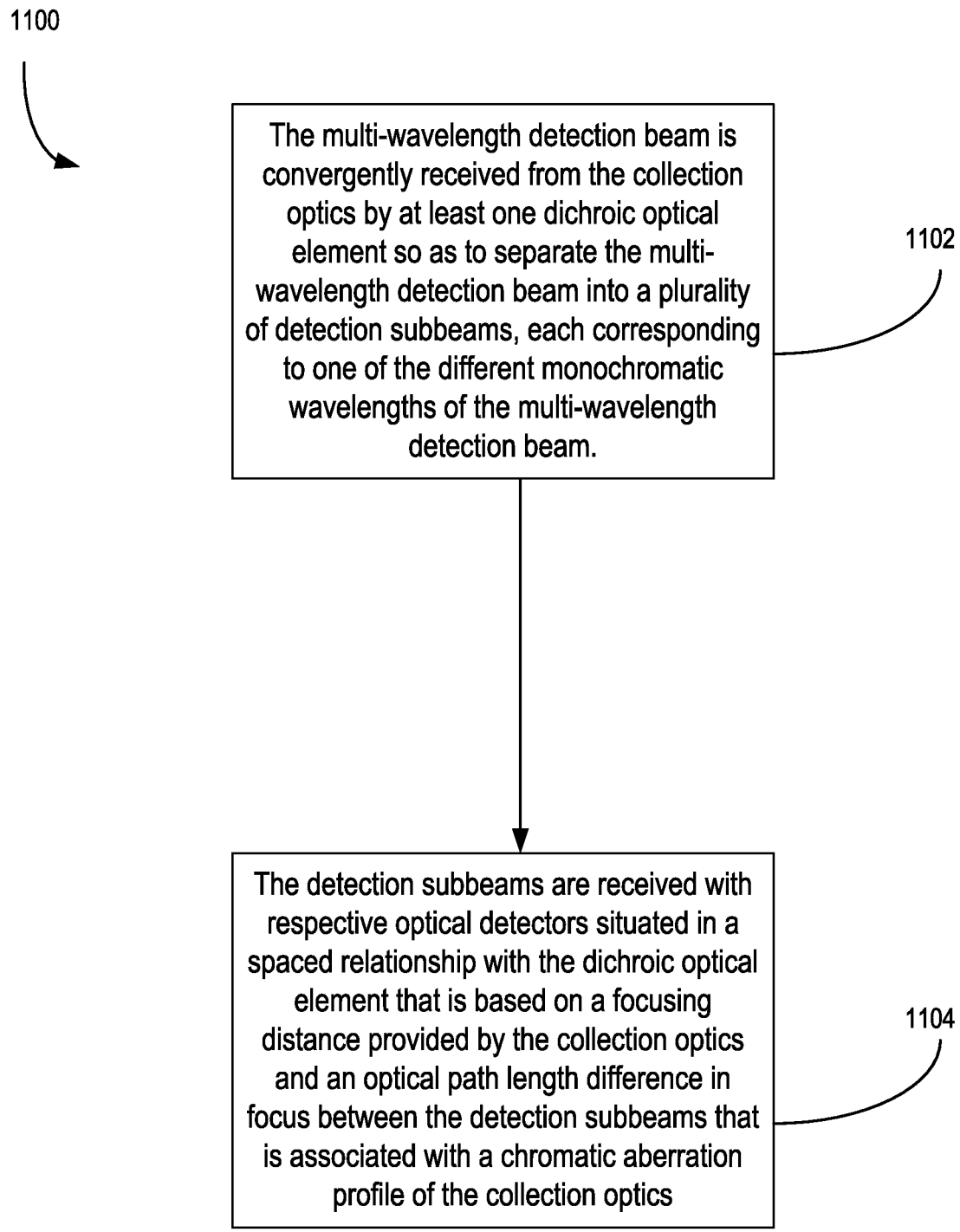

FIG. 11 shows an example of a method 1100 of detecting a multi-wavelength detection beam that is formed with a multi-wavelength illumination beam comprising a plurality of monochromatic laser beams that are spatially adjacent, collinear, or focused to a common location of a flow cytometry target. In representative examples, collection optics are optically coupled to the flow cytometry target. At 1102, the multi-wavelength detection beam is convergently received from the collection optics by at least one dichroic optical element so as to separate the multi-wavelength detection beam into a plurality of detection subbeams, each corresponding to one of the different monochromatic wavelengths of the multi-wavelength detection beam. At 1104, the detection subbeams are received with respective optical detectors situated in a spaced relationship with the dichroic optical element that is based on a focusing distance provided by the collection optics and an optical path length difference in focus between the detection subbeams that is associated with a chromatic aberration profile of the collection optics.

Figure 12:
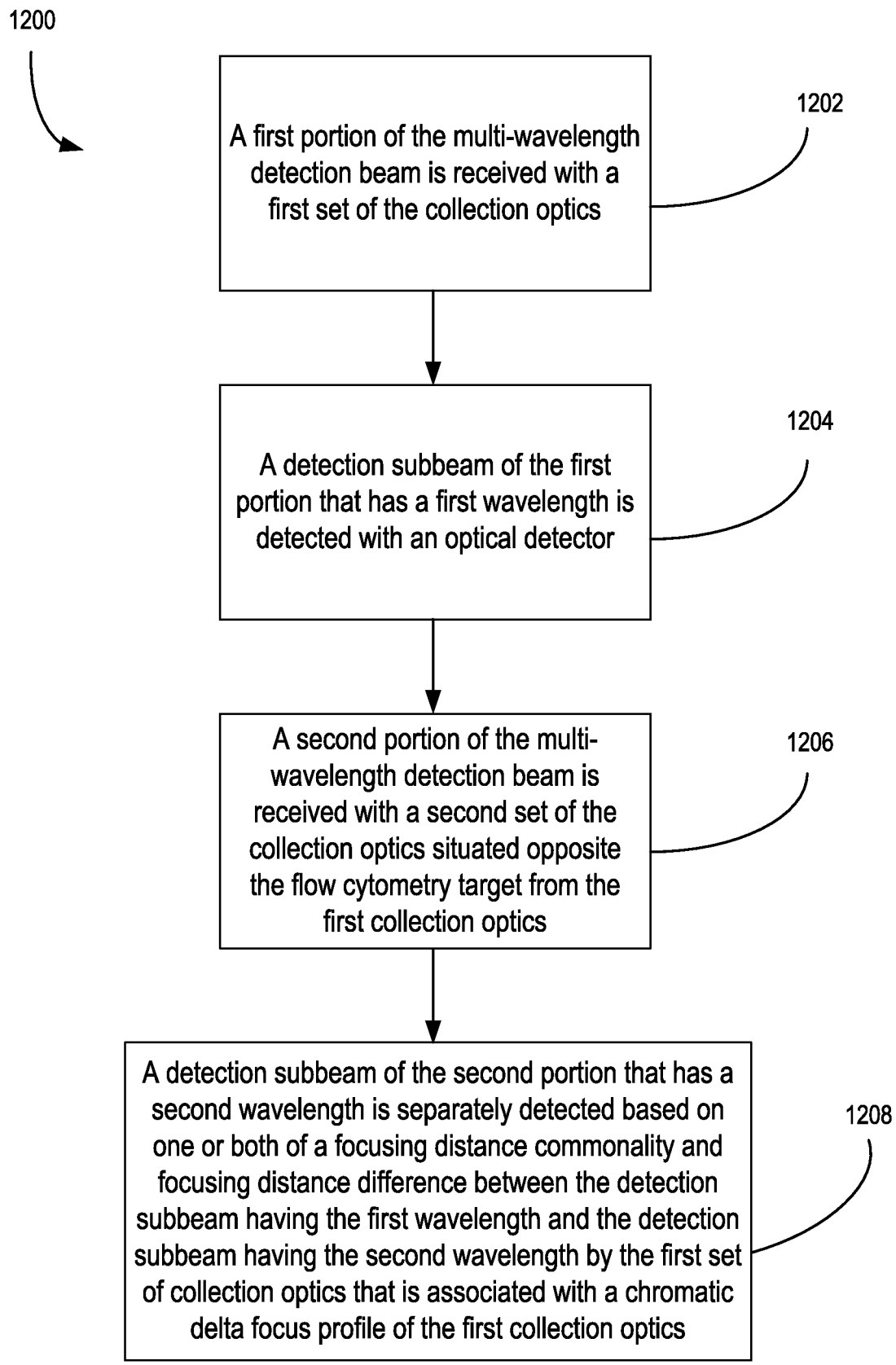

FIG. 12 shows an example of a method 1200 of detecting a multi-wavelength detection beam on opposite sides of a flow cytometry target and perpendicular to the flow. At 1202, a first portion of the multi-wavelength detection beam is received with a first set of the collection optics. At 1204, a detection subbeam of the first portion that has a first wavelength is detected with an optical detector. At 1206, a second portion of the multi-wavelength detection beam is received with a second set of the collection optics situated opposite the flow cytometry target from the first collection optics. At 1208, a detection subbeam of the second portion that has a second wavelength is separately detected based on one or both of a focusing distance commonality and focusing distance difference between the detection subbeam having the first wavelength and the detection subbeam having the second wavelength by the first set of collection optics that is associated with a chromatic delta focus profile of the first collection optics.

Figure 13:
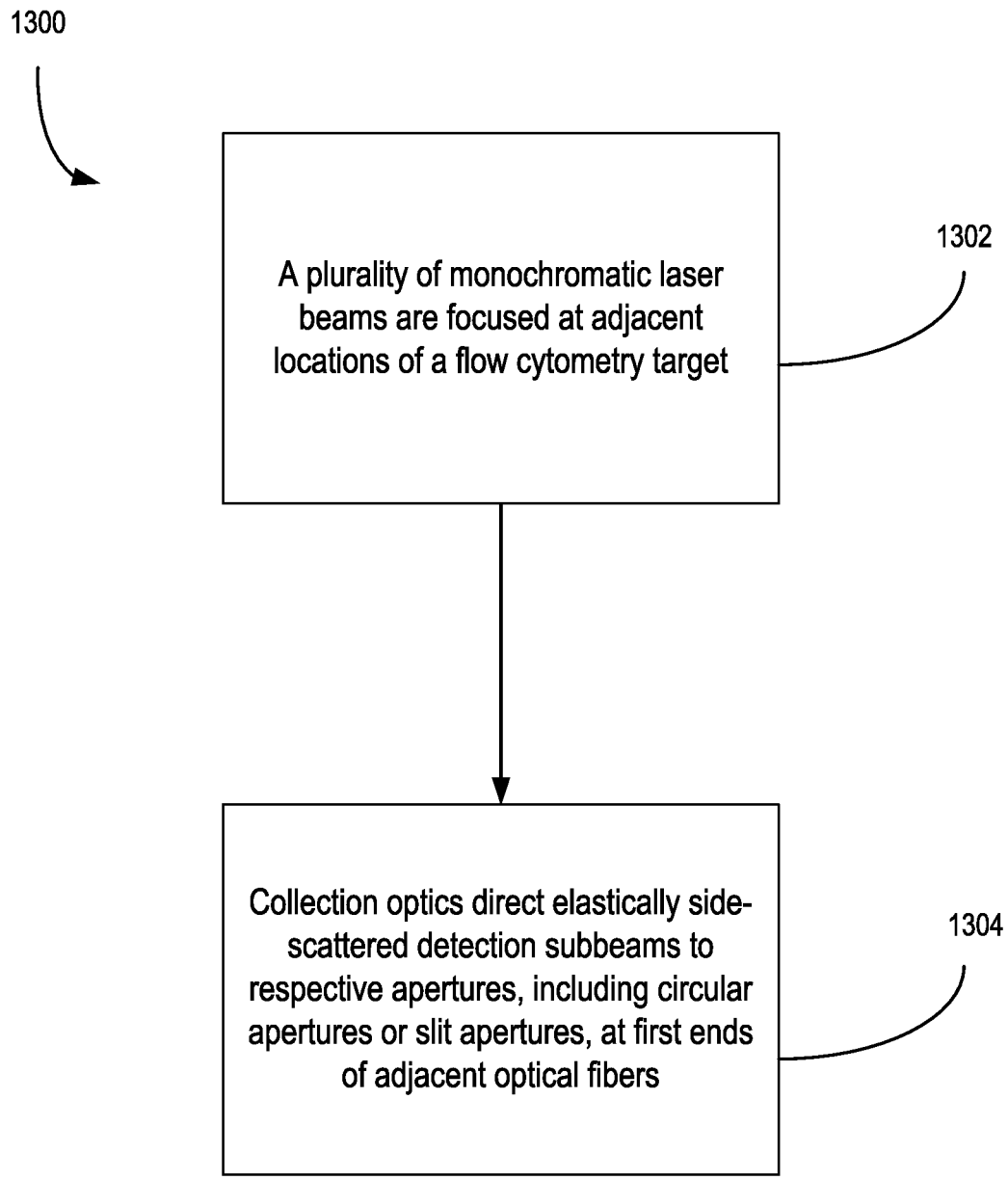

FIG. 13 shows an example of a method 1300 of detecting a multi-wavelength detection beam that is received from a flow cytometry target with an optical image filtration unit. At 1302 a plurality of monochromatic laser beams are focused at adjacent locations of a flow cytometry target. At 1304, collection optics direct elastically side-scattered detection subbeams to respective apertures, including circular apertures or slit apertures, at first ends of adjacent optical fibers. In representative examples, the apertures are spaced apart in relation to each other along a common propagation direction of the subbeams based on a focusing distance variation between the detection subbeams that is associated with a chromatic delta focus profile of the collection optics.

Figure 14:
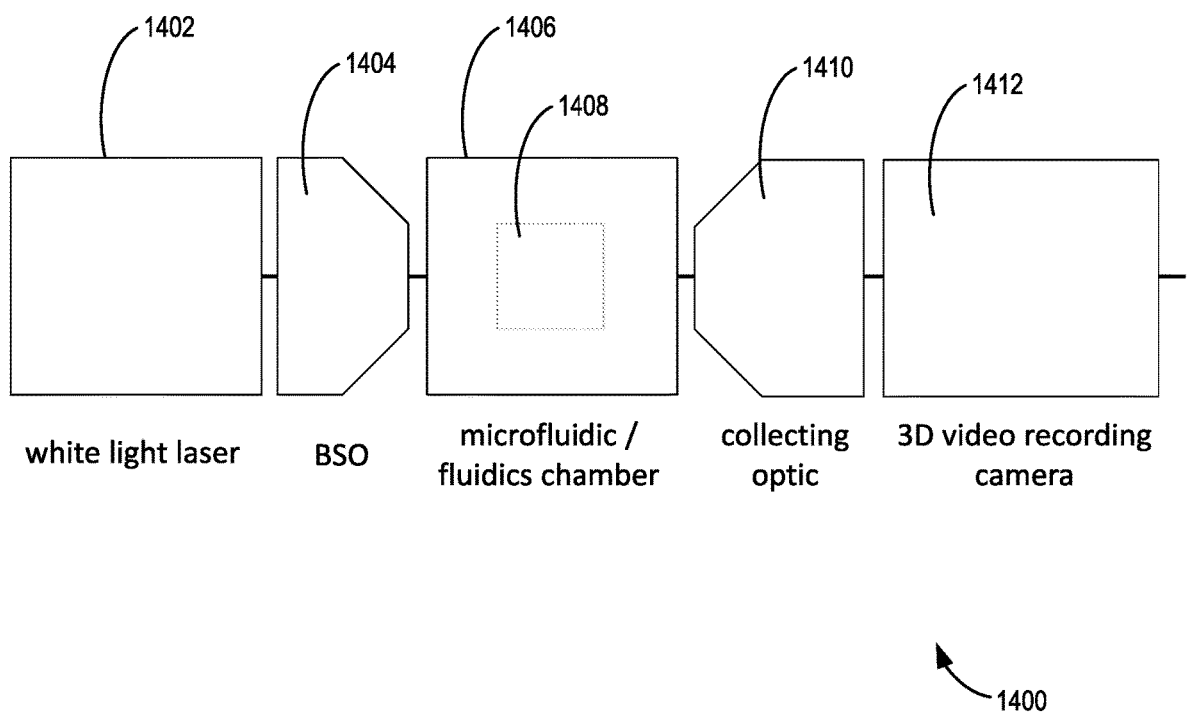
FIG. 14 shows an example microfluidic apparatus.
Figure 15A:
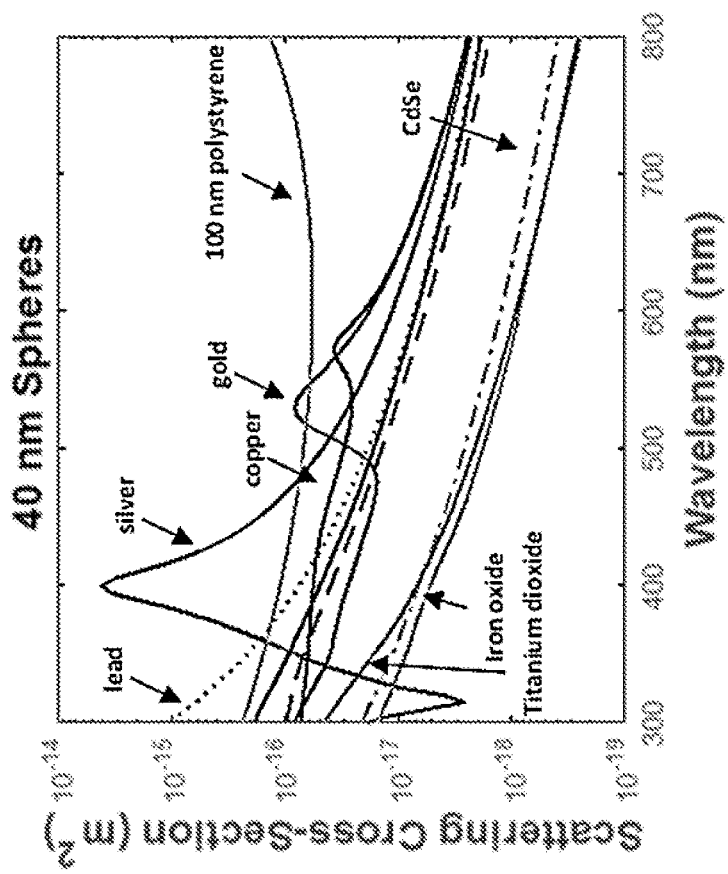
FIGS. 15A-15D show graphs of Mie scatter materials for various nanospheres at selected diameters.
Figure 15B:
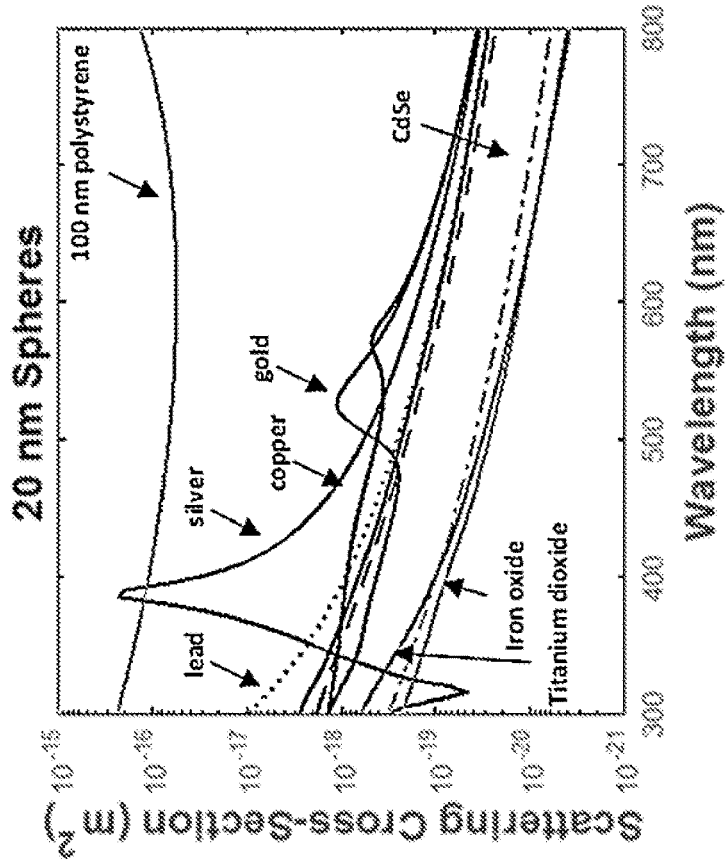
Figure 15D:
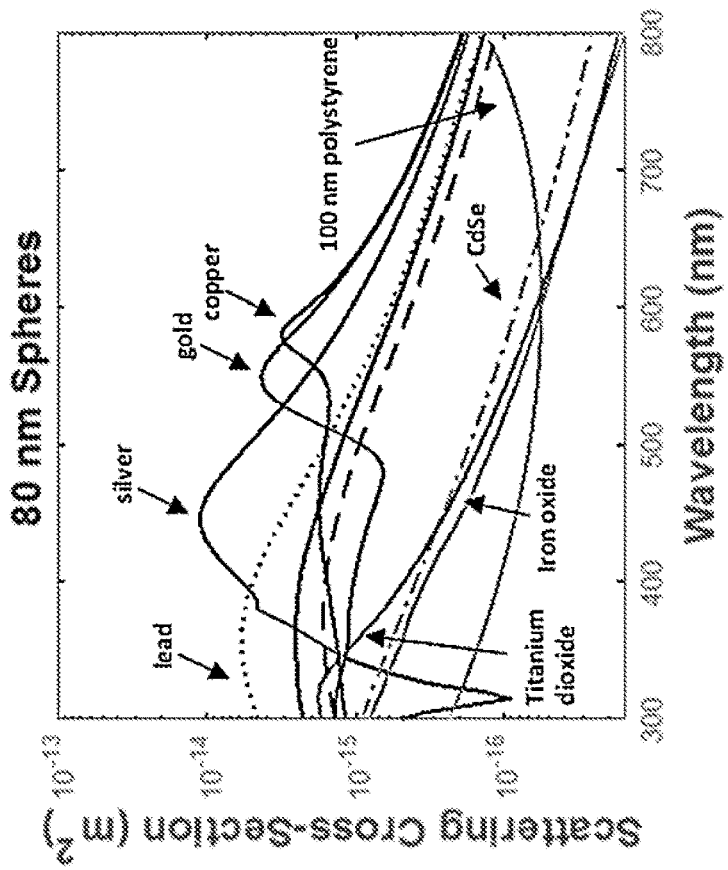
Figure 15C:
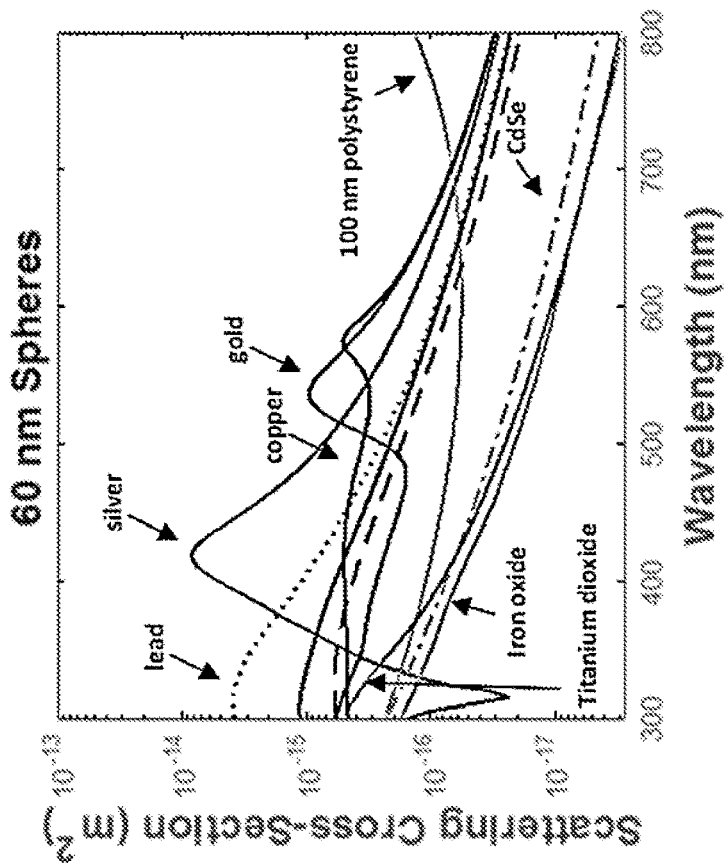

FIG. 14 shows an example of a configuration of a microfluidics device 1400 that is situated to detect elastic scattering or quasi-elastic scattering, at a plurality of wavelengths, including a continuous range of wavelengths. In some examples, a supercontinuum white laser 1402, or alternate types of multiwavelength illumination, including a plurality of monochromatic lasers or broadband sources, is optically coupled to a beam shaping optic 1404, which is optically coupled to an interrogation chamber 1406 of a microfluidic or other fluidic device wherein a sample 1408 is suspended. Quasi-elastic particle scatter from the illuminated sample 1408 is coupled with one or a series of collection optics 1410 before recording with a video recording device 1412. In representative examples, the video recording device 1412 is a 3-D high resolution, high-sensitivity, high frame rate, light field color recording device.

Example 1: Spectral Properties of Nanotag Compositions

Figure 23:
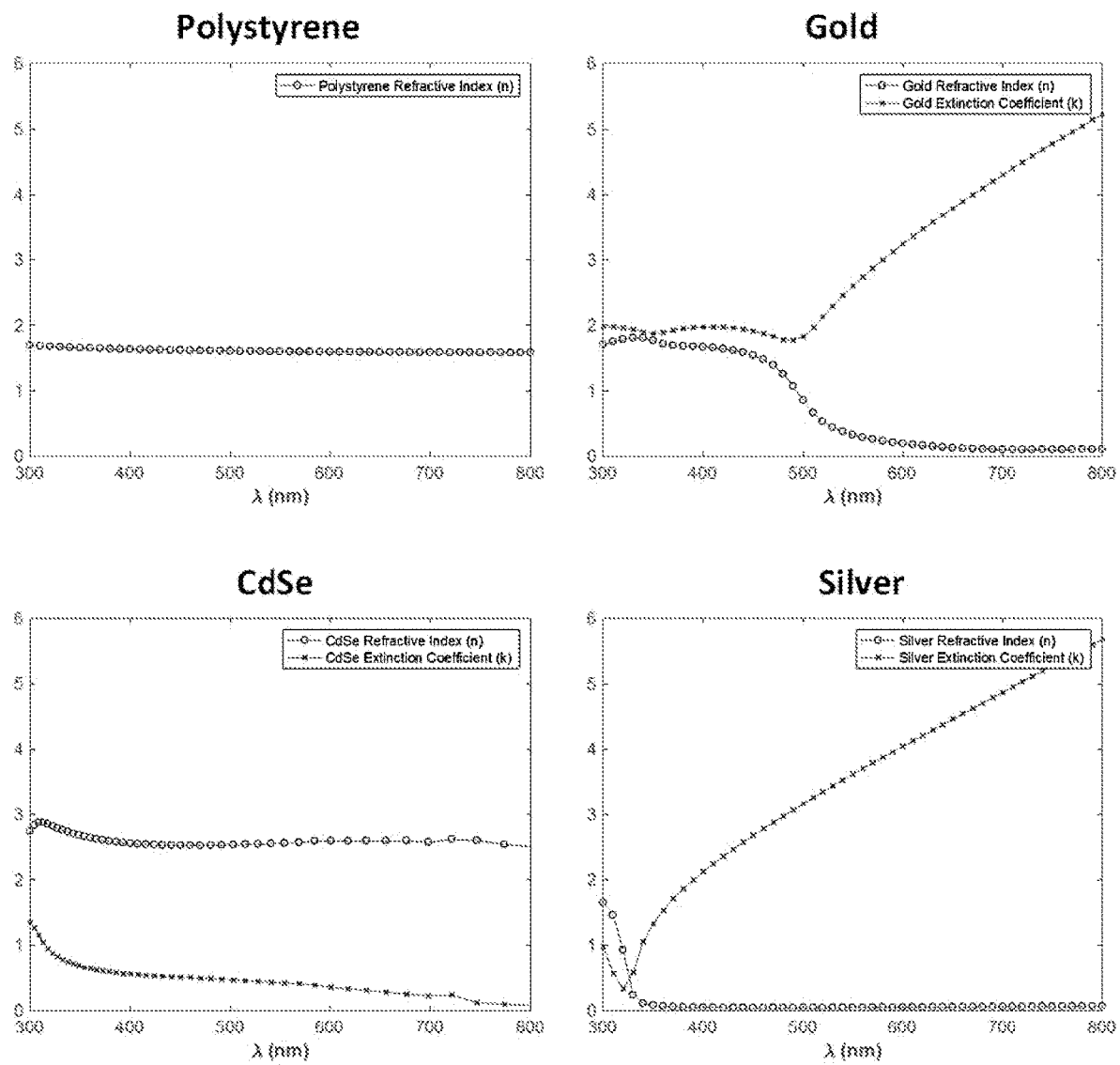
FIG. 23 shows graphs of refractive index of polystyrene, gold, CdSe, an silver and extinction coefficients of gold, CdSe, and silver.
Figure 24:
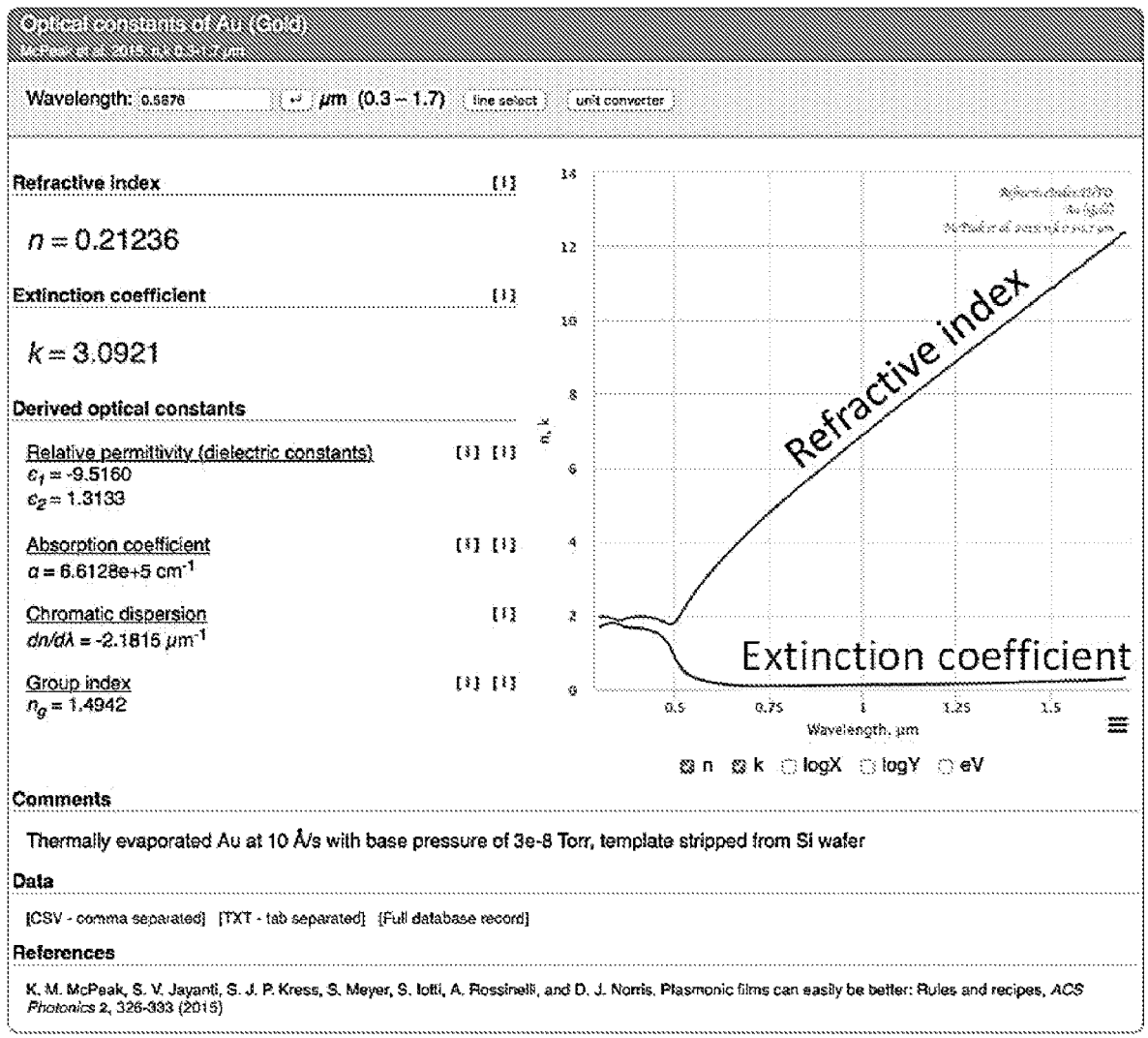
FIG. 24 shows optical constants and characteristics for gold.

A single molecular nanotag with optical properties that include a high elastic scattering power core or a component with high inelastic scattering (fluorescence or Raman scattering) that is quantifiable individually, and thereby enable detection and sorting of EVs or other nanomaterials based on binding to a single epitope of interest. Phenotyping subsets is a powerful tool that requires the labelling of more than one epitope at a time. In order to label more than one epitope simultaneously, the use of a second, or more, nanotags with distinctive optical properties to distinguish them from one another would be beneficial. As shown in FIG. 23, different metals have distinctive dispersion properties in the UV-visible spectrum with respect to refractive index and extinction coefficient. These optical properties, such as those shown in FIG. 24, can be found in online databases such as RefractiveIndex.info.

Molecular nanotags can use the characteristic optical properties of nanoparticles with varying compositions to allow phenotyping of single molecular targets with an elastic side-scatter detection signal, rather than a fluorescence detection signal. The scattering properties of different nanoparticle diameters and compositions were investigated using laser-scatter physics modelling based on Mie theory, and nanotag compositions were selected that could be suitable for detection with a flow cytometer based on the predicted scattering properties. Using Mie theory, it is possible to approximate the scattering cross-section of spheres and therefore deduce how multiple particles can be distinguished simultaneously, due to having distinctive peaks or troughs in their scattering profile at different wavelengths. This method is useful to predict the ability of a flow cytometer with multiple side scatter (SSC) detectors at different laser wavelengths, such as by an AstriosEQ e.g. 405 nm SSC, 488 nm SSC, 561 nm SSC, 640 nm SSC, to detect particles of different diameter and composition.

This modelling technique was applied to different materials, including gold, silver, polystyrene, platinum, titanium dioxide, iron oxide, and copper, FIGS. 15A-15D. As shown in FIGS. 15A-15D, smaller particles, approximately 20-60 nm spheres, resulted in distinctive spectral peaks and troughs, such as gold and silver. In addition, it can be seen that metals, such as gold, copper, and silver, are predicted to enhance particle detection (e.g., as compared to polystyrene). For example, a 20 nm Ag sphere has a scattering cross-section of $\sim 1 \times 10^{-16}$ m$^2$ sr$^{-1}$ at an illumination wavelength of 380 nm and a 40 nm Au sphere having a scattering cross-section of $\sim 1 \times 10^{-16}$ m$^2$ sr$^{-1}$ at an illumination wavelength of 532 nm.

Figure 16A:
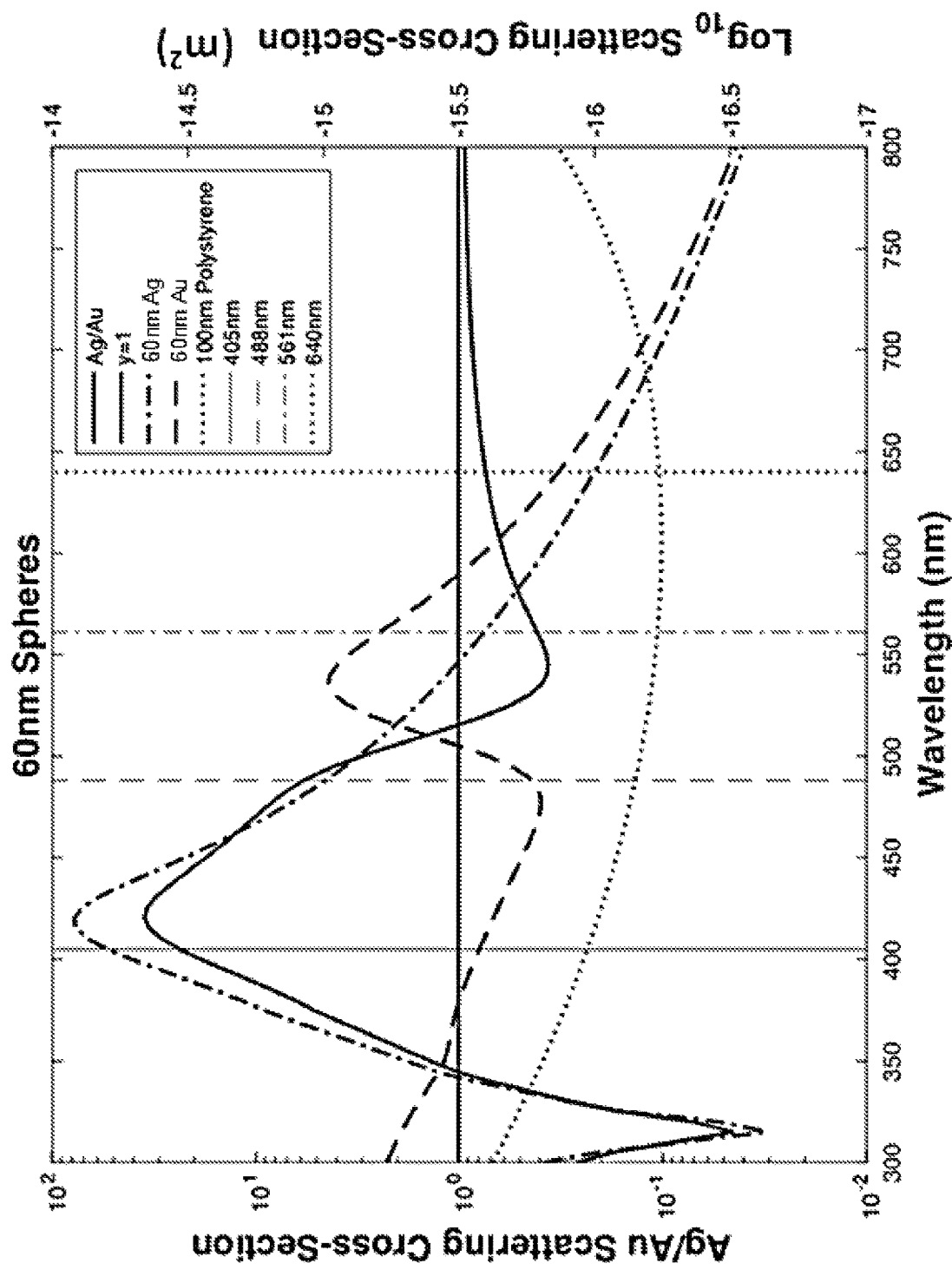
FIG. 16A is a graph of scattering cross-section versus wavelength for 60 nm gold and silver spheres.

These intrinsic scattering properties of particles with different compositions would allow a spectral approach to labelling, as fluorescence is used, however by instead utilizing scattering. For example in FIG. 15B and FIG. 16A, at an illumination wavelength of 405 nm, the collected light scattering of 60 nm silver particles is ~100 times higher than 60 nm gold particles. However, at an illumination wavelength of 561 nm, the collected light scattering of 60 nm gold particles is 5-10 times higher than that of 60 nm silver particles. This modelled data was validated by acquiring 60 nm silver and gold spheres at illumination wavelengths of 405 nm, 488 nm, 561 nm, and 640 nm on an Astrios EQ instrument to give a primitive insight into how spectral scattering can be utilized (FIG. 16B). As the models predicted the collected scattering of 60 nm silver particles (red or light gray) was less on the 561 nm scatter channel compared (blue or dark gray) with 60 nm gold, and the collected scatter of 60 nm silver particles was more than 60 nm gold on the 405 nm scatter channel.

Thus, based on the particular SSC one has available on their instrument, one can select an appropriate material from which to make a molecular nanotag described herein. For example, if an instrument has a 405 nm SSC detector, silver nanoparticles can be used; if an instrument has a 561 nm or 532 nm SSC detector, gold nanoparticles can be used, and so on. Particular examples are shown in Table 1 below.

TABLE 1

Example nanoparticles and related peak SSC wavelength.

| Nanoparticle Material Example | Peak SS Detector Wavelength |
|---|---|
| Silver nanosphere | 350 to 500 nm, such as 405 nm |
| Gold nanospheres | 500 to 650 nm, such as 532 nm, 561 nm |
| Gold nanourchins | 650 to 800 nm, such as 700 nm |
| Silver and Gold | Intermediate to silver and gold, depending on ratio of composition |

Figure 17A:
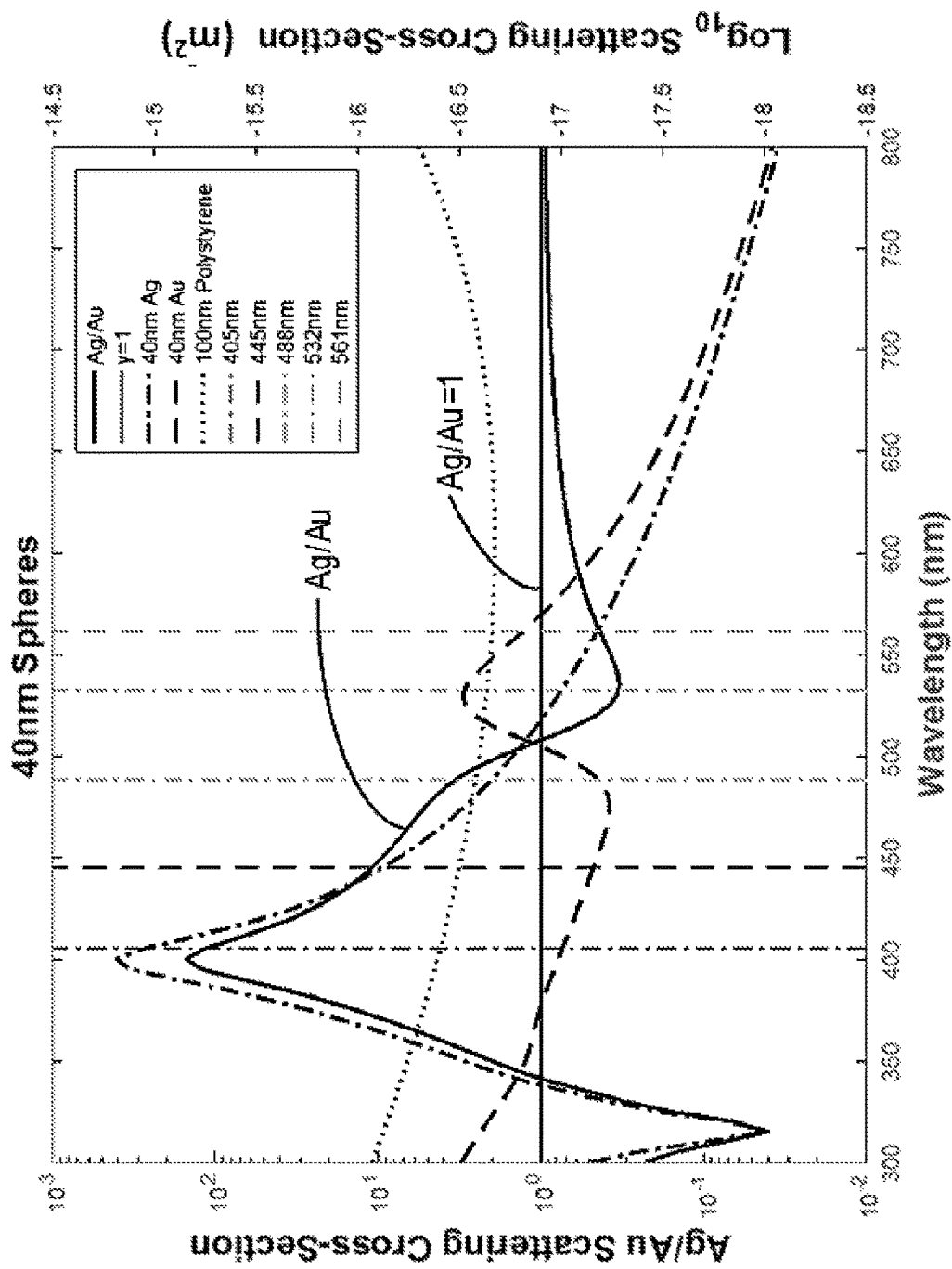
FIGS. 17A-17B are graphs of Ag/Au scattering cross-section and other scattering cross-sections versus wavelength for 40 nm spheres and 20 nm spheres, respectively. The Ag/Au line represents the ratio of Ag to Au collection scattering power. Black dashed line represents Au collected scattering power. The dashed-dotted line represents Ag collected scattering power. The horizontal line represents a gold and silver scatter power ratio of 1. The dotted line represents collected scattering power of 100 nm gold. Vertical lines represent monochromatic laser diode sources that can be used for spectral scattering detection.
Figure 17B:
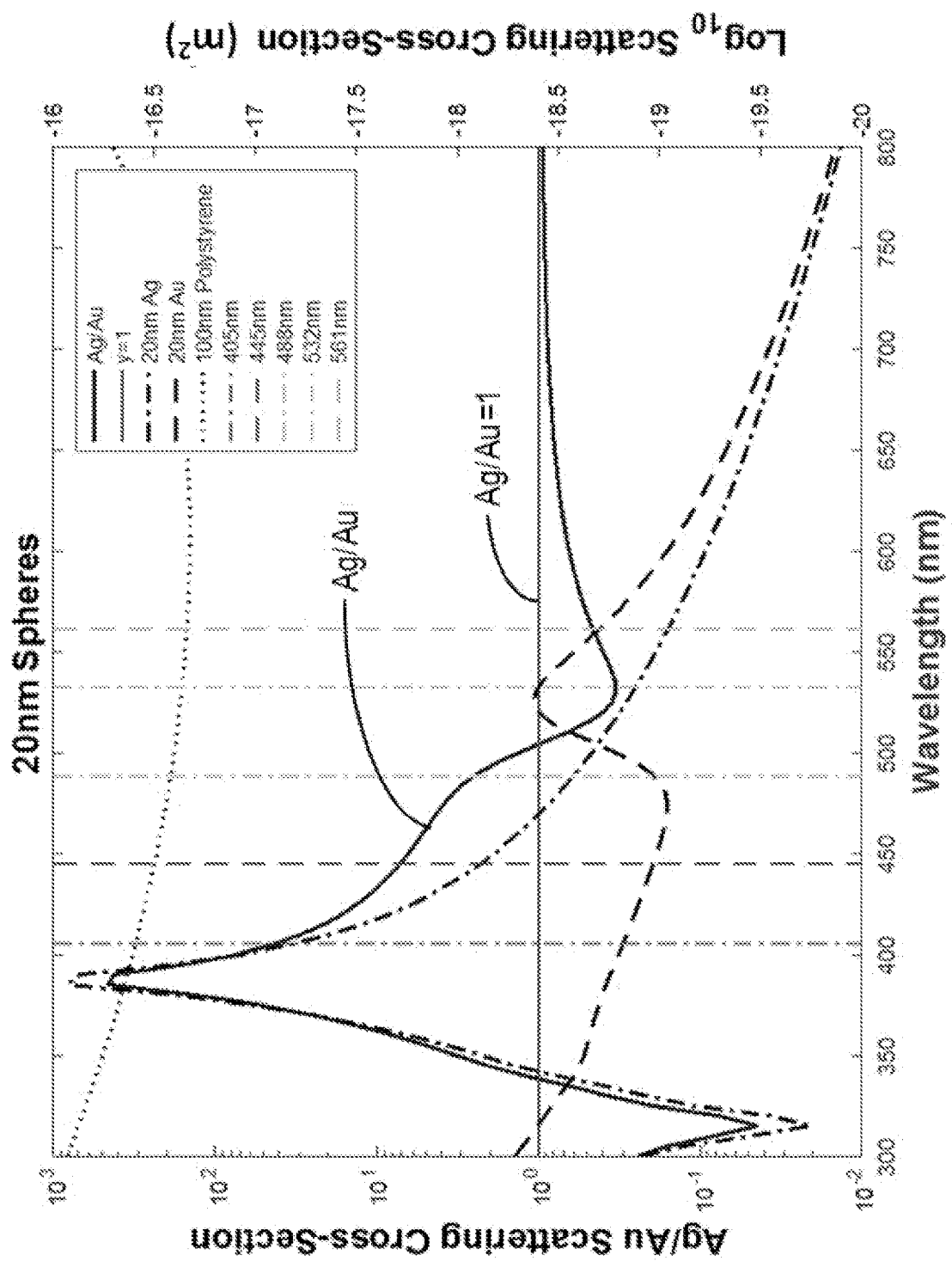

FIGS. 17A-17B show the relationship of collected scatter from 20 nm and 40 nm gold and silver particles, so as to determine an implementation of spectral deconvolution analysis between gold and silver nanoparticles. The collected scattering of gold and silver nanoparticles was plotted, along with the ratio of silver to gold scattering. The Ag/Au line represents the ratio of Ag to Au collection scattering power. Black dashed line represents Au collected scattering power. The dashed-dotted line represents Ag collected scattering power. The horizontal line represents a gold and silver scatter power ratio of 1. The dotted line represents collected scattering power of 100 nm gold. The ratio of silver to gold scattering can be used to determine which wavelengths the scatter light from a silver particle will be more than that of gold (above the Ag/Au=1 horizontal line—350 nm to 510 nm) and the collected scattering of a gold particle will be more than that of a silver particle (below the Ag/Au=1 horizontal line—510 nm to 800 nm). Monochromatic laser illumination wavelengths are overlaid with the graphs as vertical lines to show one implementation of spectral illumination that can be used for spectral scattering detection.

Figure 18A:
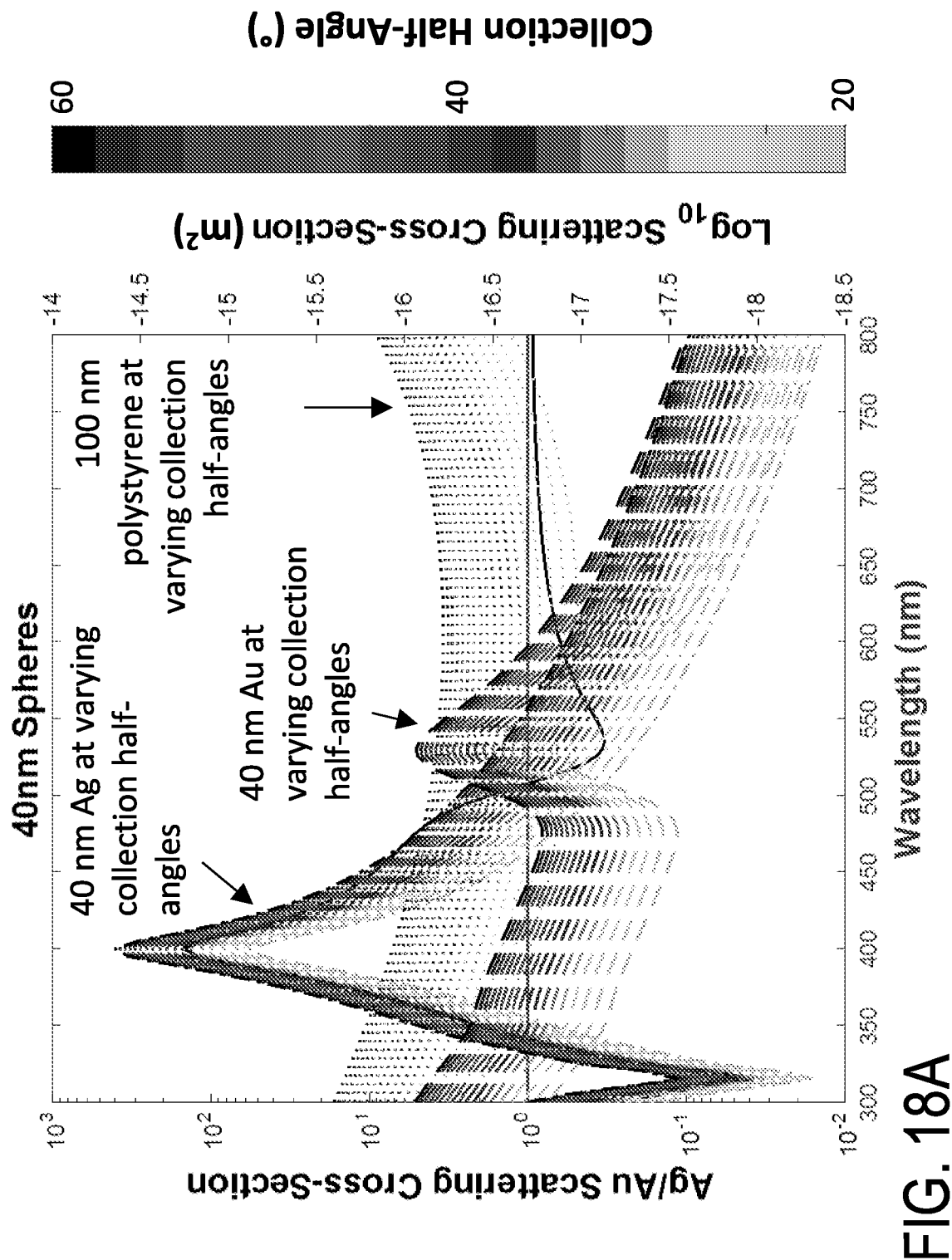
FIGS. 18A-18B are graphs of Ag/Au scattering cross-section versus wavelength for different collection angles. Spectral scattering of 40 nm gold, silver and 100 nm polystyrene. Each material was modelled from 20 to 60 degrees in 2 degree increments. Spectral characteristics of each can be found in FIG. 17A.
Figure 18B:
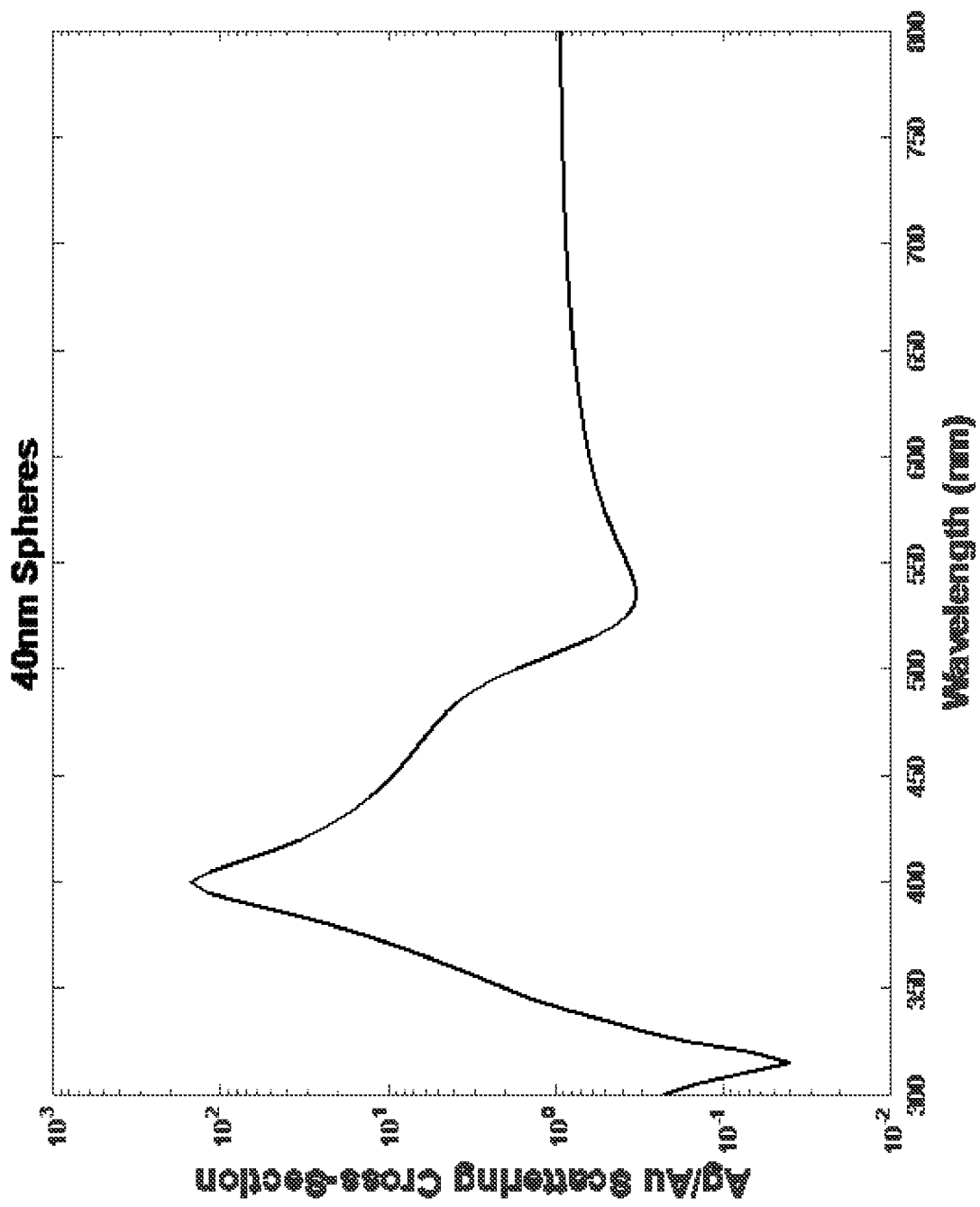
Figure 21B:
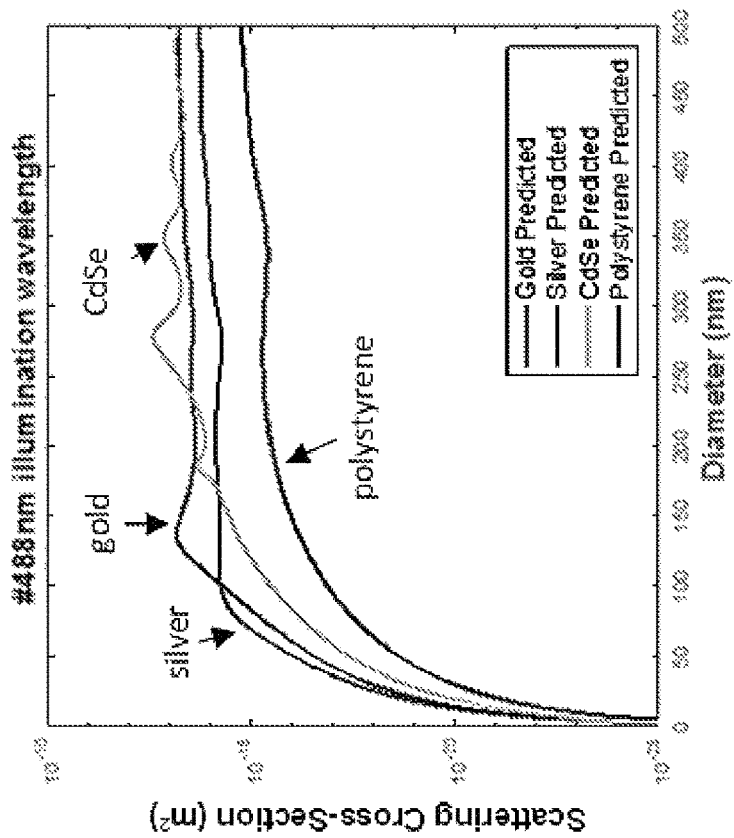
Figure 21A:
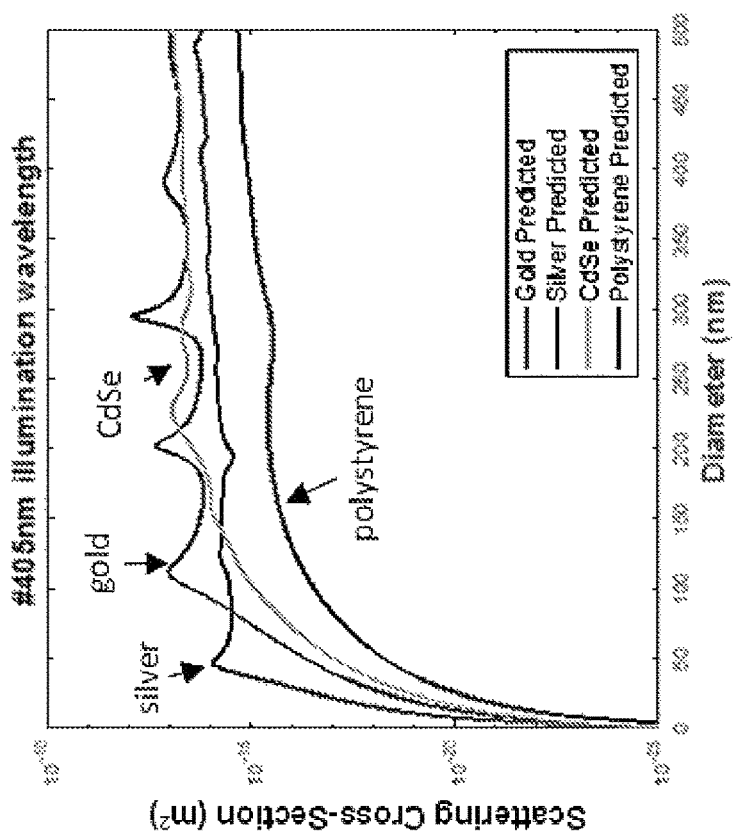

The collection angle and geometry of the collection optics can influence the relationship between particle scattering and their diameter and composition (as shown in FIGS. 26A-26B). A second variation (FIG. 18A) of the above model was created to stratify the modelled particles by typical flow cytometer collection half-angles from 20 to 60 degrees in 2 degree increments for 40 nm Au, 40 nm Ag, and 100 nm polystyrene (PS). Particular spectral characteristics can be seen in FIG. 17A. FIG. 18A shows that the collection half-angle affects the scattering power collected by an optical detector. However, FIG. 18B shows that when the ratio of silver to gold across all of the collection half-angles are overlaid, the ratio stays the same. As the spheres are within the Rayleigh range and are scattering light isotropically, a single deconvolution method can be applied to detect the spheres across instruments with different collection half-angles. FIGS. 21A-21B show the effect of collection angle of side scatter collection optics on the scattering relationship between gold and silver modelled at a collection half-angle of 30 degrees with diameters ranging from 0 to 500 nm.

Figure 22B:
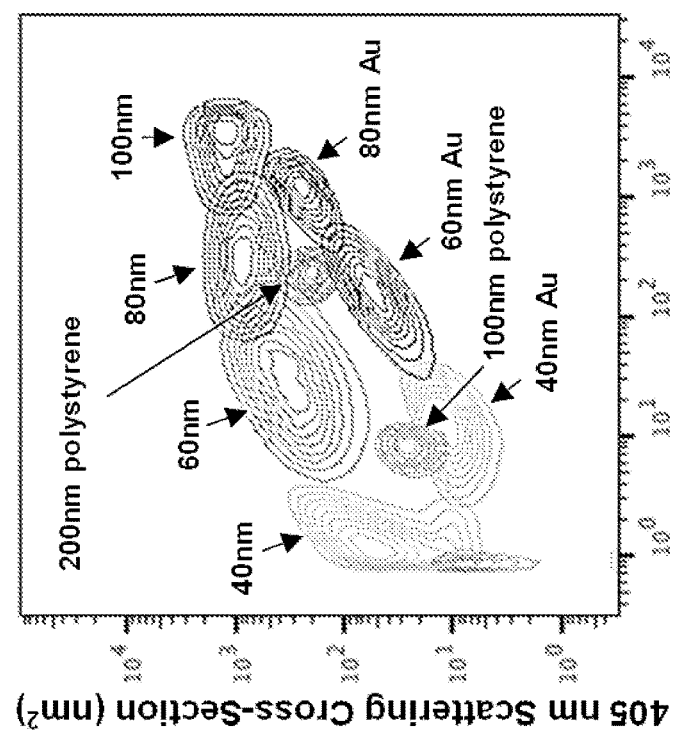
FIGS. 22A-22D show modeled and actual performance for scatter detection at various wavelengths and for various particles. The data in FIGS. 22B, 22D also show a representative bead set comprised of different molecular nanotag core materials, that can be used as reference beads for instrument calibration and to obtain reference values for deconvolution algorithms.
Figure 22A:
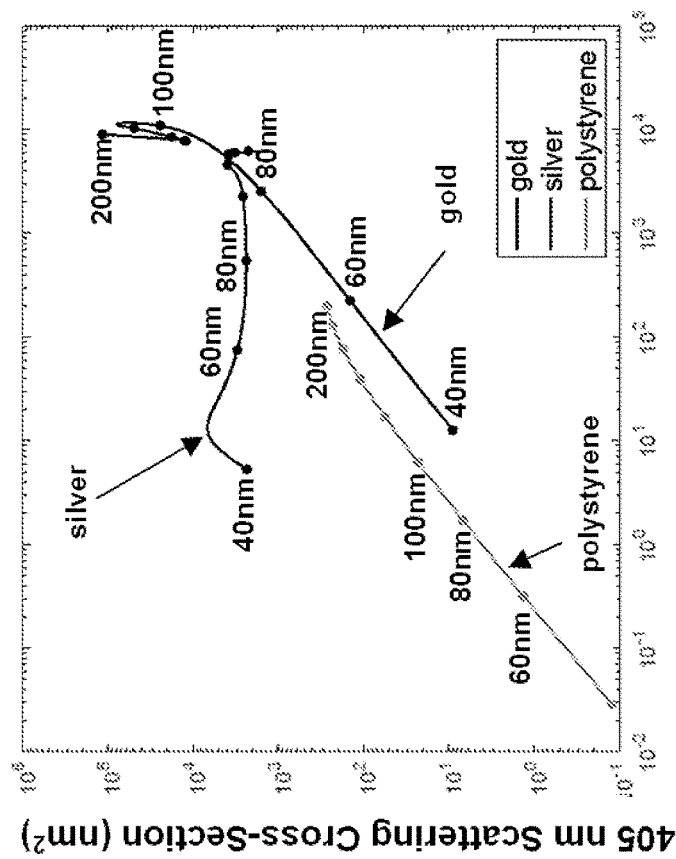
Figure 22D:
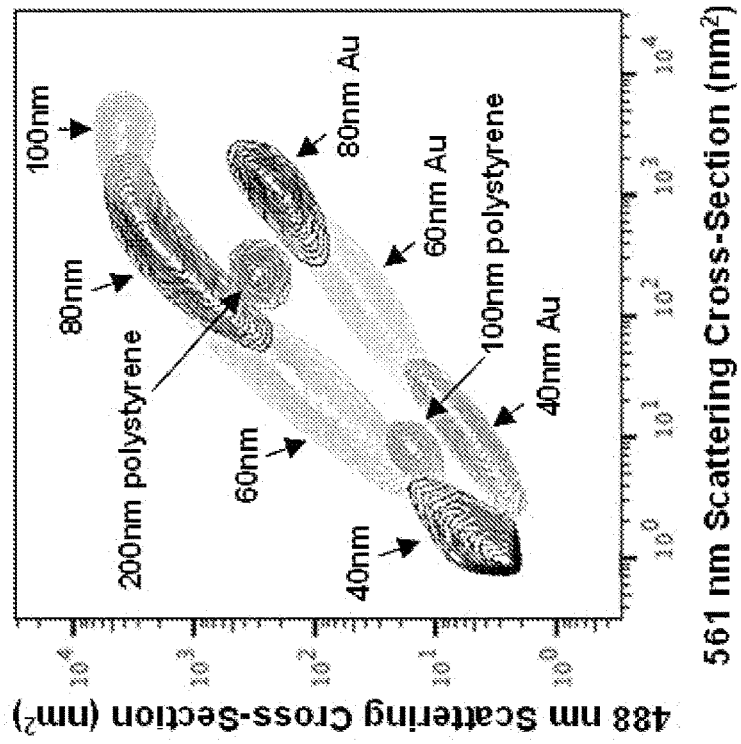
Figure 22C:
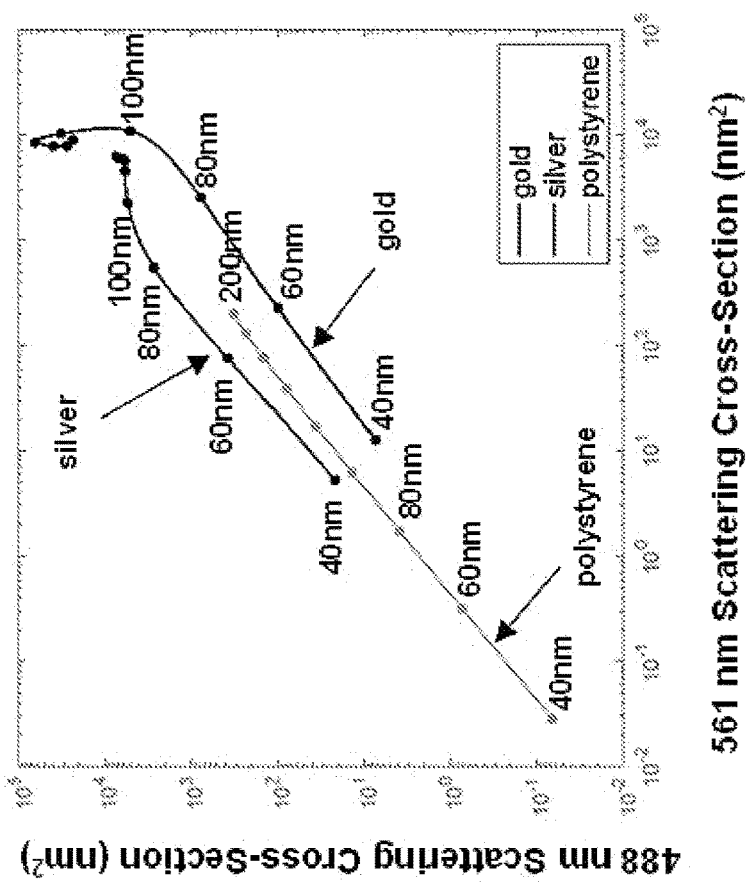

Methods of gold and silver spectral deconvolution using the 405, 488, 561, and 640 nm illumination wavelengths on the AstriosEQ were created based on the above models and findings. FIGS. 22A and 22C show modelled collected scattering power of different diameter gold and silver nanoparticles stratified by illumination wavelength. FIGS. 22B and 22D show actual performance of gold and silver nanoparticles scatter compared to modelled data so as to validate the spectral modelling techniques herein. This data again shows that predicted modelling data and acquired data are highly comparable. In some examples, the data shown in FIGS. 22B and 22D can be used as a representative reference bead set comprised of different molecular nanotag core materials for flow cytometer instrument calibration and to obtain reference values for deconvolution algorithms. The deconvolution algorithms can use acquired reference bead data to calibrate the instrument to allow particle scatter modelling (FIGS. 20A-20B) for each wavelength. Post-calibration acquired signals can be deconvoluted based upon the spectral scattering characteristics of the acquired signals and the scatter modelling of the instrument. For example, an acquired signal h can correspond to a scattered particle spectral profile f that is convolved (*) with a function g that can have various function components that operate to shroud the scattered spectral profile f, including scatter from other particles in the flow cytometry target, instrument-specific response characteristics, and noise. In some examples, instrument-specific response characteristics can be adjusted by component selection (e.g., broadband or supercontinuum illumination sources, cuvette geometry in which the flow cytometry target is flowing, collection lens characteristics such as NA, slit aperture geometry, detector sensitivity adjustment with detector and/or filter selection) so that detection sensitivity is matched or specifically non-matched to Mie resonances. In an embodiment, multiple detection units are situated to detect side scatter, each with collection lenses with different predetermined collection angles so as to exploit Mie resonance during detection. In further embodiments, a single detection unit can be configured to exploit Mie resonances during detection. In representative examples, flow cytometry collection optics can be modeled to provide a prediction for collection optics collection angle, which can be verified to correspond to actual collection angle. Representative instruments can be calibrated with beads of known size and refractive index. Diameter or refractive index of detected particles can be inferred based on the detected scattering properties and collection angle. The scattering properties and collection angle can also be used to assist with deconvolution of detected signals containing information about multiple different particles having different spectral scattering characteristics. In different examples, nanotags of different sizes can be detected, or nanotags of the same size but different spectral characteristics, or specific EVs can be detected, including with attached nanotags.

Figure 25:
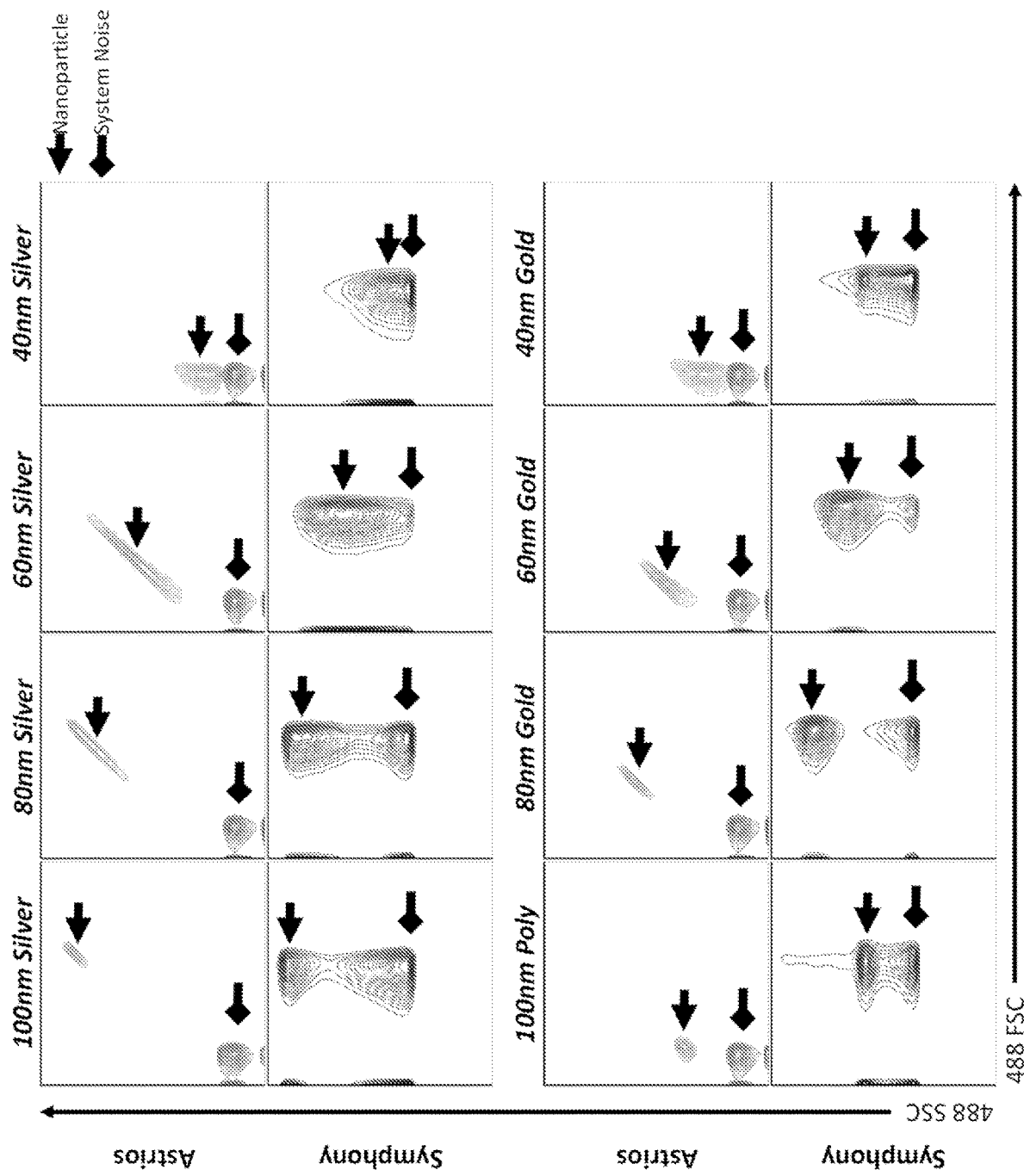
FIG. 25 shows SSC/FSC graph comparisons between FACS Symphony and Astrios EQ flow cytometry devices for gold, silver, and polystyrene beads.

The ability of other commercial flow cytometers to detect single gold and silver nanoparticles to show its applicability as a detection technique was also shown by acquiring various gold and silver nanoparticles on a BD FACS Symphony flow cytometer (FIG. 25).

Example 2: Exemplary Laser Alignments for Detecting Nanotags

Using nanotags for epitope detection based on side scatter detection at multiple side scatter wavelength can rely upon elastic scattering of different particle compositions. Therefore representative embodiments use a multi-wavelength illumination input having wavelength or a wavelength range across the UV-Visible spectrum, so as to increase the number of nanotag compositions that can be used and detected simultaneously. In different examples, optical devices capable of detecting nanotags can use supercontinuum white laser sources, such as those shown in FIG. 1 or FIG. 2A, by way of example, so as to provide expansive spectral illumination of the nanotags. In additional examples, monochromatic lasers can be used. In some flow cytometric system examples, separate beams can be arranged into spatially segregated wavelengths, as collinearly aligned wavelengths, or in other configurations. Flow cytometer illumination beam input examples can account for differences in wavelength specific focal distance to ensure that the highest intensity part of the laser beam is focused on the core stream of the flow cytometry target, e.g., as shown in FIGS. 2A-4A. In some examples, the filters may also be used to spatially separate laser beams for different wavelengths. In some examples with white light supercontinuum light sources, beam shaping optics can be included before, between, or after filters. In the case of monochromatic laser sources, the beam shaping optic itself, or beam directing mirrors can be moved to spatially separate laser beams.

Example 3: Use of White Light for Detecting Nanotags

The disclosed molecular nanotags can be detected using white, or broadband, light illumination (e.g., instead of a monochromatic laser). Single molecular nanotag spectral scatter analysis can be achieved by directing a detection beam having white light illumination through a prism assembly to separate illumination based on wavelength, and by focusing the separate beams with a microlens array, and detecting the focused beams with a PMT/APD detector array (such as a 32-channel PMT/APD detector array). In this example, full spectral scatter flow cytometry can use a supercontinuum white laser providing illumination at all UV-Visible wavelengths. White-light can be focused upon a core stream suspended particles. Particle light scattering can be collected perpendicular to the illumination light using a high numerical aperture color-correction lens. This light is focused upon a series of prisms to separate wavelengths of light that are sequentially focused upon a multi-channel photodetector providing UV-visible spectral scattering detection. Bandpass filters can be situated between the prisms and multi-channel photodetectors. In some examples, selected channels can detect scatter across a larger wavelength range to increase detection sensitivity. A beam shaping optic or a beam shaping system can be used so as to provide little variation in focal point of the multi-wavelength illumination. For example, the multi-wavelength illumination from a white light source can be split into bands of illumination and co-linearly aligned with multiple beam shaping optics.

Example 4: Nanoparticle Scatter and Flow Cytometer Modelling

Figure 20A:
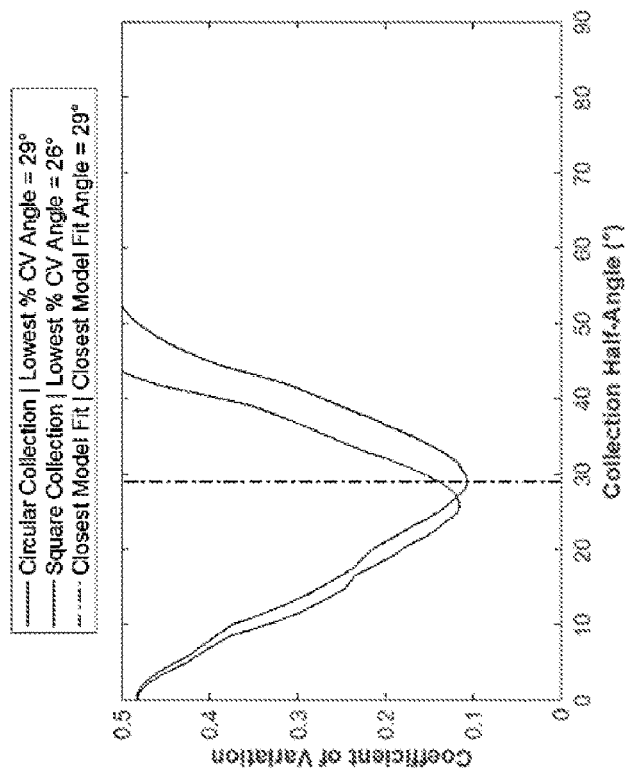
FIG. 20A is a graph of coefficient of variation versus collection half angle, showing the closest fitting collection half-angle of bead data acquired on FIG. 20B.

In order to model the amount of light a flow cytometer receives from a given particle of a predetermined diameter and refractive index, and so as to create a scatter-diameter curve, such as FIG. 20B, a HAD (Half-Angle Determination) modelling script is used to determine the collection half-angle, FIG. 20A. This modelling method has built upon work by Welsh, Joshua (2016) Flow cytometer optimisation and standardisation for the study of extracellular vesicles as translational biomarkers University of Southampton Doctoral Thesis, 209 pp. which was originally designed to create scatter-diameter relationship curves (FIG. 26B) and determine the collection half-angle of a flow cytometry instrument (FIG. 20A) using particles of known diameter and refractive index (and which is incorporated by reference herein in its entirety). This method of determining the limiting collection angle of light reaching the photodetectors allows further modelling of a flow cytometer, such as the 'Predicted Curves Only' 1000 method or 'Wave Scan' 2000 and 'Wave Scan' 3000 method.

Figure 19A:
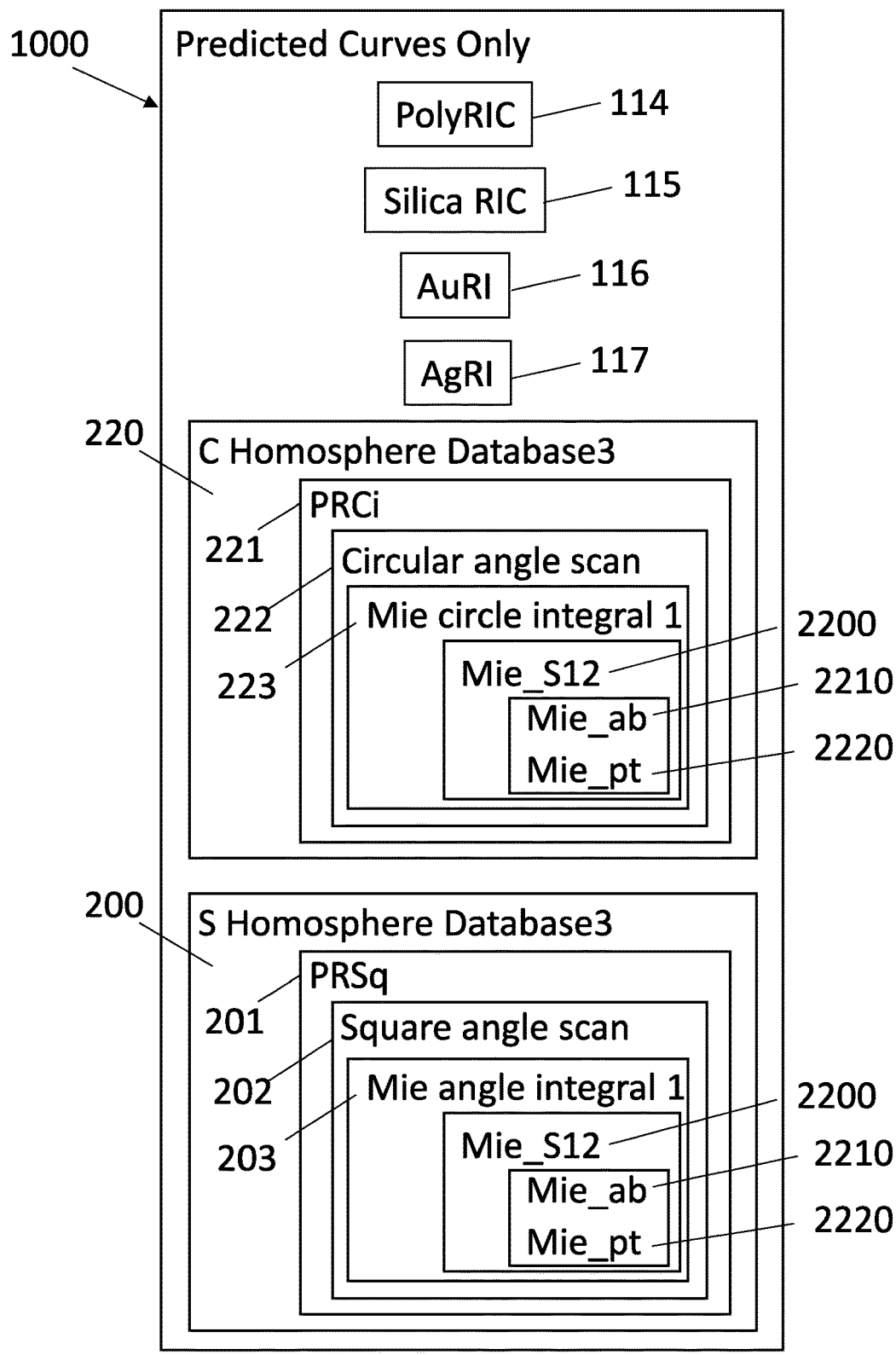
FIGS. 19A, 19B, and 19C are schematics of Mie scattering model scripts.

The 'Predicted Curves Only' 1000 method, as shown in FIG. 19A, is used to predict the scattering relationship of various diameter particles at different wavelengths and collection angles without the need to fit/normalise acquired flow cytometry data to predicted particle scattering data. AuRI 116 and AgRI 117 scripts were added to a set of previously developed scripts (114, 115, 200, 201, 202, 203, 220, 221, 222, 223, 2200, 2210, 2220) from the 'HAD method' in order to input the optical properties of both gold and silver in to the model.

This method can be used to predict the collected difference in scattering power of NanoTags with different compositions at different illumination wavelengths, FIGS. 21A-D. This approach to understand collected particle scatter per composition allows identification of diameters/compositions with optimal separation to allow differentiation in acquired data. For example, if one had a 405 nm illumination laser flow cytometer configuration with scattering collection optics and two 40 nm spheres were to be used as labels their compositions could be decided using FIG. 21A where polystyrene spheres and silver spheres of 40 nm show the highest separation.

Figure 19B:
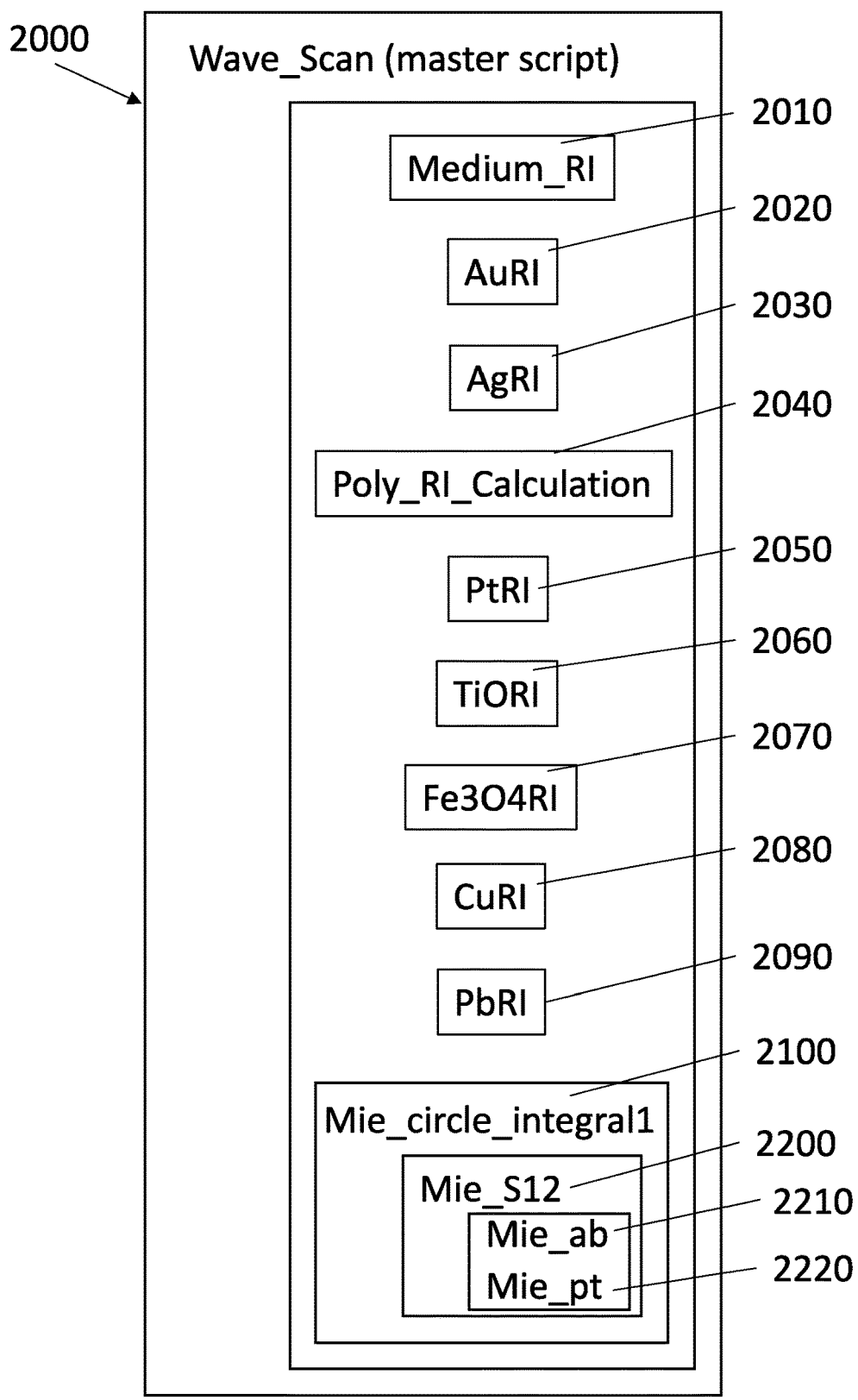
Figure 19C:
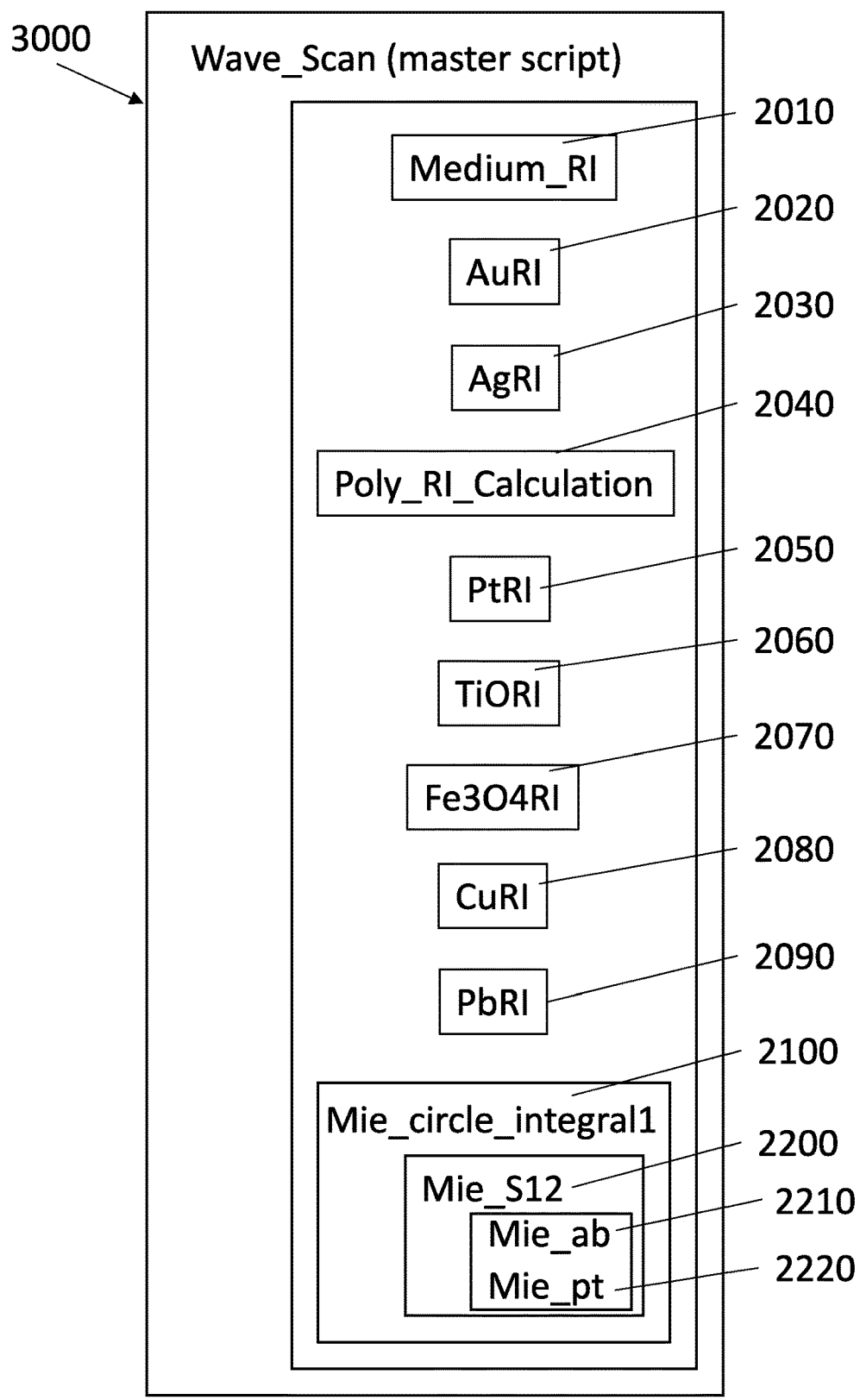

Extrapolations of the 'Predicted Curves Only' 1000 method are the 'Wave Scan' 1000 & 2000 methods, FIGS. 24H-24I, which are designed to find the optimal illumination wavelengths for a set of particles with known diameter and composition, thereby enabling the design of illumination or collection optics for particle NanoTag compositions. These methods can also be used to aid spectral deconvolution by analyzing the spectral scattering characteristics of different molecular nanotag compositions at predetermined half-angles, for the flow cytometer in question (either known or determined using 'HAD' method), across multiple wavelengths in the UV-Visible spectrum (FIG. 19B), or across a set molecular nanotag size across multiple collection half-angles (FIG. 19C).

Both of the scripts 2000, 3000 use common subscripts but are implemented to provide different outputs. Figures and description relating to such scripts can be found in the related PCT application entitled "Molecular Nanotags," filed on the Oct. 23, 2017, and which is incorporated herein by reference. The script 2000 models the scattering power of various particle compositions of a predetermined diameter across wavelengths in the UV-Visible spectrum. The script 2000 can provide estimates of spectral scatter properties of different particle compositions so as to determine or select a composition with suitable scatter properties for a particular wavelength. Also, the output of the modelling method 2000 can provide a basis for generic spectral deconvolution algorithms applied to spectral scattering detection. 'Wave Scan' 3000 stratifies the scattering power of particles across multiple wavelengths by collection angle. The influence of collection angle on particle scatter-diameter properties could therefore be investigated. Using the 'Wave Scan' 3000 method it can be shown that ratio of collected scattering power between NanoTag compositions of gold and silver, FIGS. 18A-B, is maintained irrespective of collection angle due to particles scattering light isotropically.

Furthermore, by understanding the spectral scattering characteristics of different Nanotag compositions, such as gold and silver, it is possible to deduce optimal illumination inputs, in the case of monochromatic laser diode source, FIGS. 17A-17B. Shown in FIG. 17A is the spectral scattering characteristic of 40 nm gold and silver sphere, 100 nm polystyrene spheres, and the ratio of silver to gold scattering at each wavelength. If a flow cytometer were not using a broad illumination source, such as a supercontinuum white laser, the implementation of several monochromatic laser diodes sources would require insight into the spectral scattering characteristics of the Nanotags being detector. In the case of gold and silver, as in FIG. 17A, probing of the illumination wavelengths 405 nm, 445 nm, 488 nm, 532 nm, 561 nm (all of which are commercial available laser sources) would provide sufficient data from the peaks and troughs in the gold and silver illumination wavelength dependent scattering to allow spectral deconvolution. This has been implemented in a primitive manner already utilizing a commercial flow cytometer (Astrios EQ) with illumination and scattering detection at wavelengths of 405, 488, 561, 640 nm, FIG. 19A-B.

The wavelength models discussed herein also build upon the HAD scripts, however to allow the input of several particle compositions the dispersion properties of various materials were entered into a database to allow input into the script, including gold; AuRI 116, silver; AgRI 117, polystyrene; poly RI Calculation 114, Platinum; PtRI 118, Titanium Dioxide; TiORI 2010, Iron Oxide; Fe3O4 RI 119, Copper; CuRI 120, and Lead; PbRI 121.

Example 5—Effects of Optical Aperture on Detected Particle Scattering

Figure 27:
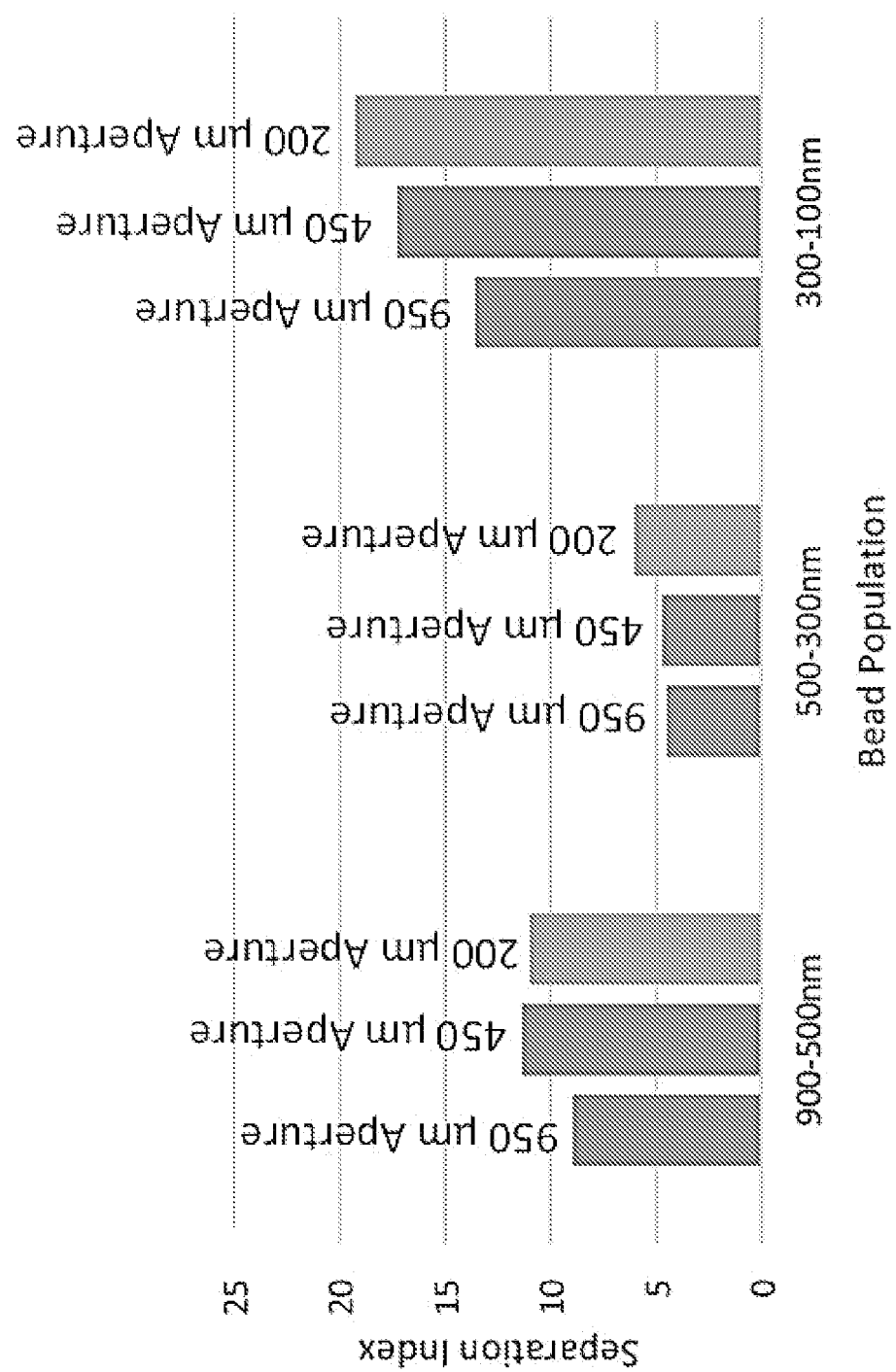
FIG. 27 shows calculated SSC separation indices for 100 nm, 300 nm, 500 nm, and 900 nm beads acquired on an Attune NxT with an open aperture (950 µm), 450 µm and 200 µm slit apertures. Separation index calculated using median intensity difference over the sum of their standard deviation.

It has been demonstrated that the use of slit apertures can increase the signal to noise ratio, shown in FIG. 27, by using the separation index (Average Large Bead Scattering Power—Average Small Bead Scattering Power)/(Large Bead Scattering Power Standard Deviation+Small Bead Scattering Power Standard Deviation). A larger separation index corresponds to a larger signal to noise ratio. The application of slit apertures while increasing the signal to noise ratio at one wavelength typically compromises the signal to noise ratio of other wavelengths. This means its implementation in conventional flow cytometry optics does not lend itself to the detection of several different wavelengths simultaneously, as conventional cytometers do by detecting different fluorophores that emit at different wavelengths using the same excitation wavelength. Furthermore, the collection optics on flow cytometers utilizing optic fibers, rather than fixed optics, collect light in a fixed plane and therefore the use of a slit aperture for one scattering wavelength will typically compromise the scattering wavelengths of the other laser. Implementations discussed of an optical image filtration unit (OIFU) here can be tuned to different collection wavelengths per laser. Furthermore, it can be implemented on the opposite side of a flow cell and therefore allow high sensitivity scatter detection, while maintaining fluorescence sensitivity.

While the use of an OIFU provides high-sensitivity of selective scattering wavelengths, its use compared to a configuration that utilizes spectral scattering wavelength detection is limited when a deconvolution process is applied. By only using selective scattering wavelength detection there is typically a limited degree of deconvolution available, which reduces the number of molecular nanotags that can be used, which ultimately results in less power in particle phenotyping.

The implementation of optical apertures combined with the development of flow cytometry scattering models, such as shown in FIG. 20B, allow further understanding to be gained in flow cytometer collection optics design. As shown in FIGS. 26A-26B, it collection angle and aperture type can influence the scatter-diameter relationship of particles. It can be seen that it a circular aperture is used on an instrument with a collection half-angle of 10 degrees, the Mie resonances (troughs) in the scatter-diameter relationship curve are deeper than those of the square collection aperture using the same collection half-angle. It is therefore possible to tailor aperture characteristics (e.g., geometry) to the scattering distribution of particles of interest to create unique scatter-diameter relationships that would aid detection, or deconvolution.

Example 6—Spectral Profile Comparison and Deconvolution

As described in Welsh et al. "Prospective Use of High-Refractive Index Materials for Single Molecule Detection in Flow Cytometry," Sensors 2018, 18, 2461; doi:10.3390/s18082461 (incorporated by reference herein), modeling approaches described herein can be used to characterize the sensitivity of various flow cytometry instruments to determine detection limits for nanotag (or other particle) size (typically diameter) and refractive index. Once characterized, the spectral analysis approaches described herein can be used, including in some examples by retrofitting existing flow cytometry instruments, to determine the presence of nanotags and other particles in a flow cytometry target by deconvolving side-scatter detection signals and comparing data with characteristic spectral profiles for particles of different composition and/or size. In representative examples, characteristic spectral profiles can be defined by a variation of intensity as a function of wavelength across a selected spectral range, and in some examples such comparisons and deconvolution can provide single-particle detection.

As explained in Welsh et al., extracellular vesicles (EVs) are small (30-1000 nm) membranous vesicles with the majority being <150 nm in diameter. Due to their small surface area, when compared to cells, the epitope expression of the majority of EV surface markers is below the detectable range of conventional high throughput, multi-parameter detection techniques, such as flow cytometry.

Current flow cytometers is capable of distinguishing thousands, to a few hundred, fluorescent molecules. The surface expression of highly abundant lymphocyte surface marker, such as CD14, is in the region of 100,000 copies per lymphocyte. If this epitope density were scaled to a 100 nm EV, it would equate to <30 CD14 copies per vesicle. Therefore, an unmet need in the EV field is the development of labels that enable single-epitope detection on single EVs, ideally utilizing currently available detection equipment and flow cytometers.

Current fluorescence-based flow cytometry quantifies the expression of proteins using fluorescent probes, which tend to be in the form of fluorescently conjugated antibodies. While these have proven to be a powerful tool for cellular analysis in the immunology field, in their current form they are insufficient to quantify EV surface protein expression on the majority of available flow cytometers. While newer generations of fluorescent labels have emerged, such as QDots, they remain generally inadequate for low surface epitope quantification. The use of QDots as labels for time-limited detection of individual targets is also complicated by stochastic optical fluctuation, commonly referred to as "blinking."

When the objective of an analysis is to enumerate the number of EVs which are positive for a specific marker in a sample, the method of enumeration must be able to detect each EV with one or more specific surface marker. In this case, it is important to use labels and instruments capable of detecting single labels, with single label sensitivity. On the other hand, when the objective is to quantify or compare how many receptors are present on individual EVs, there must be a constant label-to-target ratio and labels with monovalent target binding-sites are needed for single molecule detection and surface receptor quantification on EVs. Other standardization steps should also be considered when enumerating EVs, such as dilution controls, MESF beads, and/or scatter modelling. Most commercially available techniques utilizing QDots use these labels in polyvalent forms but new avenues have emerged that have attempted to create monovalent QDots which may be directly transferrable to the conjugation of other nanoparticles.

A novel class of nanoscale molecular tags (NanoTags) described herein can enable single label and therefore single molecule, detection using flow cytometers. In representative examples, NanoTags can be composed of materials with high refractive indices and/or high optical absorption and unique spectral scattering properties that would enable both low epitope number enumeration and spectral phenotyping of small particles, such as extracellular vesicles. As described herein, it is shown that NanoTag compositions can be selected for unambiguous optical detection and NanoTag compositions can be used simultaneously to allow particle phenotyping and still be distinguished from one another. Analyses are based on numerical modelling of wavelength dependent light scattering by nanoparticles and comparison with flow cytometry data.

To first identify particles with useful optical properties that would aid increased light scattering, the refractive index and extinction coefficients were collated. Particle refractive indices and extinction coefficients across wavelengths 300-800 nm were compiled from the literature for the following compositions: gold, silver, iron oxide, titanium dioxide, copper, platinum, lead and zirconium. The refractive indices of polystyrene and water were calculated at each wavelength using the corresponding Sellmeier equations. Composition selection was further narrowed based on nanoparticle availability and high refractive index (e.g., Titanium Dioxide) or extinction efficient (e.g., Lead) or having a medium refractive index and extinction coefficient (e.g., Gold, Silver, Copper).

Flow cytometry measurements were performed on a MoFlo Astrios EQ (Beckman Coulter Life Sciences, Indianapolis, Ind., USA) and FACS Symphony (BD Life Sciences, Franklin Lakes, N.J., USA) flow cytometers. The Astrios EQ is a jet-in-air system with 5 lasers (355, 405, 488, 561 and 640 nm wavelength), with side scatter collection (SSC) detection possible at 405, 488, 561 and 640 nm. Detailed description of Astrios EQ setup and detection thresholds can be found in the literature. The FACS Symphony is a cell-analyzer with 5 lasers (355, 405, 488, 532 and 640 nm) with SSC detection only possible at 488 nm with the default device configuration. The equipment parameters for particle enumeration via SSC were set to a triggering threshold of 200, a voltage of 350 and a low fluidics rate. For measurements of scattered power versus diameter, NIST-traceable polystyrene beads (100, 125, 147, 203, 296, 400, 600, 799, 994 nm diameter) (Thermo Fisher Scientific, gift from E. van der Pol, Waltham, Mass., USA) and silica beads (182, 315, 359, 405, 548, 800, 1000 nm) (Kisker Biotech, gift from E. van der Pol, Amsterdam, The Netherlands) were analyzed at a concentration of 0.1-1×10⁸ particles per mL and confirmed the fit of predicted scatter versus acquired scatter using previously published flow cytometer methodology.

Figure 28B:
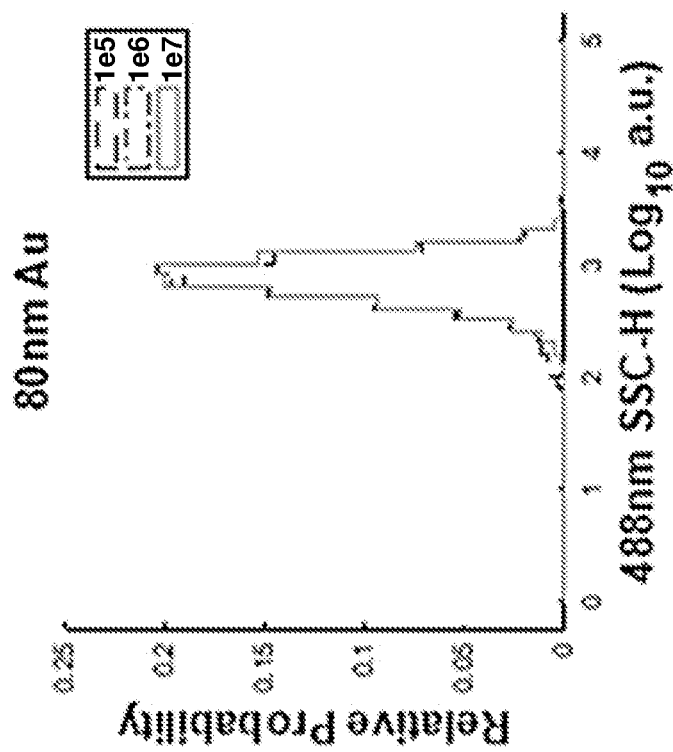
FIGS. 28A-28F shows serial dilutions of nanoparticles and a linear decrease indicative of single particle detection.
Figure 28A:
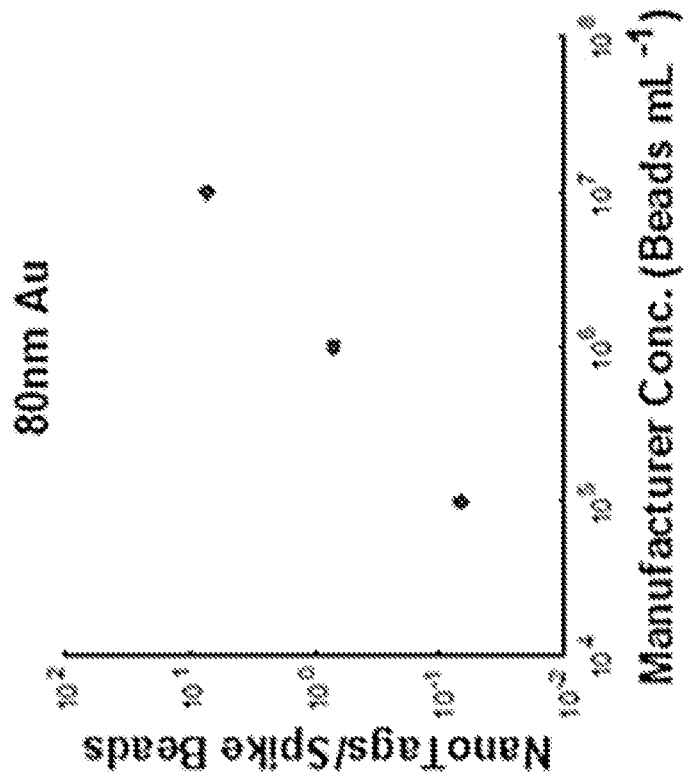
Figure 28D:
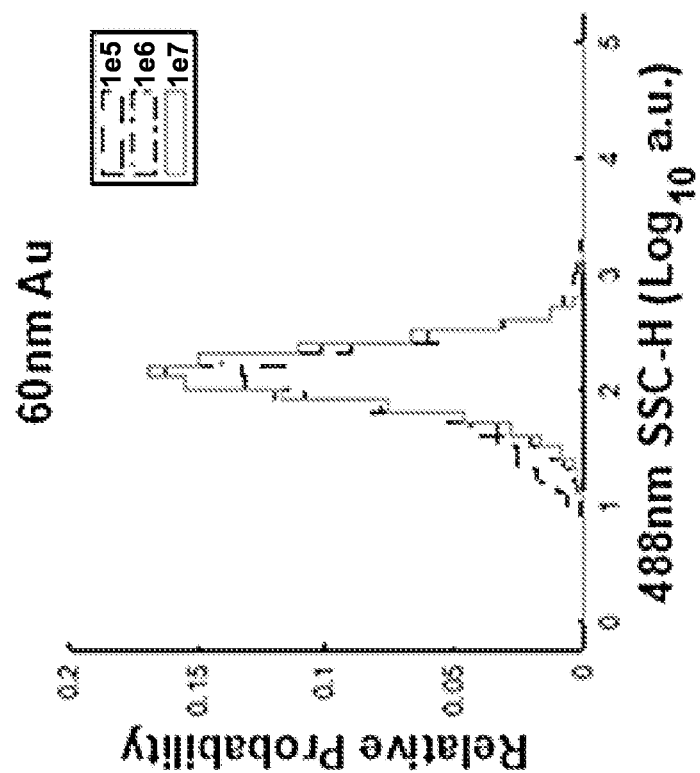
Figure 28C:
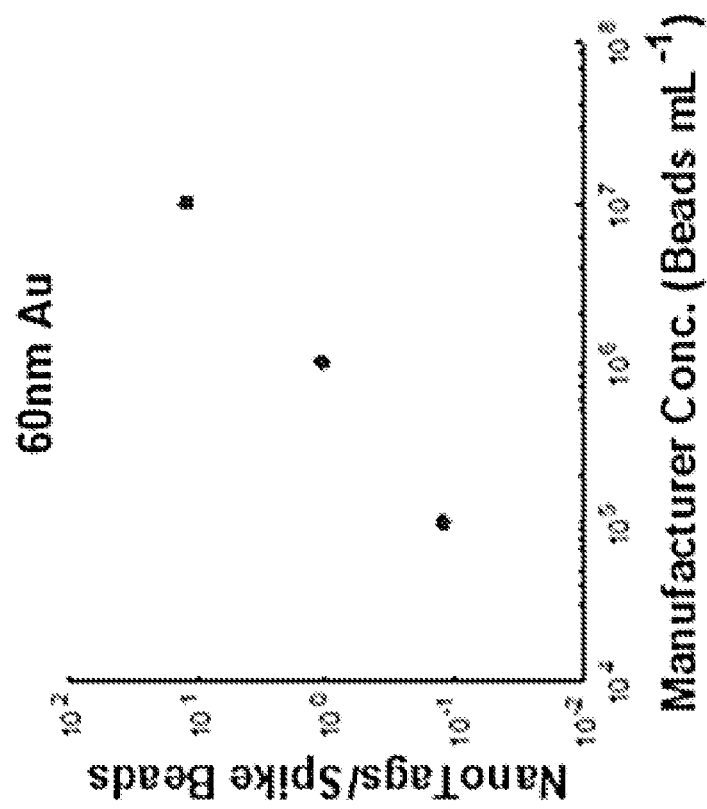
Figure 28F:
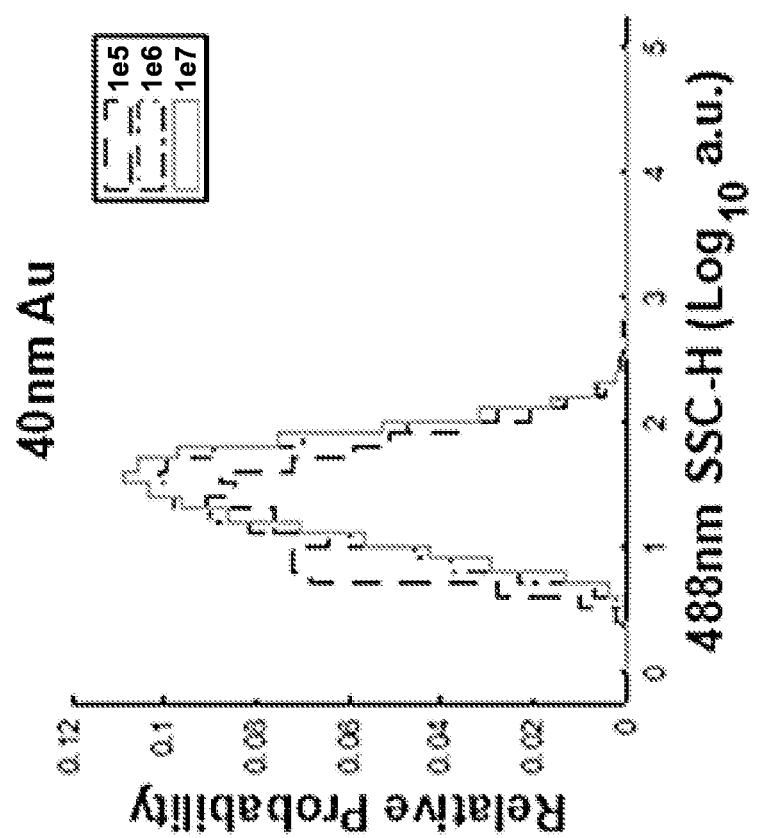
Figure 28E:
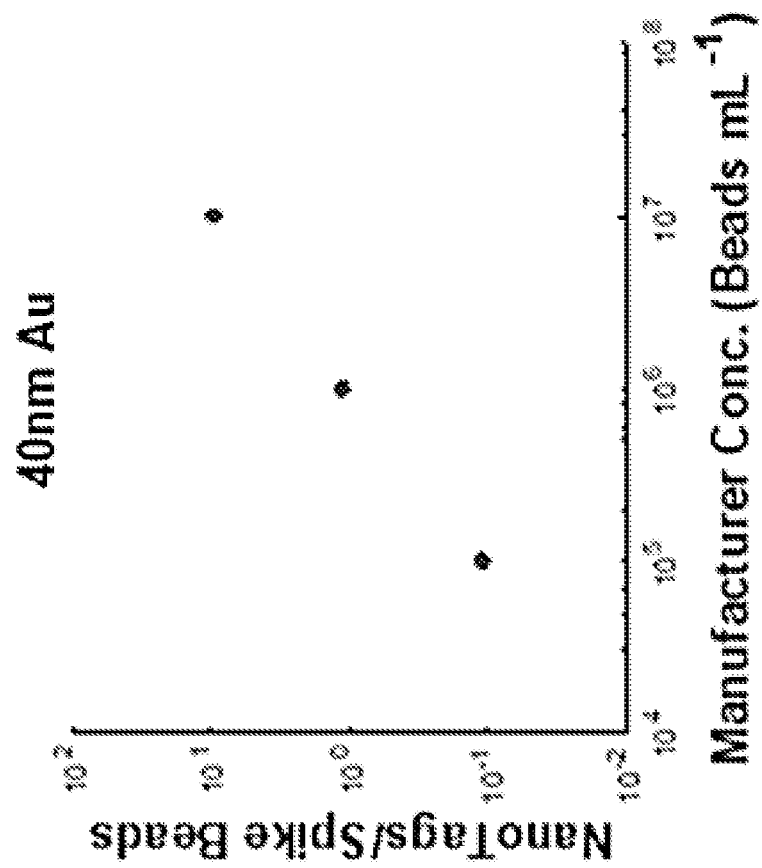

For high-refractive index particle acquisition modelling comparisons, Ag particles, 20, 40, 60, 80 and 100 nm in diameter (Cytodiagnostics, Burlington, ON, Canada), Au particles, 20, 40, 60 and 80 nm in diameter (Cytodiagnostics) and 100 nm polystyrene NIST-traceable beads (Thermo Fisher Scientific) and 200 nm fluorescent polystyrene beads (Thermo Fisher Scientific) were diluted to a concentration between 0.1-1×10⁷ particles per mL before acquisition on each instrument. As shown in FIGS. 28A-28F, linear dilutions of 40, 60, 80 nm Au particles were performed to confirm working cytometer acquisition concentration that maintained single-particle detection. That is, serial dilutions of 40 nm Au nanoparticles are shown in FIGS. 28A-28B, 60 nm in FIGS. 28C-28D, and 80 nm in FIGS. 28E-28F. Au nanoparticles were diluted to 1e7, 1e6, and 1e5 particles mL$^{-1}$ with a spike in of 200 nm fluorescent polystyrene beads at 1e7 particles mL$^{-1}$. The ratio of detected Au to 200 nm polystyrene was plotted against the prepared concentration of Au. It can be seen the ratio of diluted Au to spike beads vs. the prepared Au concentration obtains a linear decrease. This is indicative of single-particle detection. Furthermore, there is no appreciable difference in particle scatter signal at varying dilutions, further indicative of single particle detection. Particle concentrations were determined using manufacturer percentage solids. Spike-in particle concentrations were determined using nanoparticle tracking analysis.

Data was acquired using the acquisition software Summit v6 on the Astrios EQ and Diva v8 for the FACS Symphony. Upon completion of data acquisition, files were exported from the acquisition software and imported into FlowJo v10 (TreeStar) for post-acquisition analysis. Flow cytometry files can be found at: https://flowrepository.org/id/FR-FCM-ZYL7 and https://flowrepository.org/id/FR-FCM-ZYL6.

The several different flow cytometry instruments tested above are purported to have very high fluorescent molecule detection sensitivity. However, after measuring the lower limits of detection for MESF values, which are an approximation of Molecules of Equivalent Soluble Fluorophore (MESF) detection, it is found that even the most sensitive of the instruments tested is only capable of detecting objects with >25 fluorescent molecules. Such sensitivity and fluorescence based approach is insufficient for the detection of components of extracellular vesicles, which may be present in numbers as low as 1 or 2 molecules per vesicle. This data provides further support for the importance of detecting side-scattered light spectra from labels, such as metals. Thus, representative examples of the disclosed technology herein can be able to analyze both fluorescent and non-fluorescent light scatter.

In order to provide spectral profiles for nanoparticle detection, flow cytometers and particle spectral scatter were numerically modeled with MATLAB v9.3.0 (The MathWorks Inc., Natick, Mass., USA). The cumulative power of light scattered by a spherical particle of fixed diameter (20, 40, 60 80, 100 nm), reaching a detector was calculated using Mie theory and implemented numerically with scripts that built upon those from Matzler, which describes functions for Mie Scattering and Absorption. The calculations used resemble those of van der Pol et al. and Fattaccioli et al. This software is available at: http://www.joshuawelsh.co.uk/scatter-diameter-software/ (incorporated by reference herein). Particle light scatter modelling focused on the side scatter, that is, on light collected perpendicular to the direction of illumination. The side scatter collection optics of the Astrios EQ flow cytometer have a circular collection aperture with a limiting half-angle approximated to be 29°. The particle suspension medium was modelled using the optical properties of water. Fitting of the modelled data to the experimental data, in order to produce curves of scattered power (or equivalently, scattering cross section) versus particle diameter, was carried out using the method of van der Pol et al. using a single scale factor to convert between simulated scattering cross sections and experimentally measured power levels. Flow cytometry data was converted from arbitrary units to scattering cross-section in nm$^2$ using linear regression of predicted versus acquired values from modelling.

Gold and silver particle diameter distributions and concentrations were measured using NTA with a NanoSight LM10 instrument (Malvern, UK), equipped with a 405 nm LM12 module and EMCCD camera (DL-658-OEM-630, Andor, Belfast, UK). Video acquisition was performed with NTA software v3.2, using a camera level of 14. Three 30 s videos were captured per sample. Post-acquisition video analysis used the following settings: minimum track length=5, detection threshold=4, automatic blur size=2-pass, maximum jump size=12.0.

Figure 29:
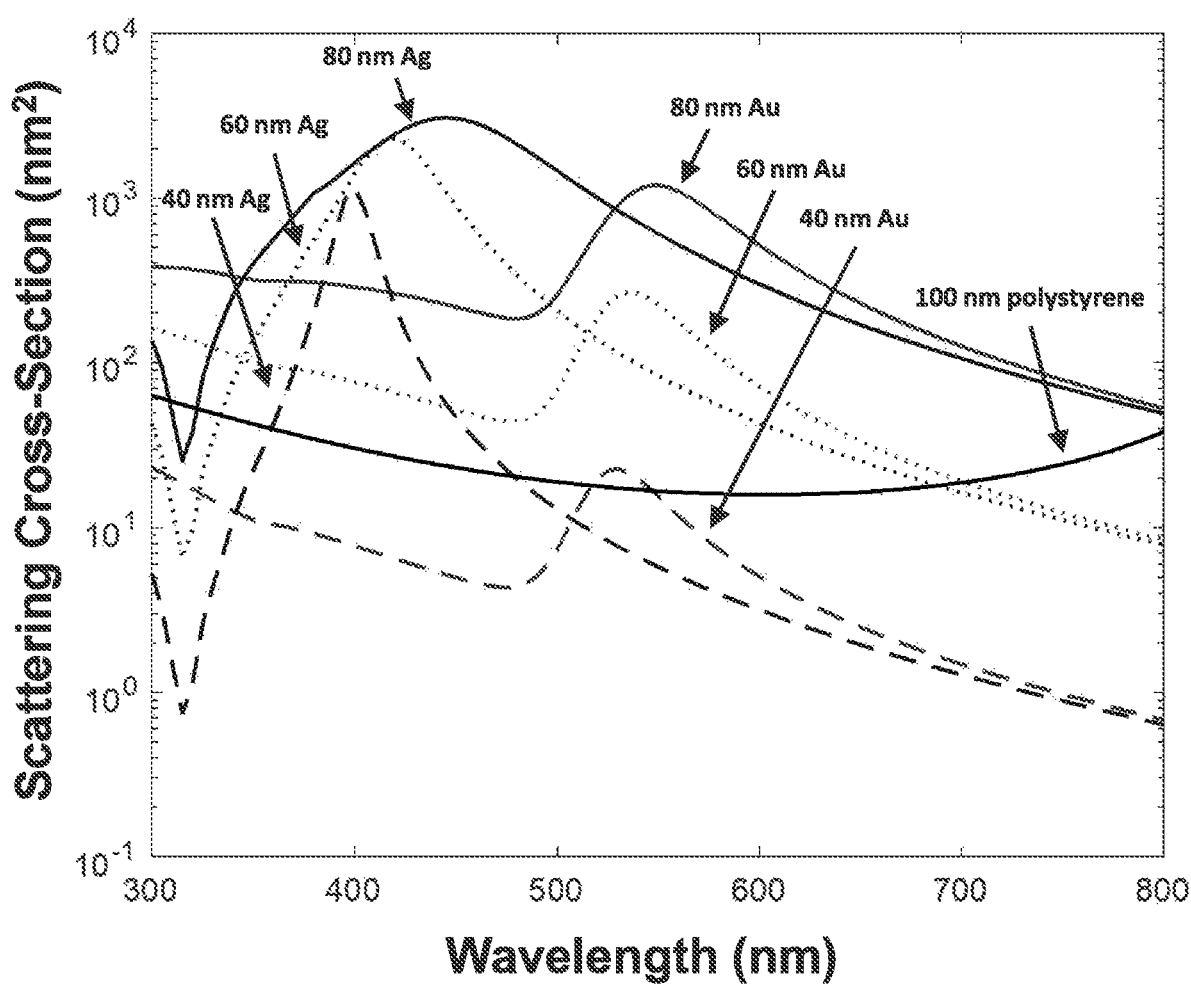
FIG. 29 shows modeled scattering cross-section with respect to wavelength for various Au, Ag, and PS nanoparticles.

Using methods of flow cytometer particle scatter modelling described herein, scatter-diameter relationships (such as shown in FIG. 20B) can be combined with reference refractive index and extinction coefficients from literature to predict which particle diameters and compositions may be detectable. The side scatter collection optics of the Astrios EQ cytometer have been modelled to determine the relative detected scattering power of Au and Ag nanoparticles across the UV-visible spectrum, which is shown in FIG. 29 (and which can also be seen in FIGS. 15A-15D). Other compositions (platinum, titanium dioxide, iron oxide, copper, lead, zirconium) were also modeled, as shown with the spectral profiles of cross-section (similar to intensity or power) with respect to wavelength in FIGS. 15A-15D. The differences in spectral variation between composition and size in each of the profiles can be used during deconvolution to identify nanotags and other particles in a flow cytometry target. In general, increasing the spectral detection capabilities by detecting at multiple wavelengths can improve confidence level of particle identification during deconvolution of multi-wavelength detection signals.

Using 100 nm polystyrene (PS) beads as a cross-sectional scattering reference, due to them being detectable on various flow cytometry platforms, it can be seen from FIG. 29 that 20 nm silver nanoparticles illuminated at ~400 nm have a higher scattering cross-section than 100 nm PS particles. Also, 40 nm Au particles surpass the scattering cross-section of 100 nm PS sphere at an illumination wavelength of ~532 nm, with 40 nm Ag particles having a high scattering cross-section with illumination wavelengths ranging from ~350-450 nm. Further, 60 nm spheres of all compositions with the exception of cadmium selenide, iron oxide and titanium dioxide, have a higher scattering cross-section than 100 nm PS spheres across the majority of the UV-visible spectrum, before dropping in the red area (>700 nm) of the spectrum.

As shown in FIG. 25, PS, Au, and Ag nanoparticles were analyzed on the Astrios EQ and FACS Symphony instrument to determine whether particles were detectable using the conventional scatter collection wavelength of 488 nm. Unstained 100 nm PS beads were resolvable on both instruments. 100, 80, 60 and 40 nm Ag particles were distinguishable from background on both instruments, with the 40 nm population being only partially resolved on the Astrios EQ and FACS Symphony from background noise. 20 nm Ag or Au particles were not resolved on either instrument. 80, 60 and 40 nm Au particles were resolved on both instruments, again with 40 nm Au being only partially resolved on each instrument.

The PS, Au, and Ag particles were investigated using multi-wavelength modelling of the Astrios EQ (as shown in FIG. 22C) and they were compared to the acquired data from 488 and 561 nm SSC channels (as shown in FIG. 22D). A comparison between modelled and acquired data at 405, 488, 561, 640 nm was also performed. Using the instrument background noise as a reference, 40 nm Ag particles were partially resolved on 561 nm, 488 nm and 405 nm SSC channels and unresolved on the 640 nm SSC channel. 40 nm Au particles were fully resolved on the 561 nm and 488 nm SSC channels, partially resolved on 640 nm SSC channel, and unresolved on 405 nm SSC channel. 100 nm PS particles were fully resolved on 488 nm and 561 nm SSC channels, partially resolved on the 405 nm SSC channel, and unresolved on the 640 nm SSC channel. All other particles were resolvable from instrument background noise on all SSC channels.

The relationship between Au, Ag and PS particle scattering on all channels was well maintained between models and acquired data, as can be seen in the similarities between FIG. 22C and FIG. 22D, Au particles show a linear increase in scattering between 488 nm and 561 nm SSC channels, with the PS particles appearing to also increase linearly but with increased 488 nm scattering than Au, and Ag appearing to scatter linearly between 488 nm and 561 nm scattering channels before beginning to tail off in scattering on the 488 nm scattering channel between 60-80 nm but continue to increase in 561 nm scattering.

Figure 30A:
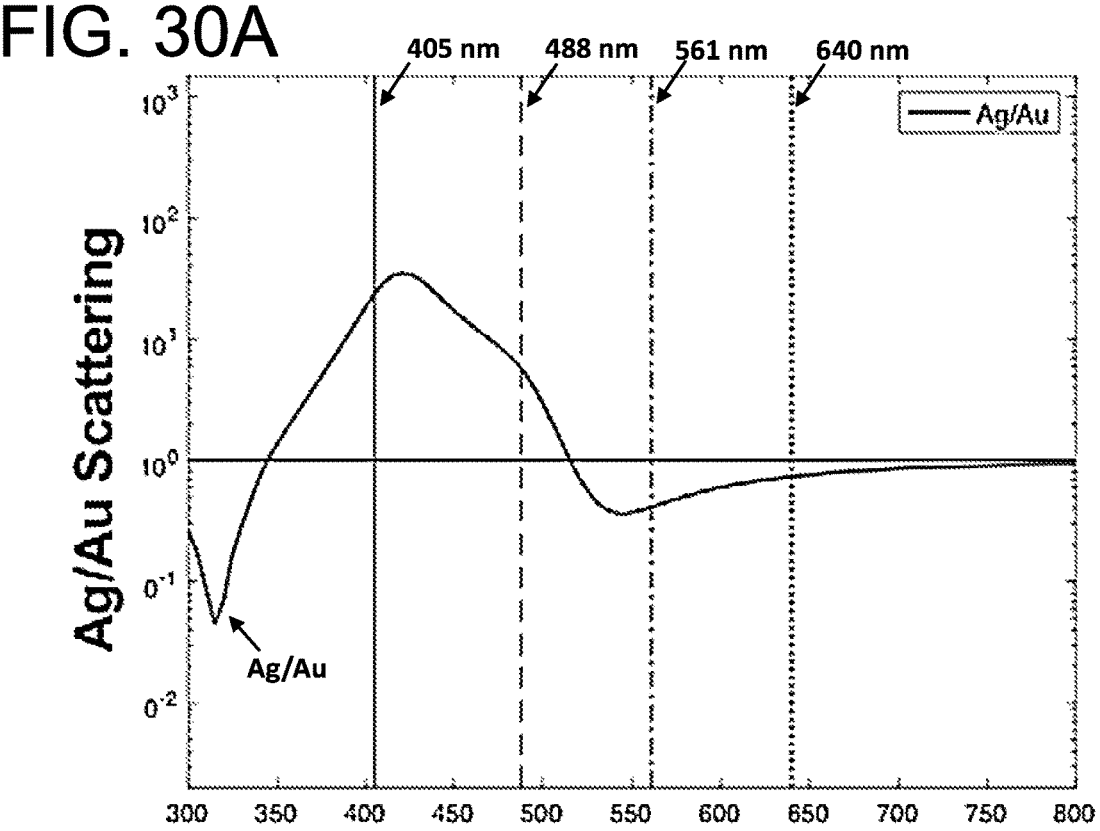
FIGS. 30A-30B show modeled and experimentally acquired scattering cross-section of 60 nm Ag to 60 nm Au particles, respectively.
Figure 30B:
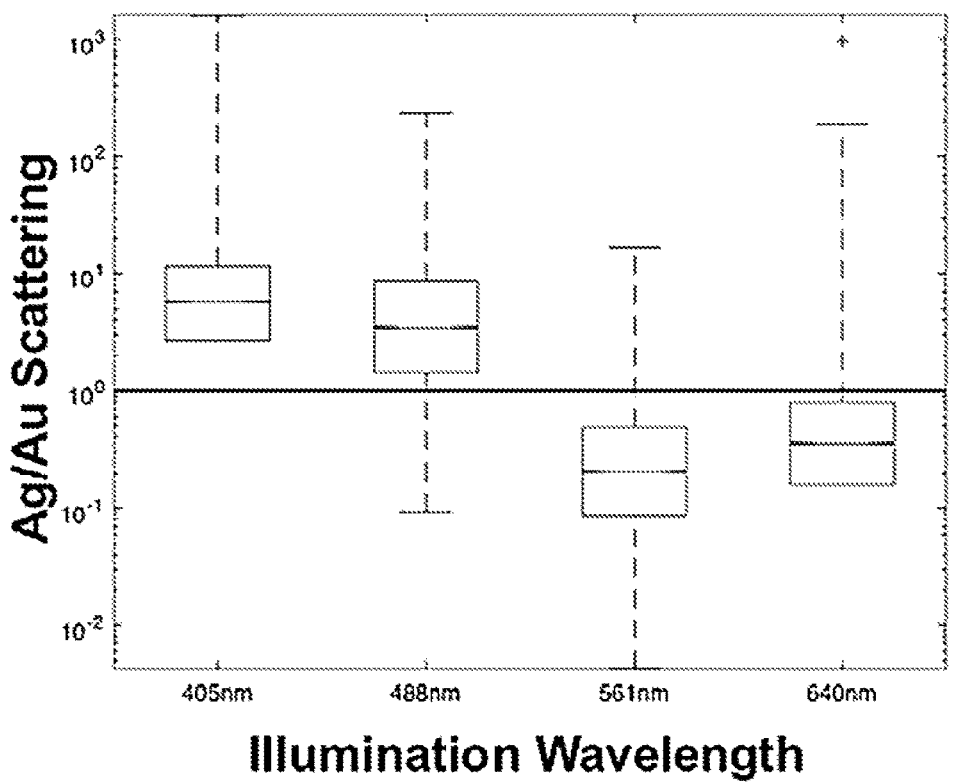

In order to implement the use of several NanoTags at once in flow cytometry, particles are selected based on distinguishable spectral scattering properties to provide a basis for signal extraction and identification through deconvolution. An example of two materials that show distinct spectral scattering properties are 60 nm Au and Ag, as shown in FIG. 30A (similar to FIG. 18B). By plotting the ratio of Ag to Au scattering, the wavelengths at which the most separation is likely to occur can be determined. It can be seen that 60 nm Ag particles will scatter more than 60 nm Au particles between the wavelengths of 350-510 nm, before the inverse occurs from 510 nm to 800 nm. This separation is confirmed in acquired data from the Astrios EQ which collects scatter at 405, 488, 561 and 640 nm, as shown in FIG. 30B (though without normalization for relative power). It can however be seen that the acquired 60 nm Ag particles have a higher scattering intensity than 60 nm Au at 405 nm and 488 nm before inverting on the 561 nm and 640 nm wavelengths, as predicted from modelling. Thus, side scatter detection signals for flow cytometry targets containing EVs having an attached nanotag can be deconvolved to determine the presence of the EV with the attached nanotag.

Figure 31:
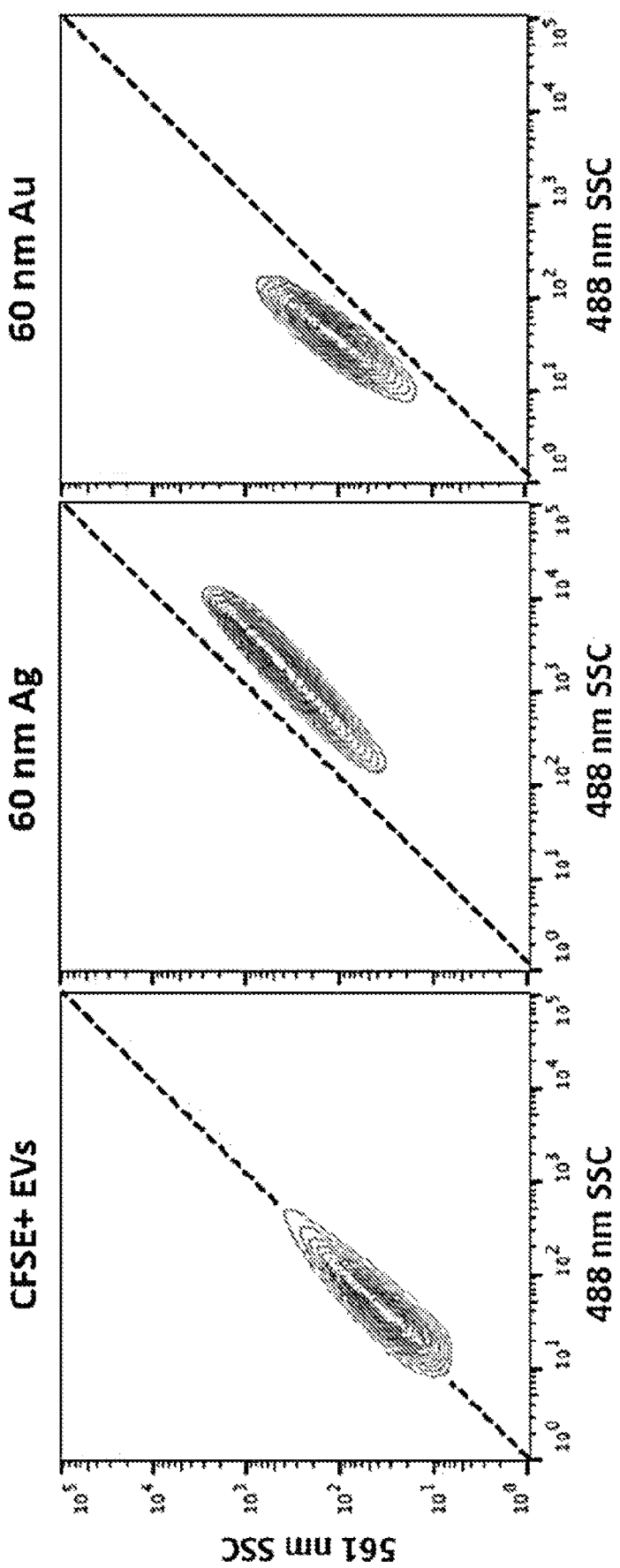
FIG. 31 shows detection of single 60 nm Au and Ag nanotags and CFSE stained EVs.

The scattering properties of CFSE-stained EVs were compared to those of 60 nm Au and 60 nm Ag particles, to show how their use as a label would enable distinction of epitope staining, as shown in FIG. 31. It can be seen that if CFSE-stained EVs were to be positively stained by an Ag NanoTag, their 488 nm and 561 nm SSC channel intensity would increase. If CFSE-stained EVs were to be positively stained by an Au NanoTag, mainly their 561 nm SSC channel intensity would increase. The characteristic channel intensities seen with Au and Ag NanoTags are distinct from one another and these differences provide a means for labeling two different epitopes or detecting two different EV-associated molecules in one assay. These results are expected based on the scattering properties of Au and Ag seen in FIG. 29 and FIG. 22D.

In accordance with the disclosed technology, particles with diameters of 40, 60 and 80 nm, composed of Ag or Au, can be partially or fully resolved using Astrios EQ and FACS Symphony flow cytometers. However, such cytometers may be considered more complex 'high-end' equipment and not all conventional flow cytometers are capable of detecting the 100 nm polystyrene spheres (used as a reference standard). While the capability of detecting 40 nm particles at multiple scattering detection wavelengths is shown with instruments herein, improvements in particle detection (smaller size, single individual particles, multiple particle types) can be obtained, including for detection and analysis of multiple (>3) spectral scatter labels simultaneously. To obtain such improvements, example instruments as disclosed herein can use a broad range of illumination wavelengths, such as with a supercontinuum white laser, as well as multiple scatter detection channels. However, using just one or two labels may be feasible using an existing flow cytometer configuration with scattering collection filters.

Due to the limited surface area and therefore surface proteins on EVs, steric hindrance can be problematic for current immunoglobulin labels, which are approximately 15 nm in diameter. While this is an issue, especially for an immunoglobulin labelled with a few fluorophores that are undetectable on current instruments, only one NanoTag need bind to an EV surface epitope for it to be detectable. A 100 nm EV can have the capacity to bind ~20 loosely packed 15 nm spherical particles. Concentrations of NanoTags to EVs could therefore be far lower, not saturating EV surfaces, thereby allowing multiple NanoTags targeted to different proteins to bind. Another important factor when considering the use of nanoparticles as labels is their conjugation. Many existing nanoparticle labels, such as Qdots, result in polyvalent labels. To ensure single NanoTag binding to EVs the development of monovalent labels would be useful. Monovalent labelling of Qdots has previously been demonstrating by wrapping DNA around the nanoparticle. This method leaves a single functionalized end group that can be used to bind antibodies, aptamers, and so forth.

In accordance with examples herein, as single NanoTags are capable of being detected without being bound to a targeted particle, such as an EV, a method of distinguishing labeled from unlabeled EVs would be useful. In some examples, all EVs are fluorescently labeled with an intercalating membrane dye, or non-specific stain such as CFSE. A shift in a NanoTag's fluorescence can then be identified when bound to a labelled EV, to determine whether it has labelled an EV or not. In other examples, if a specific type of EVs were of interest for example, phosphatidylserine positive, it would be possible to make a NanoTag specific for the population of interest and use a second NanoTag targeted at an EV subset for example, CD9 positive. A unique scattering distribution would then occur for EVs that had two NanoTags, each with distinct scattering properties, bound to them.

Thus, in representative examples, single 40, 60 and 80 nm Au and Ag particles are not only detectable using existing flow cytometry instruments, but are also uniquely distinguishable from one another and fluorescently-labelled EVs, by using their spectral scattering properties. In some examples, particles of such diameter and composition could be used as polyvalent or even monovalent detection labels, using currently available labelling methods, as means for single-epitope detection and implemented as single-epitope detection tags. Using molecular NanoTag as labels leverages the light scattering properties of high refractive index or highly plasmonic nano-materials, thereby providing a signal high enough for detection of single molecules using currently available flow methodologies and may therefore be useful as labels for low expression, low scatter targets, such as EVs.

Thus, in accordance with examples disclosed, Molecular NanoTags can be used to fill existing gaps in available detection methods. For example, there are no methods currently available whereby a clinical laboratory is able to take a blood sample at and determine how many EVs are positive for a specific tumor marker per unit volume of blood. Rather, current methods are only able to bind EVs to multi-micron sized beads and use detection antibodies to detect the EVs bound to the larger beads. Since individual Molecular NanoTags are labels that can be resolved individually, the detection of EVs with as few as one Molecular Nanotag-labelled receptor is feasible. Also, assembly of the Molecular NanoTags in a manner that ensures that the labels are monovalent can enable enumeration of the number of labeled molecules. Such molecular enumeration is a significant advancement beyond the enumeration capabilities of current flow cytometric labels and instruments.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus, comprising:
   an illumination source configured to produce and direct a multi-wavelength illumination beam to a microfluidic target that can include nanotags;
   a detector configured to receive a multi-wavelength detection beam from the microfluidic target and to produce a detection signal, wherein the multi-wavelength detection beam comprises light that is elastically side-scattered by an interaction between the multi-wavelength illumination beam and the nanotags in the microfluidic target; and
   a processor configured to receive the detection signal and to determine the presence of the nanotags in the microfluidic target by comparing multiple wavelength side-scatter intensity characteristics of the detection signal with predetermined multi-wavelength elastic side-scatter intensity profiles of one or more nanotag types.

2. The apparatus of claim 1, wherein the processor is configured, based on the comparing, to determine the presence of an extracellular vesicle (EV) having at least one of the nanotags attached to the EV.

3. The apparatus of claim 1, wherein the processor is configured to determine from the detection signal the presence of multiple nanotag types simultaneously present in the microfluidic target;
   wherein the multiple nanotag types are attached to a common extracellular vesicle (EV).

4. The apparatus of claim 1, wherein the comparing is performed through a deconvolution of the detection signal using the predetermined multi-wavelength elastic side-scatter intensity profiles.

5. The apparatus of claim 1, wherein the illumination source comprises:
   a broadband illumination source situated to generate a broadband illumination beam having a predetermined wavelength spectrum; and
   wherein the apparatus comprises a wavelength separation system optically coupled to the broadband illumination beam and situated to separate the broadband illumination beam into a plurality of subbeams each with a separate wavelength subband of the predetermined wavelength spectrum, and to direct and focus the subbeams along different respective optical paths so as to focus the subbeams at the microfluidic target based on a chromatic focusing distance of the respective wavelength subband.

6. The apparatus of claim 5, wherein the broadband illumination source comprises a supercontinuum laser.

7. The apparatus of claim 5, wherein the detector is part of a detection system further comprising:
   collection optics situated to receive the light elastically side-scattered by the microfluidic target so as to form the multi-wavelength detection beam; and
   prism optics situated to receive the multi-wavelength detection beam from the collection optics and to separate the multi-wavelength detection beam into a plurality of detection subbeams spatially separated based on wavelength.

8. The apparatus of claim 7, wherein the detection system further comprises:
   a microlens array with separate microlenses situated to receive and focus respective detection subbeams; and
   wherein the detector includes a plurality of detector channels situated to receive the respective detection subbeams;
   wherein the detector includes one or more avalanche photodiodes, single-photon detecting avalanche photodiodes, photo-multiplier tubes, silicon photomultipliers, or 3-D high resolution, high sensitivity, high frame rate light field color recording device, or a combination thereof.

9. The apparatus of claim 1, wherein the illumination source comprises:
   a plurality of monochromatic laser sources situated to generate respective laser beams at different wavelengths so as to correspond to the multi-wavelength illumination beam.

10. The apparatus of claim 9, wherein the illumination source further comprises beam focusing optics situated to focus each respective laser beam at the microfluidic target based on the chromatic focusing characteristics of the wavelength of the laser beam;
> wherein the illumination source further comprises a plurality of dichroic optical elements situated to direct the laser beams along a collinear optical path so that the laser beams are focused to a common location at the microfluidic target.

11. The apparatus of claim 9, wherein the detector is part of a detection system comprising collection optics situated to receive the light at the different wavelengths that is elastically side-scattered by the microfluidic target so as to form the multi-wavelength detection beam.

12. The apparatus of claim 11, wherein the collection optics include a first collection optics perpendicularly arranged with respect to an optical path of the multi-wavelength illumination beam received by the microfluidic target, and a second collection optics perpendicularly arranged with respect to the optical path adjacent to the first collection optics.

13. The apparatus of claim 12, wherein the second collection optics are on an opposite side of the microfluidic target from the first collection optics.

14. The apparatus of claim 12, wherein the second collection optics are configured with collection optics parameters different from the first collection optics that shift Mie resonances by a predetermined amount at a given wavelength;
> wherein the collection optics parameters include one or both of collection optics angle and detection aperture geometry.

15. The apparatus of claim 12, wherein the first collection optics are situated to detect a first detection subbeam of the multi-wavelength detection beam having a first wavelength and the second collection optics are situated to detect a second detection subbeam of the multi-wavelength detection beam having a second wavelength;
> wherein the detection of the second detection subbeam with the second collection optics is spatially separated from the detection of first detection subbeam with the first collection optics based on one or both of a focusing distance commonality and focusing distance difference between the first detection subbeam and second detection subbeam by the first collection optics that is associated with a chromatic delta focus profile of the first collection optics or a spatial relationship between the first collection optics and an optical detector situated to receive the first detection subbeam.

16. The apparatus of claim 11, wherein the detection system further comprises:
> at least one dichroic optical element situated to convergently receive the multi-wavelength detection beam and to separate the multi-wavelength detection beam into a plurality of detection subbeams each corresponding to one of the different wavelengths;
> wherein the detector comprises a plurality of optical detectors situated to receive the respective detection subbeams from the at least one dichroic element and situated in a spaced relationship relative to the at least one dichroic element that is based on a focusing distance provided by the collection optics and an optical path length difference in focus between the detection subbeams that is associated with a chromatic aberration profile of the collection optics;
> wherein an order of generation of the detection subbeams with at least one dichroic optical element is based on a chromatic delta focus profile of the collection optics;
> wherein the collection optics includes one or more achromatic or apochromatic lens elements.

17. The apparatus of claim 11, wherein the detection system further comprises an optical fiber assembly including:
> a plurality optical fibers having respective adjacent first ends each including an aperture that is situated to receive a respective detection subbeam of the multi-wavelength detection beam having one of the different wavelengths, wherein the apertures are spaced apart in relation to each other along a common propagation direction of the subbeams based on focusing distance variation between the detection subbeams that is associated with a chromatic delta focus profile of the collection optics; and
> a plurality of optical detectors optically coupled to respective second ends of the optical fibers opposite the first ends.

18. The apparatus of claim 17, further comprising a translation stage coupled to at least one of the first ends of the optical fibers so as to translate the corresponding aperture along the propagation direction;
> wherein the apertures are slit apertures and each slit aperture has a slit length longer than a slit width and the slit length extends parallel to a flow direction of the microfluidic target
> wherein the translation stage is situated to translate the slit apertures along a lateral direction that is perpendicular to the propagation direction and the flow direction.

19. The apparatus of claim 17, wherein each of the first ends of the optical fibers includes an optical block that includes the respective aperture and that is optically coupled or fused to the optical fiber so as to form the first end;
> wherein an area of the optical block adjacent to the aperture has an absorptivity selected so as to reduce stray light in proximity to the first ends of the optical fibers.

20. The apparatus of claim 17, wherein each aperture is defined by a respective endface of the optical fibers based on one or more of a shaped optical fiber core or cladding geometry and a reflectivity coating variation situated on the endface.

21. The apparatus of claim 17, wherein the apertures have a geometry selected in relation to a Mie resonance;
> wherein the geometry is non-circular and non-rectangular.

22. A method comprising:
> directing a multi-wavelength illumination beam generated with an illumination source to a microfluidic target;
> elastically side-scattering the multi-wavelength illumination beam with the microfluidic target;
> detecting with a detector a plurality of detection subbeams of a multi-wavelength detection beam formed with the elastically side-scattered multi-wavelength illumination beam to produce a detection signal; and
> determining the presence of different nanotags responsive to the multi-wavelength detection beam based on the detection signal and predetermined multi-wavelength elastic side-scatter intensity profiles for different nanotag types.

23. The method of claim 22, wherein the determining is performed through a deconvolution of the detection signal using the predetermined multi-wavelength elastic side-scatter intensity profiles.

24. The method of claim 22, wherein the directing the multi-wavelength illumination beam includes:

separating the multi-wavelength illumination beam into a plurality of illumination subbeams each having a different wavelength subband, and directing the illumination subbeams at the microfluidic target along different respective optical paths such that the illumination subbeams are focused at the microfluidic target based on a chromatic focusing distance variation of the different wavelength subbands;

wherein the detecting the plurality of detection subbeams includes:

separating the multi-wavelength detection beam with a prism arrangement into the detection subbeams;

receiving the detection subbeams with a microlens array having respective microlenses situated to respectively focus the detection subbeams; and receiving the focused detection subbeams with respective detector channels of an optical detector.

25. The method of claim 22, wherein the illumination source comprises a plurality of monochromatic lasers situated to emit laser beams with different respective wavelengths;

wherein the directing the multi-wavelength illumination beam includes directing the laser beams a collinear optical path so that the laser beams are focused to a common location at the microfluidic target.

26. The method of claim 25, wherein the detecting a plurality of detection subbeams includes:

convergently receiving the multi-wavelength detection beam from collection optics with at least one dichroic optical element so as to separate the multi-wavelength detection beam into the detection subbeams, each corresponding to one of the different wavelengths; and receiving the detection subbeams with respective optical detectors situated in a spaced relationship with the at least one dichroic optical element that is based on a focusing distance provided by the collection optics and an optical path length difference in focus between the detection subbeams that is associated with a chromatic aberration profile of the collection optics;

wherein the detecting a plurality of detection subbeams includes:

receiving a first portion of the multi-wavelength detection beam with a first set of the collection optics;

detecting a detection subbeam of the first portion that has a first wavelength;

receiving a second portion of the multi-wavelength detection beam with a second set of the collection optics situated opposite the microfluidic target from the first collection optics; and separately detecting a detection subbeam of the second portion that has a second wavelength based on one or both of a focusing distance commonality and focusing distance difference between the detection subbeam having the first wavelength and the detection subbeam having the second wavelength by the first set of collection optics that is associated with a chromatic delta focus profile of the first collection optics.

27. The method of claim 25, wherein the detecting a plurality of detection subbeams includes:

directing the detection subbeams with collection optics to respective slit apertures at first ends of adjacent optical fibers, wherein the slit apertures are spaced apart in relation to each other along a common propagation direction of the subbeams based on a focusing distance variation between the detection subbeams that is associated with a chromatic delta focus profile of the collection optics.

* * * * *